United States Patent [19]

Hattori et al.

[11] Patent Number: 4,988,594

[45] Date of Patent: Jan. 29, 1991

[54] DIAZO PHOTOCONDUCTOR FOR ELECTROPHOTOGRAPHY

[75] Inventors: Yoshimasa Hattori; Noboru Furusho; Youichi Nakamura; Masami Kuroda, all of Kawasaki, Japan

[73] Assignee: Fuji Electric Co. Ltd., Kanagawa, Japan

[21] Appl. No.: 385,316

[22] Filed: Jul. 26, 1989

[51] Int. Cl.[5] ........................ G03G 5/047; G03G 5/06

[52] U.S. Cl. ........................................ 430/59; 430/70; 430/71; 430/72; 430/75; 430/76; 430/78; 534/753; 534/766; 534/771; 534/790; 534/798

[58] Field of Search ....................... 430/58, 59, 70, 71, 430/72, 75, 76, 78, 79

[56] References Cited

U.S. PATENT DOCUMENTS

| | | | |
|---|---|---|---|
| 4,150,987 | 4/1979 | Anderson et al. | 430/59 |
| 4,278,747 | 7/1981 | Murayama et al. | 430/82 |
| 4,353,971 | 10/1982 | Chang et al. | 430/58 |
| 4,367,273 | 1/1983 | Murayama et al. | 430/56 |
| 4,385,106 | 5/1983 | Sakai | 430/59 |
| 4,448,868 | 5/1984 | Suzuki et al. | 430/58 |
| 4,565,761 | 1/1986 | Katagiri et al. | 430/83 |
| 4,629,670 | 12/1986 | Katagiri et al. | 430/58 |
| 4,673,630 | 6/1987 | Katagiri et al. | 430/72 |
| 4,677,045 | 6/1987 | Champ et al. | 430/76 |
| 4,839,252 | 6/1989 | Murata et al. | 430/59 |
| 4,861,691 | 8/1989 | Kuroda et al. | 430/59 |
| 4,861,692 | 8/1989 | Kuroda et al. | 430/59 |
| 4,871,636 | 10/1989 | Hattori et al. | 430/58 X |
| 4,882,255 | 11/1989 | Hattori et al. | 430/58 X |
| 4,935,323 | 6/1990 | Hattori et al. | 430/58 |

FOREIGN PATENT DOCUMENTS

| | | | |
|---|---|---|---|
| 59-182456 | 10/1984 | Japan . | |
| 59-182457 | 10/1984 | Japan . | |
| 63-131146 | 6/1988 | Japan | 430/76 |
| 64-567 | 1/1989 | Japan | 430/78 |
| 1-185637 | 7/1989 | Japan | 430/78 |
| 1-234856 | 9/1989 | Japan | 430/76 |

*Primary Examiner*—Roland Martin
*Attorney, Agent, or Firm*—Spencer & Frank

[57] ABSTRACT

A photoconductor for electrophotography comprises an electroconductive substrate and a photoconductive layer formed on the substrate and including a novel disazo compound as a charge generating layer. The disazo compound is represented by the following general formula:

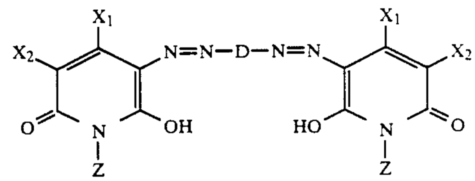

or

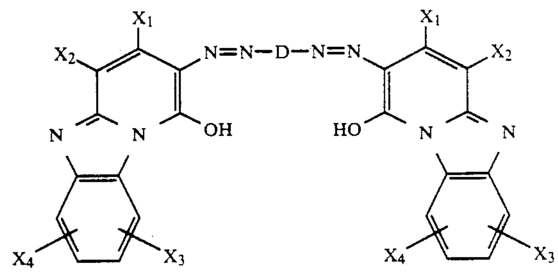

wherein X1 stands for one of an alkyl group, an aryl group and an aromatic heterocyclic group, each of which groups may be or not may be substituted, $X_2$ stands for one of a hydrogen atom, a cyano group, a carbamoyl group, a carboxyl group, an ester group and an acyl group, each of $X_3$ and $X_4$ stands for one of a hydrogen atom, a halogen atom, a nitro group, an alkyl group and an alkoxyl group, both of last two groups may be or not may be substituted, Z stands for one of a hydrogen atom, an alkyl group, a cycloalkyl group, an alkenyl group, an aryl group and an aromatic heterocyclic group, each of which groups may be or not may be substituted and —N═N—D—N—N═N— stands for a disazo residual group.

6 Claims, 2 Drawing Sheets

DIAZO PHOTOCONDUCTOR FOR ELECTROPHOTOGRAPHY

BACKGROUND OF THE INVENTION

1. Field of the Invention

The present invention relates to photoconductors for electrophotography, and particularly to a photoconductor for electrophotography which contains a novel disazo compound in the photosensitive layer thereof formed on an electroconductive substrate.

2. Description of the Prior Art

Photosensitive materials which have heretofore been used in photoconductors for electrophotography include inorganic photoconductive substances such as selenium and selenium alloys, dispersions of inorganic photoconductive substances such as zinc oxide and cadmium sulfide in resin binders, organic polymeric photoconductive substances such as poly-N-vinylcarbazole and polyvinylanthracene, organic photoconductive substances such as phthalocyanine compounds and disazo compounds, and dispersions of such organic polymeric photoconductive substances in resin binders.

Photoconductors are required to have a function of maintaining a surface electric charge in the dark, a function of generating an electric charge upon receiving light, and a function of transporting an electric charge upon receiving light. They are classified into two types of photoconductors, namely so-called monolayer type photoconductors, and so-called laminate type photoconductors. The former comprises a single layer having all of the above-mentioned three functions, and the latter comprises functionally distinguishable laminated layers, one of which contributes mainly to the generation of electric charge, and another of which contributes to the retention of surface electric charge in the dark and the electric charge transportation upon receiving light. In an electrophotographic method using a photoconductor of the kind as mentioned above, for example, the Carlson's system is applied to image formation. The image formation according to this system comprises steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralization of the residual charge with light (erasion), and so on to be ready for reuse.

Photoconductors for electrophotography in which use is made of organic materials have recently been put into practical use by virtue of the advantageous features of the organic materials such as flexibility, thermal stability, and/or a film forming capacity. They include a photoconductor comprising poly-N-vinylcarbazole and 2,4,7-trinitorofluoren-9- on (disclosed in U.S. Pat. No. 3,484,237), a photoconductor using an organic pigment as the main component (disclosed in Japanese Patent Application Laid-Open No. 37,543/1972), and a photoconductor using as the main component a eutectic complex composed of a dye and a resin (disclosed in Japanese Patent Application Laid-Open No. 10,735/1972). A number of novel azo compounds, perylen compounds and hydrazone compounds have also been put into practical use for photoconductors.

Although organic materials have a number of advantageous features mentioned above with which inorganic materials are not endowed, however, the fact is that there have been obtained no organic materials fully satisfying all the characteristics required of a material to be used in photoconductors for electrophotography at the present. Particular problems involved in organic materials have been concerned with photosensitivity and characteristics in continuous repeated use.

SUMMARY OF THE INVENTION

An object of the present invention is to provide a photoconductor for electrophotography to be used in copying apparatuses and printers which member has a high photosensitivity and excellent characteristics in repeated use, through the use, in the photosensitive layer, of a novel organic materials not used to date as a charge generating substance.

The present invention provides a photoconductor for electrophotography comprising:

a substrate; and a photoconductive layer formed on the substrate and including at least one of disazo compounds represented by the following general formula (I) or (II) as a charge generating substance:

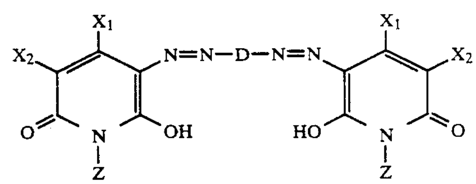

(I)

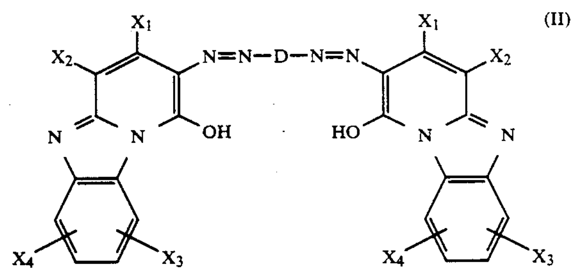

(II)

wherein $X_1$ stands for one of an alkyl group, an aryl group and an aromatic heterocyclic group, each of which groups may be or not may be substituted, $X_2$ stands for one of a hydrogen atom, a cyano group, a carbamoyl group, a carboxyl group, an ester group and an acyl group, each of $X_3$ and $X_4$ stands for one of a hydrogen atom, a halogen atom, a nitro group, an alkyl group and an alkoxy group, both of last two groups may be or not may be substituted, Z stands for one of a hydrogen atom, an alkyl group, a cycloalkyl group, an alkenyl group, an aryl group and an aromatic heterocyclic group, each of which groups may be or not may be substituted and —N=N—D—N=N— stands for a disazo residual group.

Here, —D— in the disazo residual group may be a structure represented by one of the following formulae:

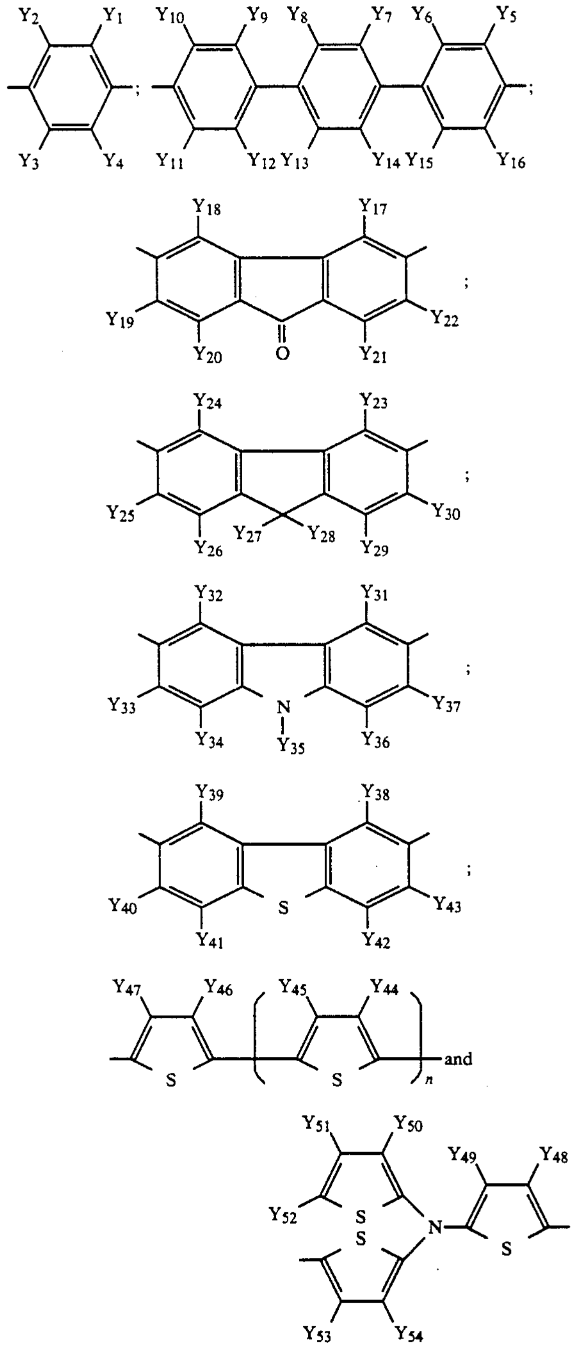

wherein each of $Y_1$ to $Y_{54}$ stands for one of a hydrogen atom, a halogen atom, an alkyl group, an alkoxy group, an acyl group, an aryl group, an aromatic heterocyclic group, each of which groups may be or not may be substituted, and a nitro group and n stands for one integer of from 0 to 6.

The photoconductive layer may further include at least one hydrazone compound represented by the following general formula (III) or pyrazoline compound represented by the following general formula (IV):

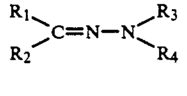

(III)

-continued

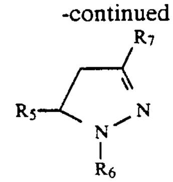

(IV)

wherein each of $R_1$, $R_2$, $R_3$ and $R_4$ stands for one of an alkyl group, an alkenyl group, an aryl group and an aromatic heterocyclic group, each of which groups may be or not may be substituted, and each of $R_5$, $R_6$ and $R_7$ stands for one of an alkenyl group, an aryl group and an aromatic heterocyclic group each of which groups may be or not may be substituted.

The photoconductive layer may comprise a layer including a dispersion of a charge generating substance selected from the disazo compounds represented by the general formula (I) or (II) and a charge transporting substance in a binder resin.

The photoconductive layer may comprise a laminate of a charge transporting layer mainly composed of a charge transporting substance and a charge generating layer including a compound selected from the disazo compounds represented by the general formula (I) or (II).

The photoconductive layer may comprise a layer including a dispersion of a charge generating substance selected from the disazo compounds represented by the general formula (I) or (II) and a charge transporting substance selected from the hydrazone compounds represented by the general formula (III) or the pyrazoline compounds represented by the general formula (IV) in a binder resin.

The photoconductive layer may comprise a laminate of charge transporting layer mainly composed of a charge transporting substance and a charge generating layer including a compound selected from the disazo compounds represented by the general formula (I) or (III) and selected from the hydrazone compound represented by the general formula (III) or the pyrazoline compounds represented by the general formula (IV).

The above and other objects, effects, features and advantages of the present invention will become more apparent from the following description of embodiments thereof taken in conjunction with the accompanying drawings.

DETAILED DESCRIPTION OF PREFERRED EMBODIMENTS

A photoconductor in accordance with the present invention comprises at least one of the specific disazo compounds as a charge generating substance in a photoconductive layer. Further, the photoconductor may comprise at least one of the specific hydrazone compounds and/or pyrazoline compounds as a charge transporting substance in combination with the aforementioned disazo compound. These specific compounds are explained later.

A layer structure of the photoconductor is not limited. Examples of the layer structure are illustrated in FIGS. 1 to 5 which are schematic cross-sectional views of different embodiments of the photoconductor of the present invention, respectively.

Figure 1:
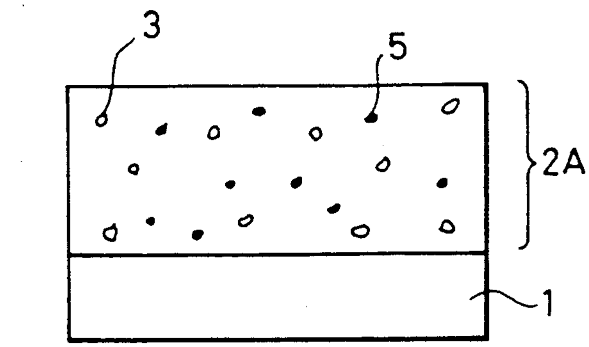
FIGS. 1 to 5 are schematic cross-sectional views of photoconductors according to the present invention.

FIG. 1 shows a monolayer type photoconductor. A photoconductive layer 2A is provided on an electroconductive substrate 1. The photoconductive layer 2A comprises a disazo compound as a charge generating substance 3 and another organic compound as a charge transporting substance 5 both of which substances are dispersed in a resin binder matrix so that the photoconductive layer 2A functions as photoconductor.

Figure 2:
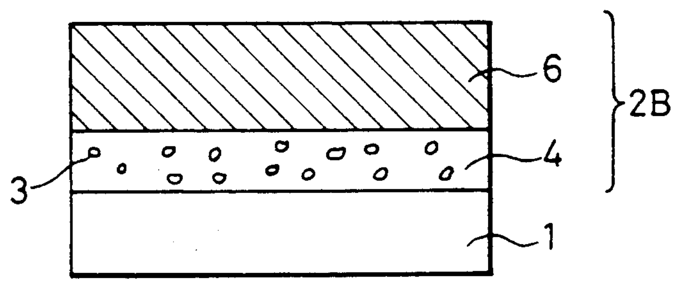

FIG. 2 shows a laminate type photoconductor. A laminated photoconductive layer 2B is provided on an electroconductive substrate 1, a lower layer of the laminate is a charge generating layer 4 including a disazo compound as a charge generating substance 3 and an upper one is a charge transporting layer 6 containing a charge transporting substance 5 as the main component, so that the photoconductive layer 2B functions as a photoconductor. This photoconductor is usually used according to the negative charge mode.

Figure 3:
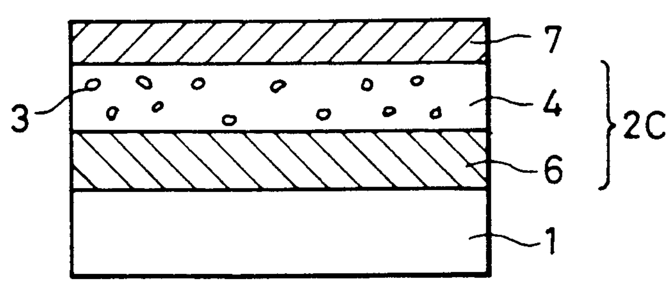

FIG. 3 shows another laminate type photoconductor having a layer structure in reverse to that of FIG. 2. A laminated photoconductive layer 2C is provided on an electroconductive substrate 1, a lower layer of the laminate is a charge transporting layer 6 and an upper one is a charge generating layer 4 including a disazo compound as a charge generating substance 3. The photoconductive layer also functions as a photoconductor. This photoconductor is usually used according to the positive charge mode. In this case, a covering layer 7 may generally be further provided as shown in FIG. 3 to protect the charge generating layer 4. However, the covering layer 7 is not essential.

Thus, in the case of laminate type photoconductors, the charge mode therefor differs from layer structure to layer structure. The reason for this is that, even if any photoconductor with the layer structure as shown in FIG. 2 is to be used in the positive charge mode, no charge transporting substances adaptable to the positive charge mode have been found yet. Accordingly, when any laminate type photoconductor is to be used in the positive charge mode, the photoconductor is required of a layer structure as shown in FIG. 3 at present.

Figure 4:
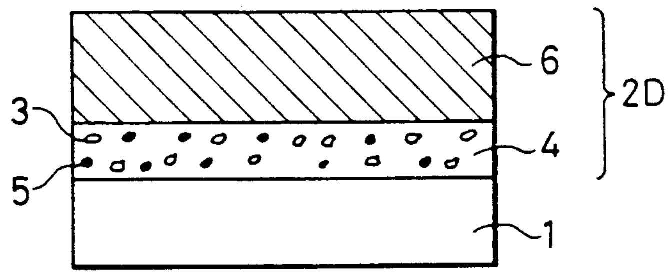

FIG. 4 shows a further laminate type photoconductor. A laminated photoconductive layer 2D is provided on an electroconductive substrate 1, lower layer of the laminate is a charge generating layer 4 including a disazo compound as a charge generating substance 3 and another compound as a charge transporting substance 5, and an upper layer is a charge transporting layer 6 containing a charge transporting substance.

Figure 5:
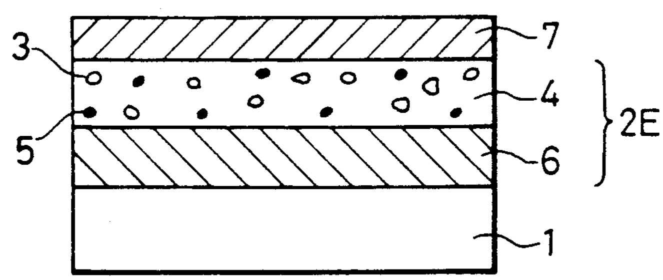

FIG. 5 shows a still further laminate type photoconductor. The photoconductor has a layer structure in reverse to that of FIG. 4.

A photoconductor as shown in FIG. 1 can be produced by dispersing a charge generating substance in a solution of a charge transporting substance and a resin binder and applying the resulting dispersion on an electroconductive substrate.

A photoconductor as shown in FIG. 2 can be prepared by applying and drying a dispersion of a particulate charge generating substance in a solvent and/or a resin binder on an electroconductive substrate, followed by applying a solution of a charge transporting substance and a resin binder on the resulting layer and drying.

A photoconductor as shown in FIG. 3 can be prepared by applying and drying a solution of a charge transporting substance and a resin binder on an electroconductive substrate, and coating and drying a dispersion of a particulate charge generating substance in a solution of a resin binder on the coating layer, followed by formation of a covering layer.

A photoconductor as shown in FIG. 4 can be prepared by applying and drying a dispersion, which is prepared by dispersing a charge generating substance into a solution of a charge transporting substance and a resin binder, on an electroconductive substrate, followed by applying and drying a solution of a charge transporting substance and a resin binder.

A photoconductor as shown in FIG. 5 can be prepared by applying and drying a solution of a charge transporting substance and a resin binder on a substrate, followed by applying and drying a dispersion prepared by dispersing a charge generating substance into a solution of a charge transporting substance and a resin binder.

The electroconductive substrate 1 serves as an electrode of the photoconductor and as a support for a layer or layers formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of a disazo compound as a charge generating substance 3 in a resin binder as described above, and this layer generates an electric charge upon receiving light. It is important that the charge generating layer 4 be high not only in charge generating efficiency but also in capability of injecting the generated electric charge into the charge transporting layer 6 and any covering layer 7, which capability is desirably as little dependent upon the electric field as possible and high even in low intensity electric fields.

The specific disazo compounds are usable as the charge generating substance, and among them, a suitable compound can be chosen depending on the wavelength range of a light source used for the image formation. The thickness of the charge generating layer is determined depending on the extinction coefficient of a charge generating substance to be used therein in view of the layer's function of generating an electric charge, but is generally 5 μm or smaller, preferably 1 μm or smaller. It also is possible to form a charge generating layer using a charge generating substance as a main component in admixture with a charge transporting substance such as a hydrazone compound and a pyrazoline compound. Resin binders usable in the charge generating layer include polycarbonates, polyesters, polyamides, polyurethanes, epoxy resins, silicone resins, and methacrylate homopolymer and copolymers, which may be used either alone or in appropriate combination.

The charge transporting layer 6 is a coating film containing a hydrazone compound, a pyrazoline compound, a styryl compound, a tri-phenyl-amine compound, an oxazole compound or an oxadizole compound as an organic charge transporting substance in a resin binder. Preferably, one of the specific hydrazone compounds and/or pyrazoline compound, which are explained later, is used as a charge transporting substance. The charge transporting layer serves as an insulator layer in the dark so as to retain the electric charge of the photoconductor, and fulfils, a function of transporting an electric charge injected from the charge generating layer upon receiving light. Resin binders usable in the charge transporting layer include polycarbonates, polyesters, polyamides, polyurethanes, epoxy resins, silicone resins, and methacryate homopolymer and copolymers.

The covering layer 7 has a function of receiving and retaining an electric charge generated by corona discharge in the dark and a capability of transmitting light to which the charge generating layer should respond. It is necessary that the covering layer transmits light upon exposure of the photoconductor and allows the light to reach the charge generating layer, and then undergoes the injection of an electric charge generated in the charge generating layer to neutralize and erases a surface electric charge. Materials usable in the covering layer include organic insulating film-forming materials such as polyesters and polyamides. Such organic materials may also be used in mixture with an inorganic material such as a glass resin or $SiO_2$, or an electric resistance-lowering material such as a metal or a metallic oxide. Materials usable in the covering layer are not limited to organic insulating film-forming materials, and further include inorganic materials such as $SiO_2$, metals, and metallic oxides, which may be formed into a covering layer by an appropriate method such as vacuum evaporation and deposition, or sputtering. From the viewpoint of the aforementioned description, it is desirable that the material to be used in the covering layer be as transparent as possible in the wavelength range wherein the charge generating substance attains maximum light absorption.

Although the thickness of the covering layer depends on the material or composition thereof, it can be arbitrarily set in so far as it does not produce any adverse effects including an increase in a residual potential in continuous repeated use.

The disazo compounds to be used as a charge generating substance in the present invention are represented by the following general formula (I) or (II).

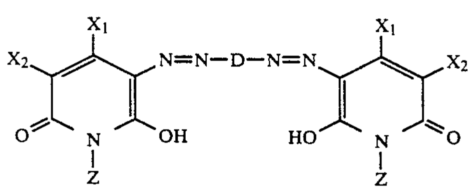

(I)

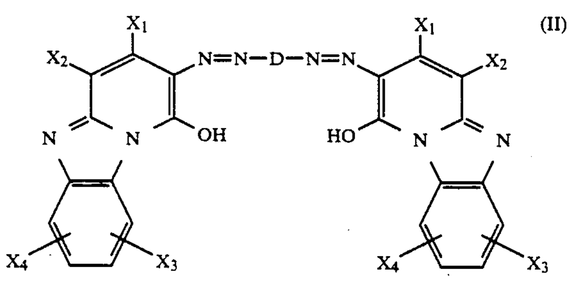

(II)

Wherein $X_1$, stands for one of an alkyl group, an aryl group and an aromatic heterocyclic group, each of which groups may be or not may be substituted, $X_2$ stands for one of a hydrogen atom, a cyano group, a carbamoyl group, a carboxyl group, an ester group and an acyl group, each of $X_3$ and $X_4$ stands for one of a hydrogen atom, a halogen atom, a nitro group, an alkyl group and an alkoxy group, both of last two groups may be or not may be substituted, Z stands for one of a hydrogen atom, an alkyl group, a cycloalkyl group, an alkenyl group, an aryl group and an aromatic heterocyclic group, each of which groups may be or not may be substituted and —N=N—D—N=N— stands for a disazo residual group. Preferably, —D— in the disazo residual group is a structure represented by one of the following formulae.

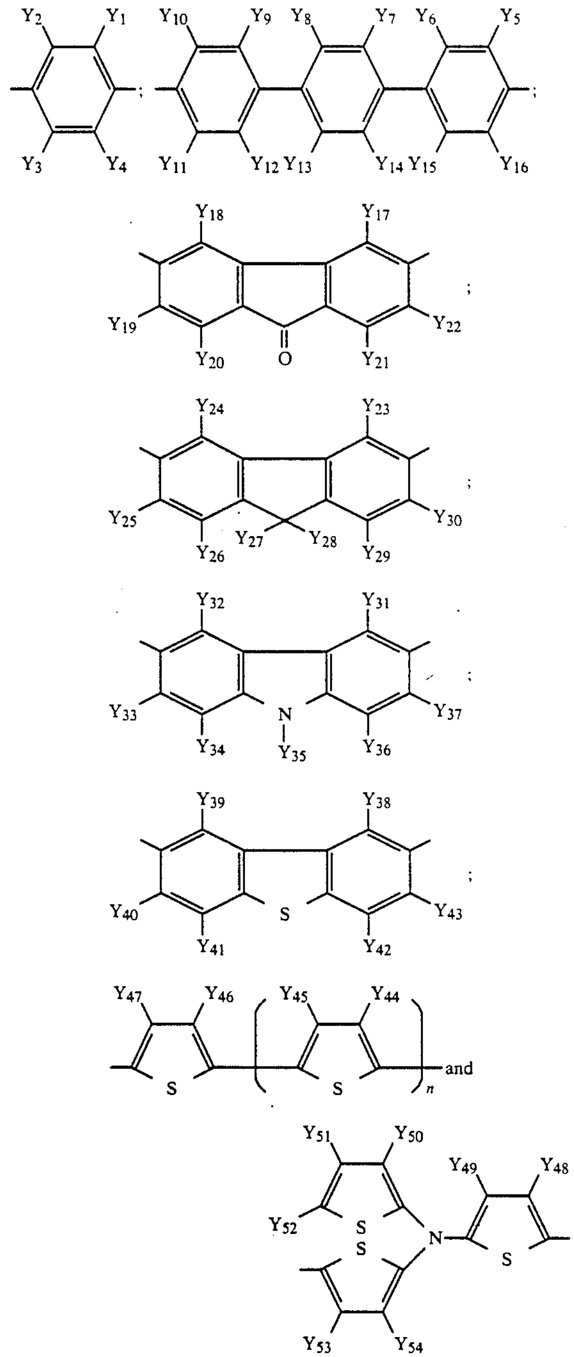

Wherein each of $Y_1$ to $Y_{54}$ stands for one of a hydrogen atom, a halogen atom, an alkyl group, an alkoxy group, an acyl group, an aryl group, an aromatic heterocyclic group, each of which groups may be or not may be substituted, and a nitro group and n stands for one integer of from 0 to 6.

The disazo compounds represented by the aforementioned general formula (I) or (II) can by synthesized by coupling reacting a corresponding diazonium salts with a coupler in an appropriate organic solvent such as N,N-dimethyl-formamide (DMF) in the presence of a base as a catalyzer.

As for the use of the disazo compounds represented by the general formulae given above in photosensitive layers, there has been no precedent before. In the course of the intensive study of various organic materials as made in an attempt of achieve the above object, the present inventors conducted a number of experiments with those amino compounds and, as a result, found that the use of such specific disazo compounds represented by the above general formula (I) or (II) as charge generating substances is very effective in improving electrophotographic characteristics. Based on this finding, photoconductors having a high sensitivity and good repeated use characteristics are obtained.

Specific examples of the disazo compounds represented by the general formula (I) and (II) include:

Compound No.
1
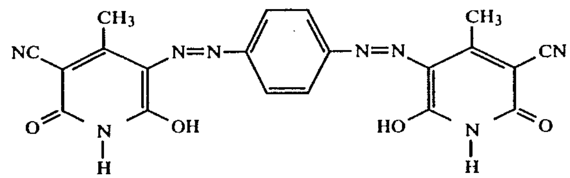
2
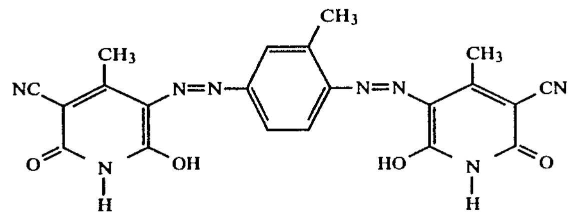
3
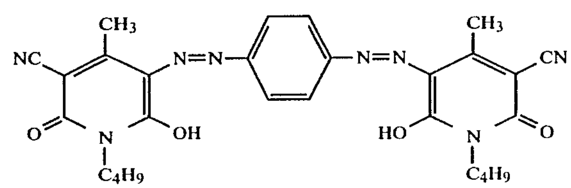
4
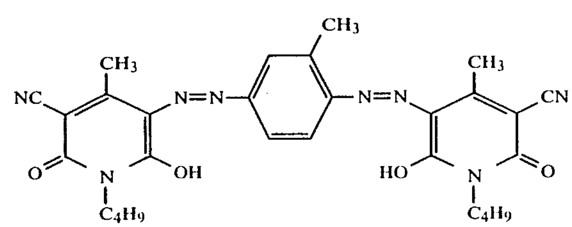

-continued
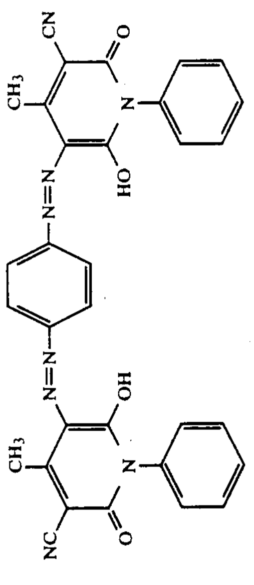
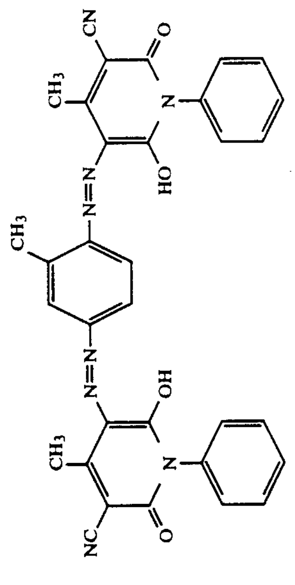
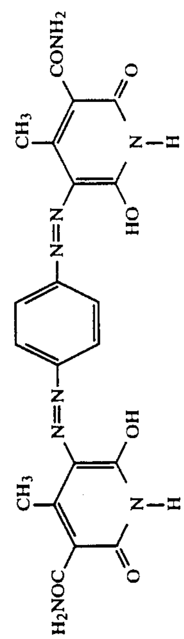
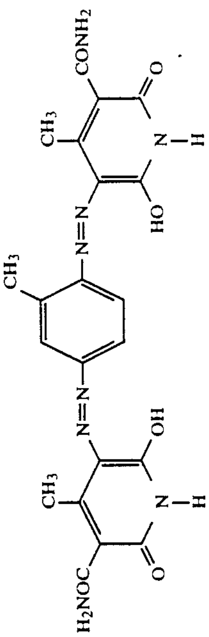

-continued
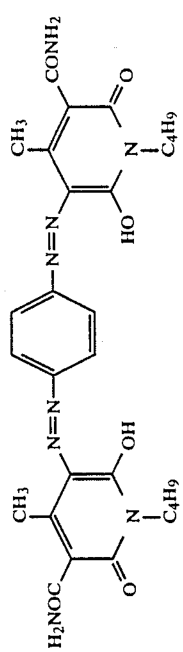
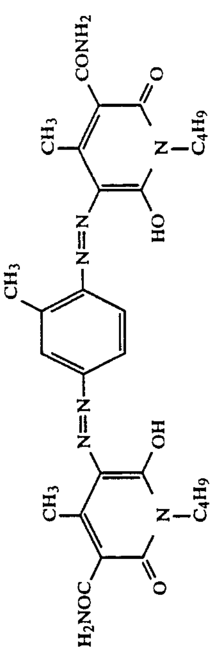
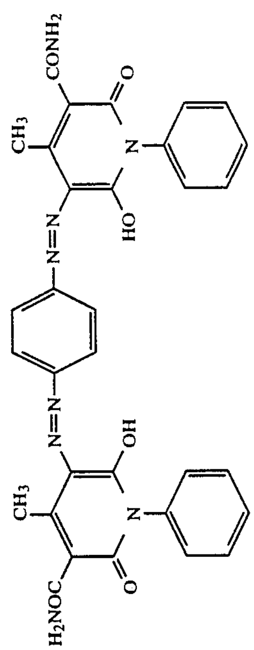
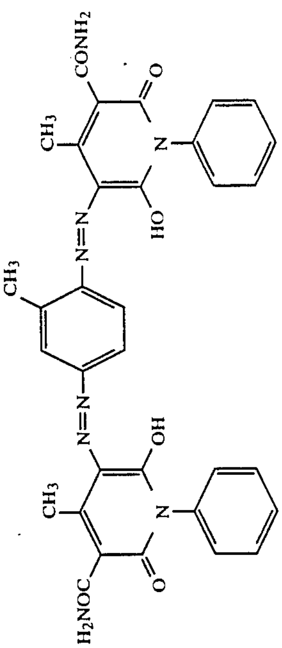

-continued
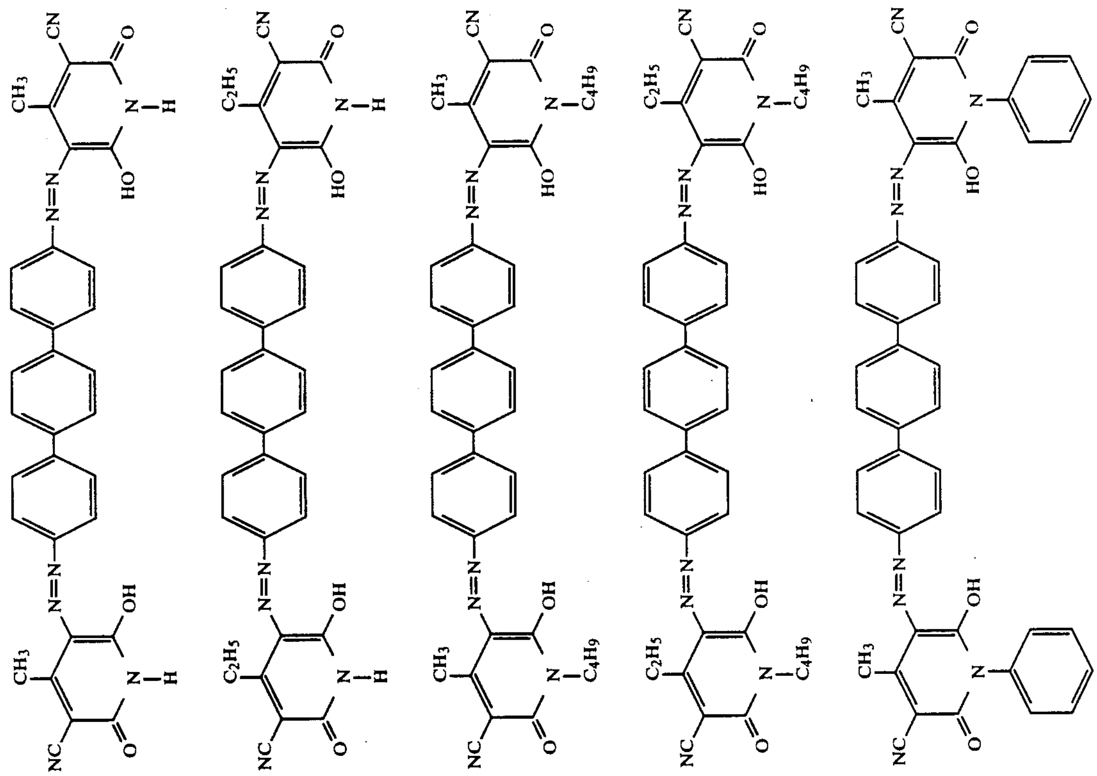

-continued
18
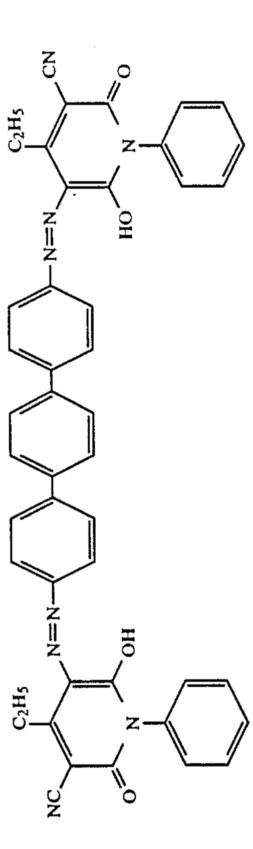
19
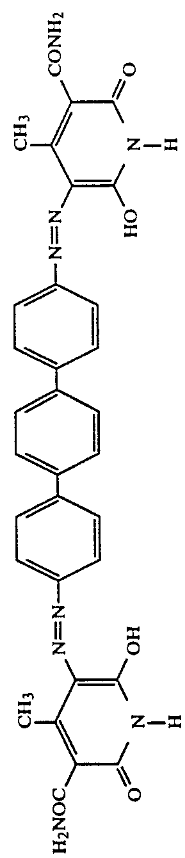
20
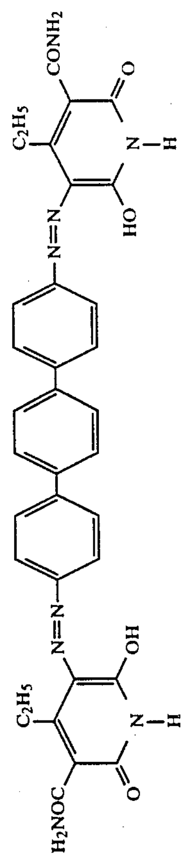
21
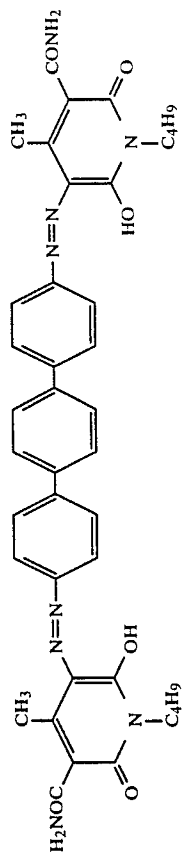
22
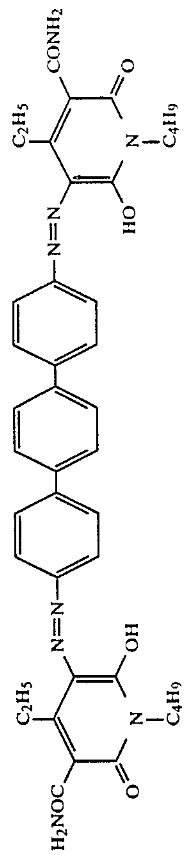

-continued
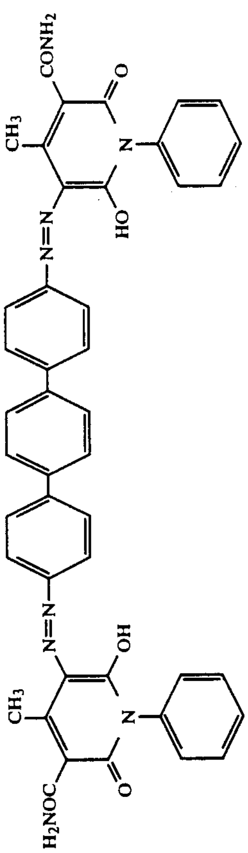
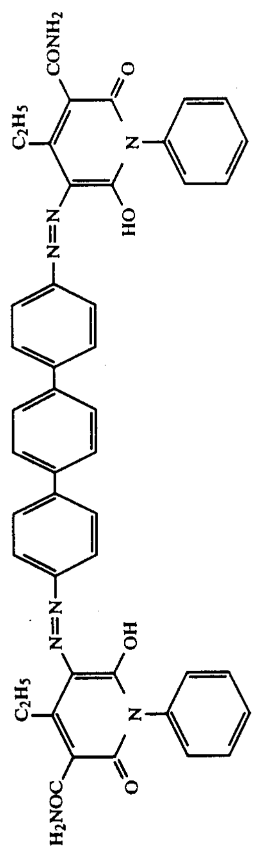
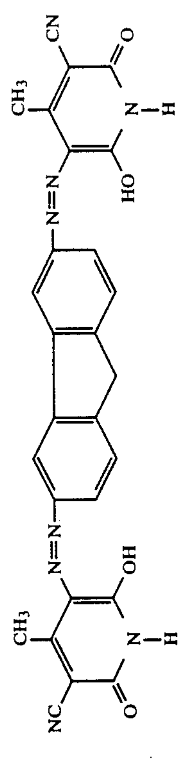

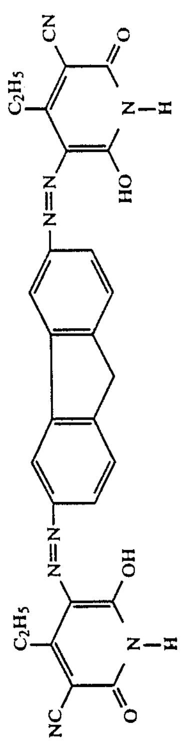
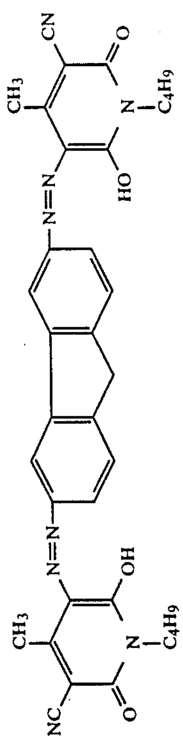
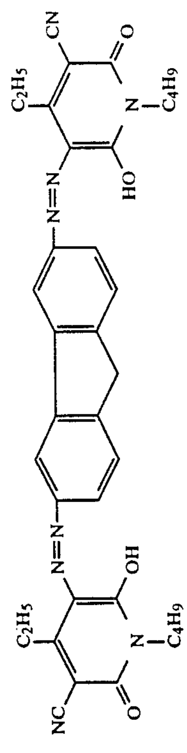
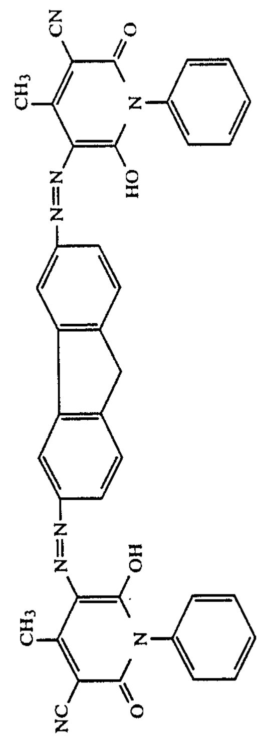
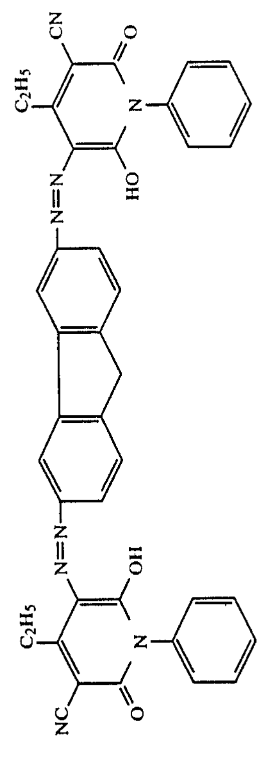

-continued
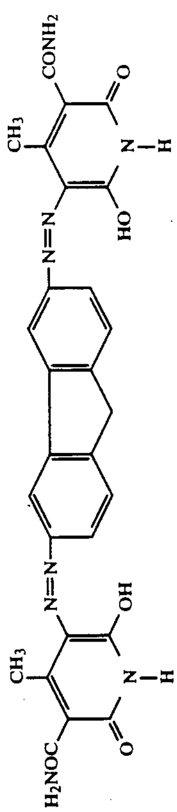
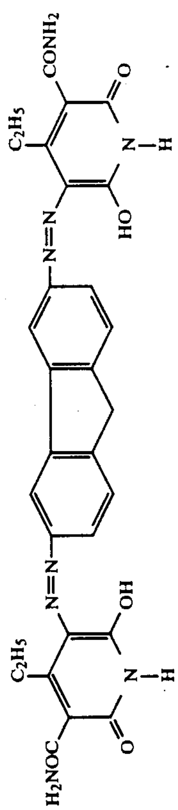
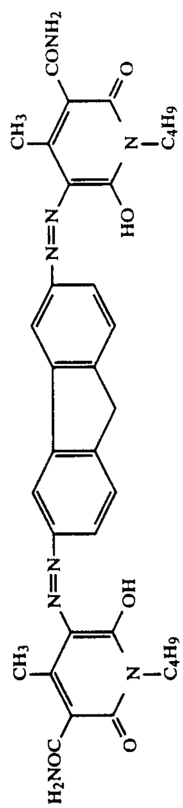
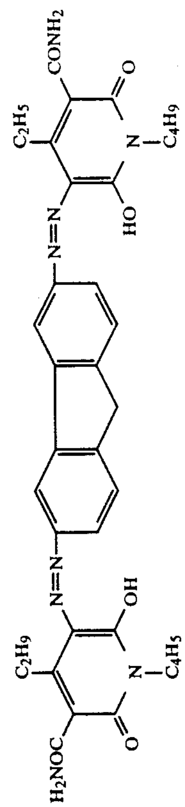
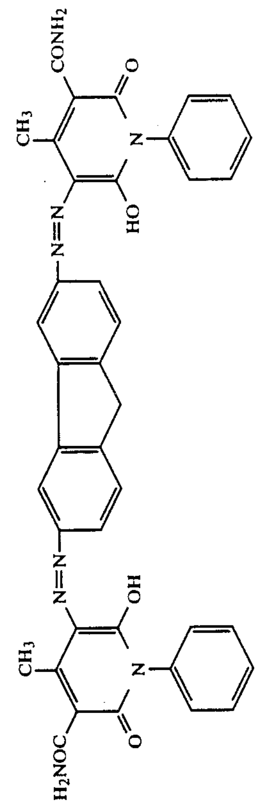

-continued
36
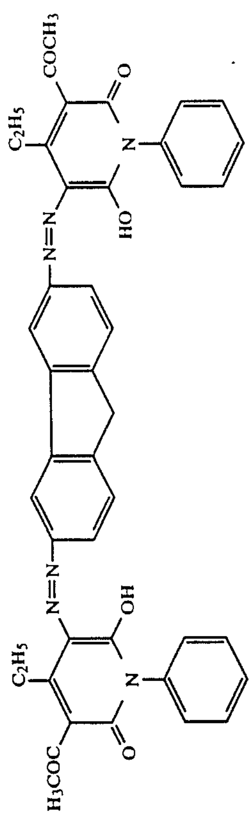
37
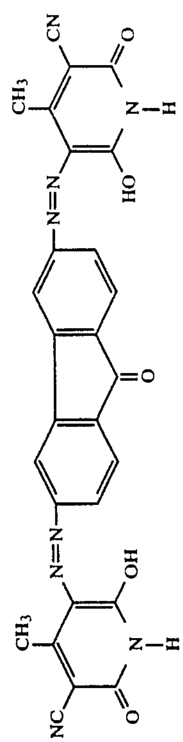
38
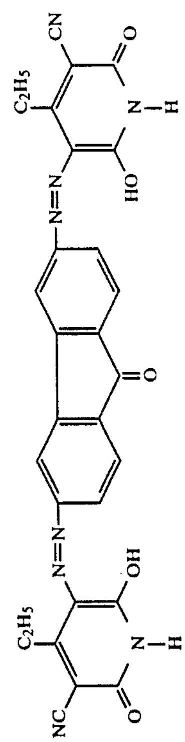
39
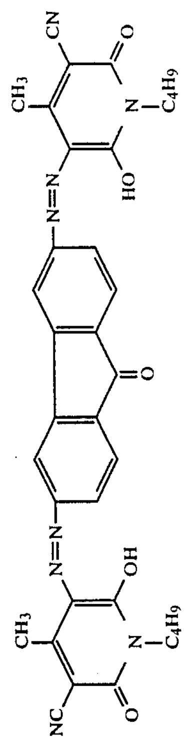
40
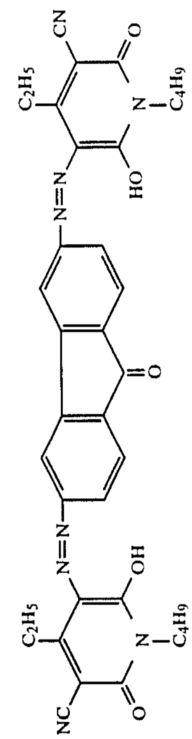

-continued
41
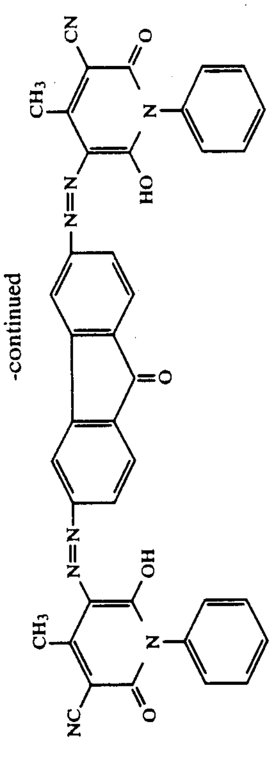
42
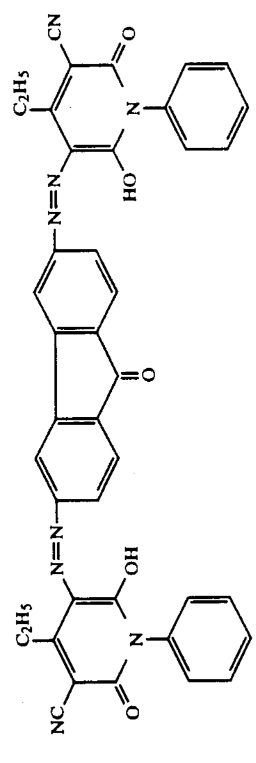
43
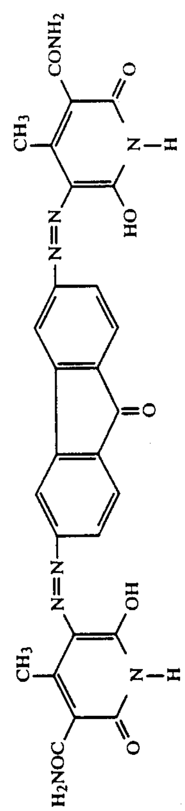
44
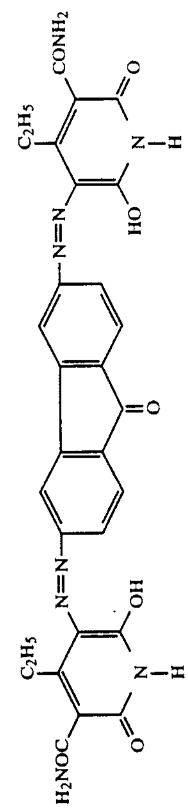
45
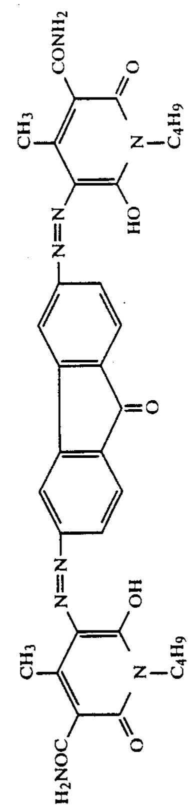

-continued
46
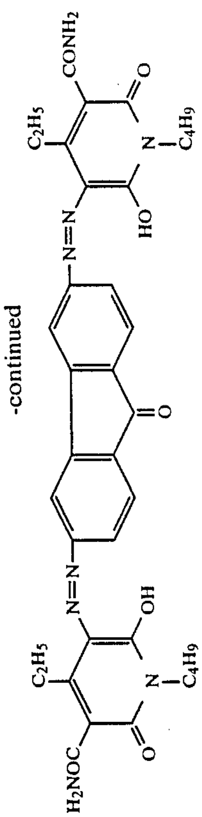
47
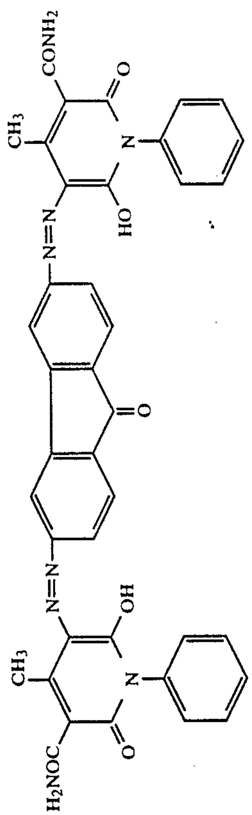
48
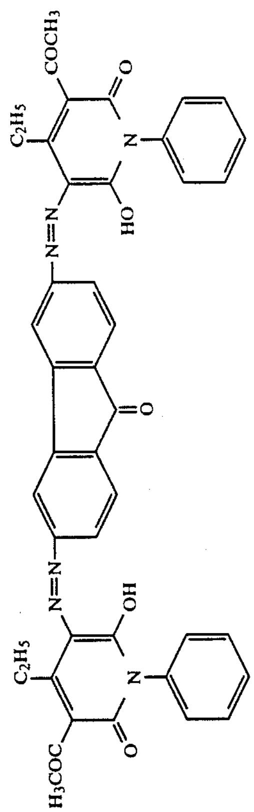
49
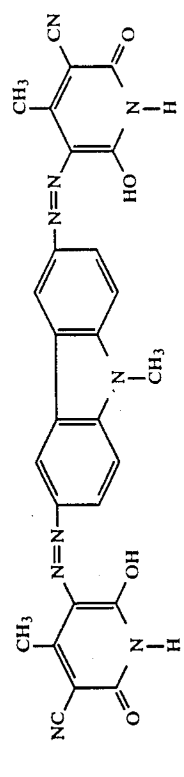
50
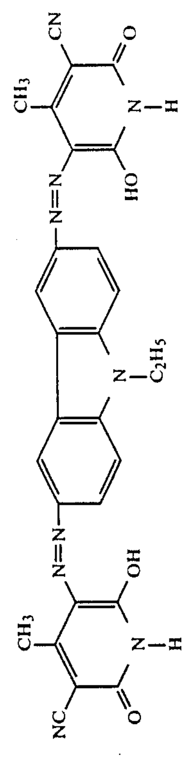

51
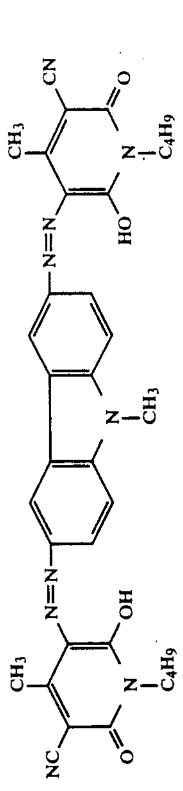
52
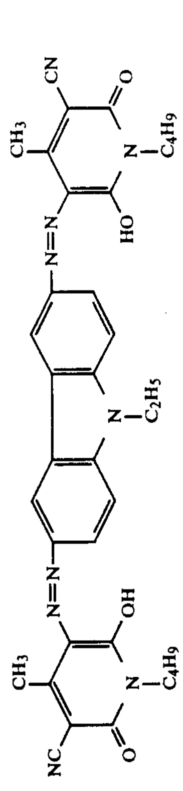
53
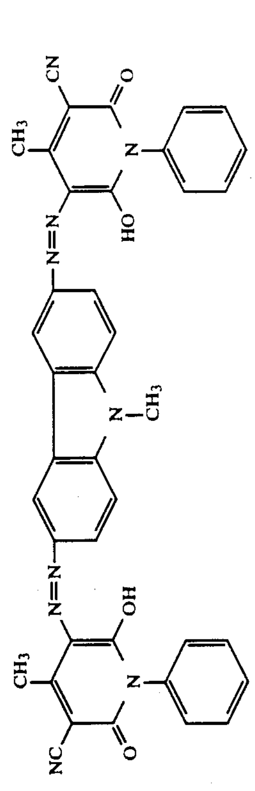
54
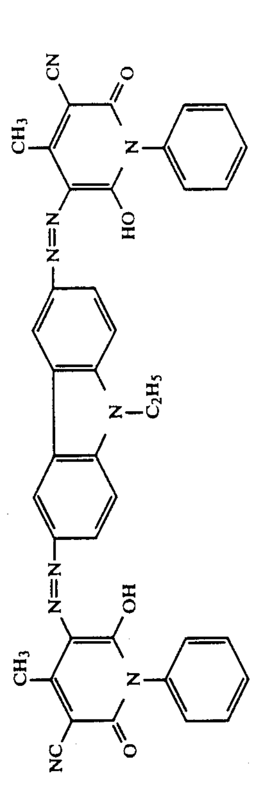
55
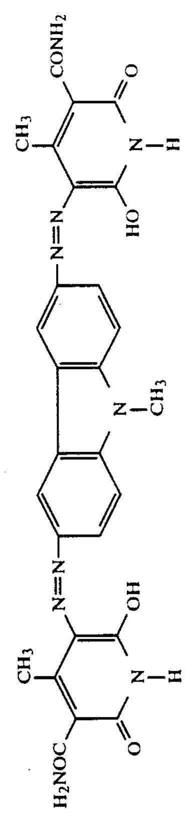

-continued
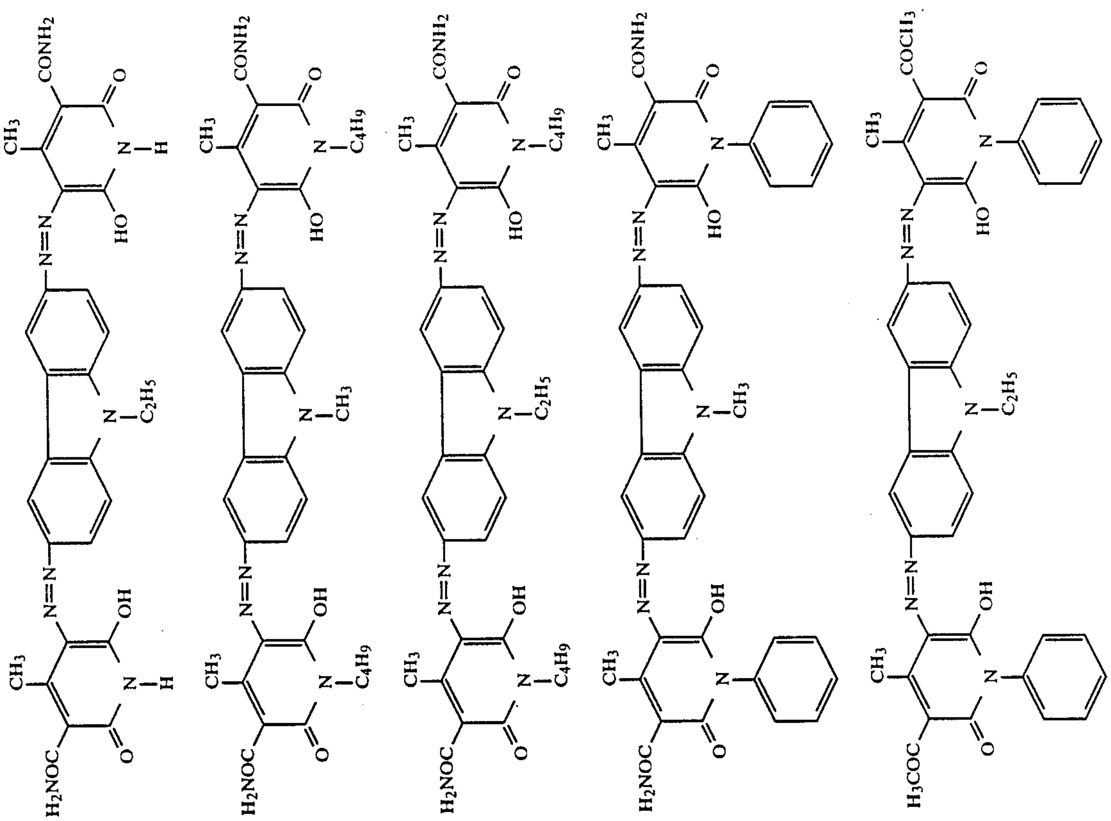

-continued
61
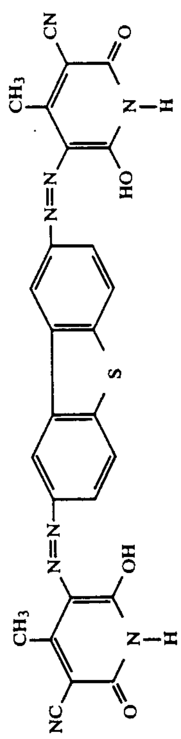
62
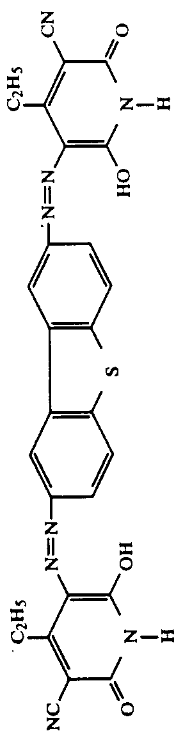
63
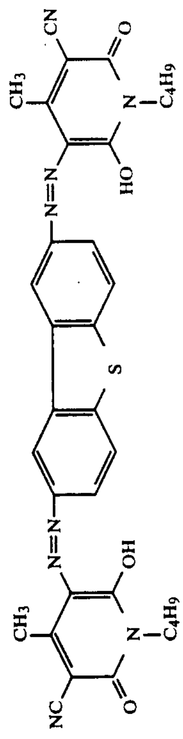
64
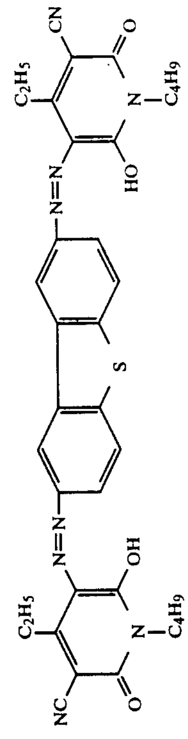
65
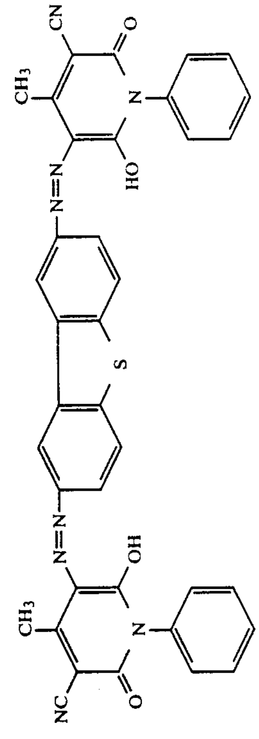

-continued
66
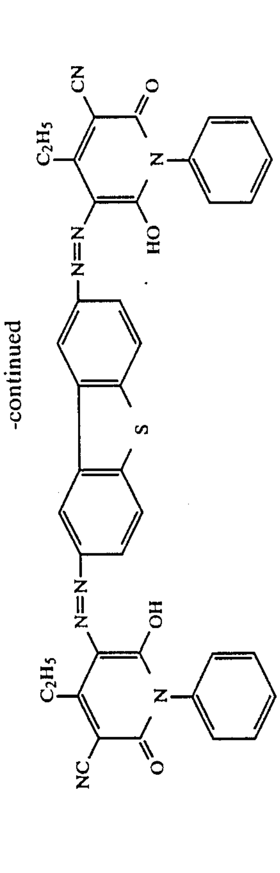
67
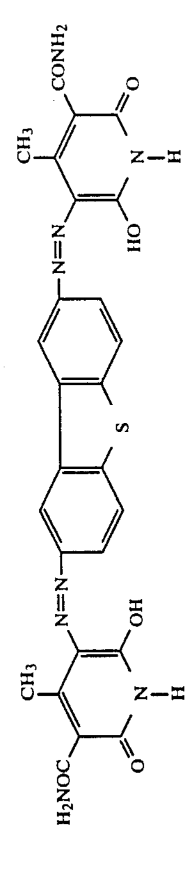
68
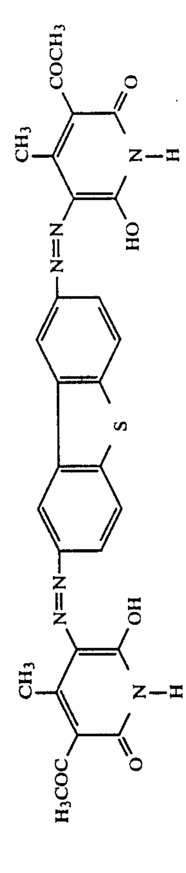
69
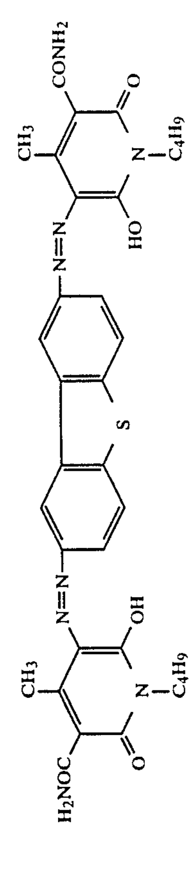
70
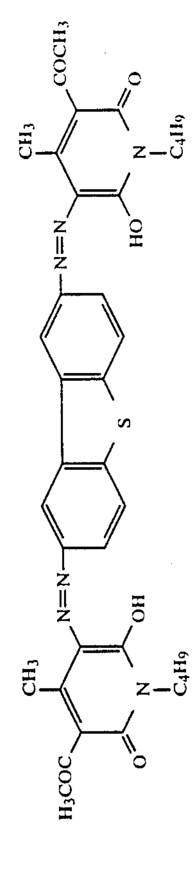

-continued
71
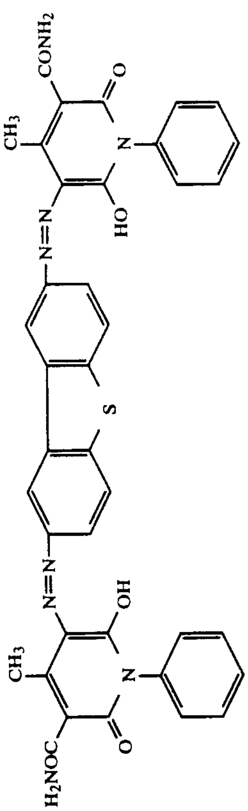
72
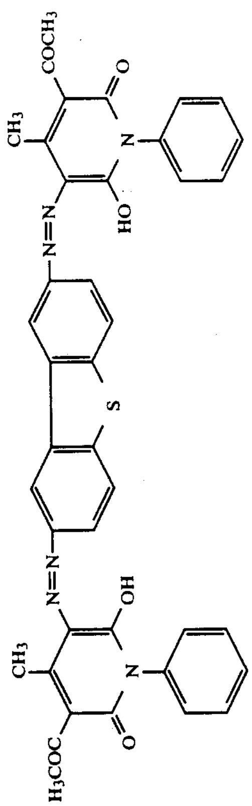
73
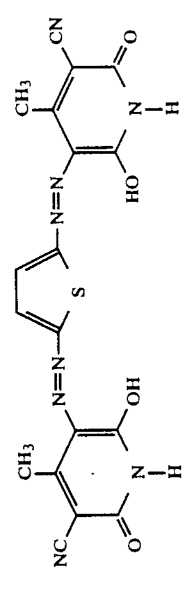
74
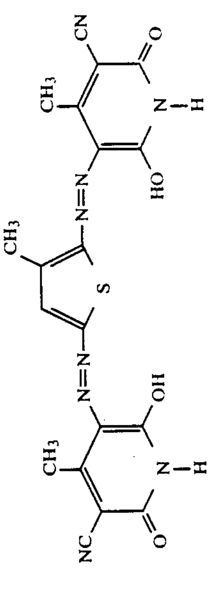

-continued
75
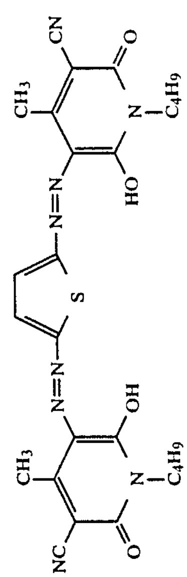
76
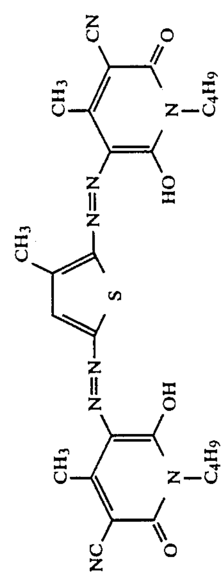
77
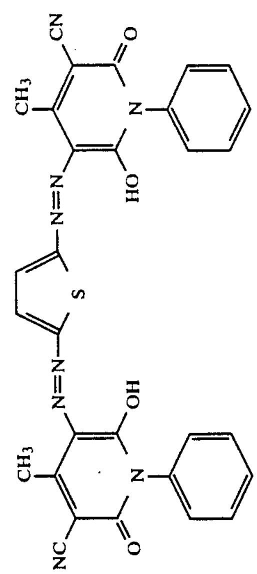
78
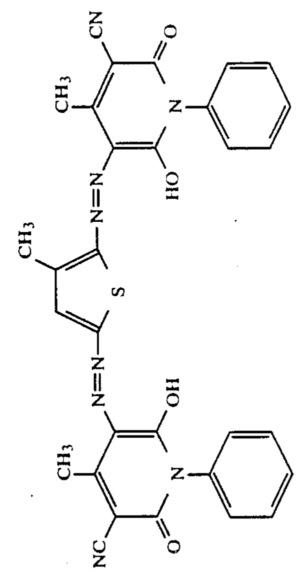

-continued
79
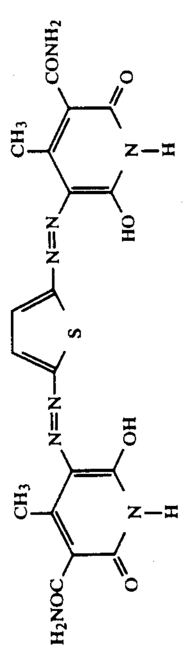
80
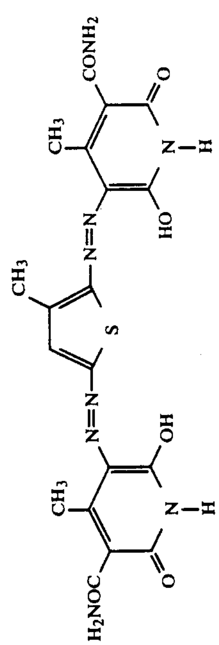
81
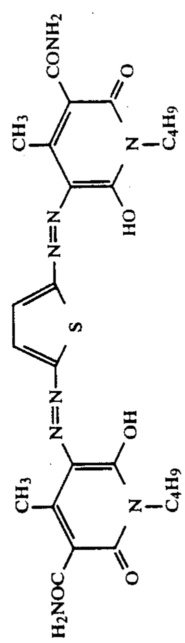
82
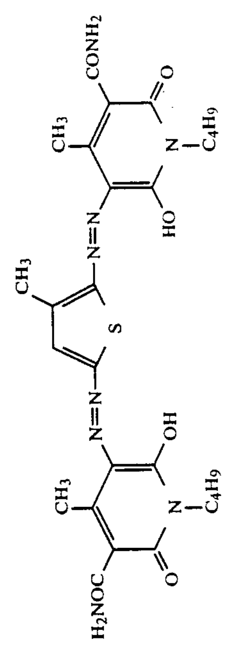

-continued
83
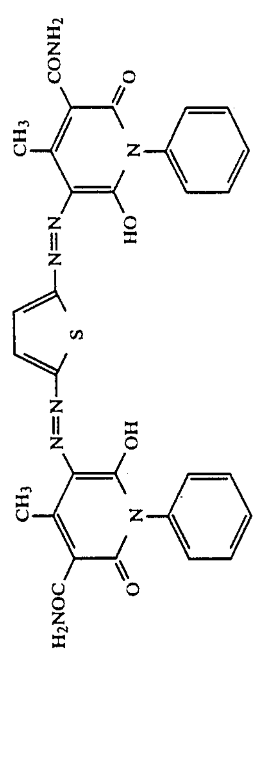
84
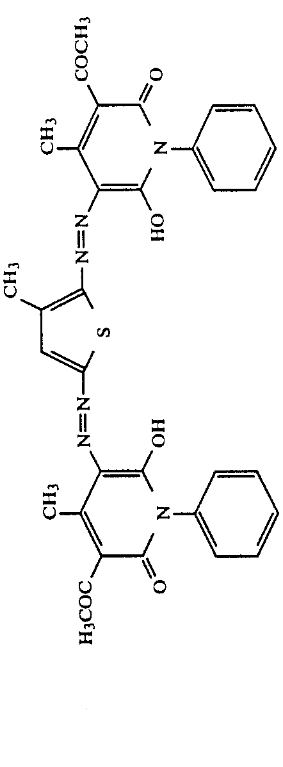
85
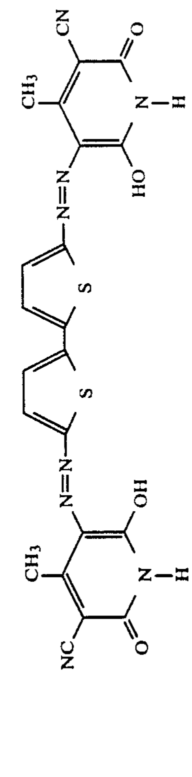
86
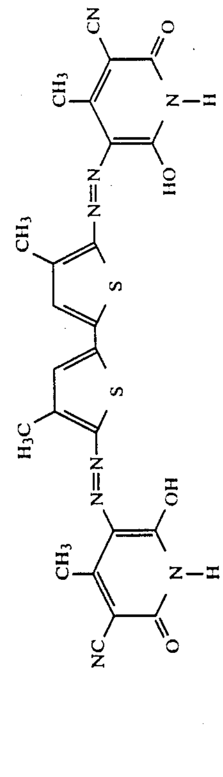

-continued
87
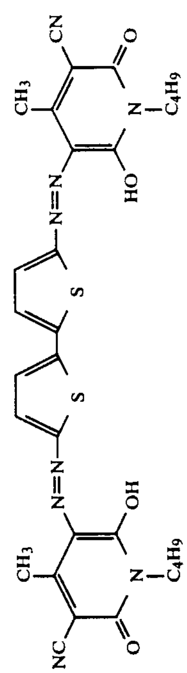
88
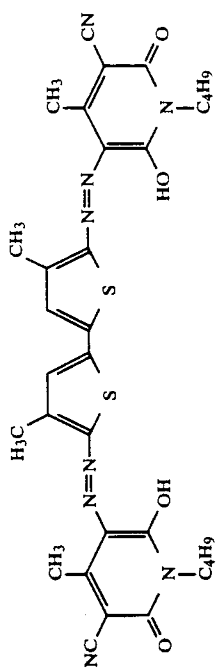
89
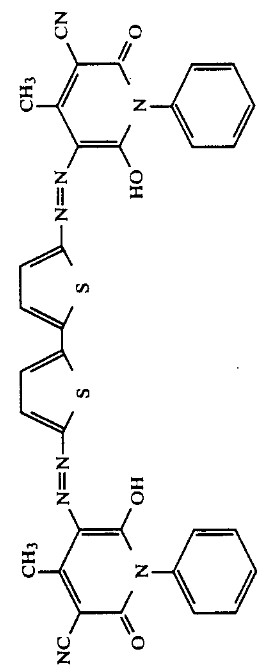
90
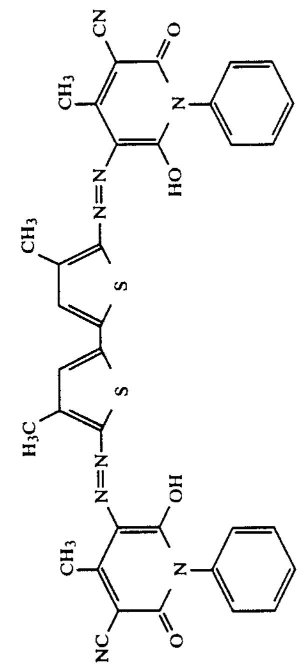

-continued
91
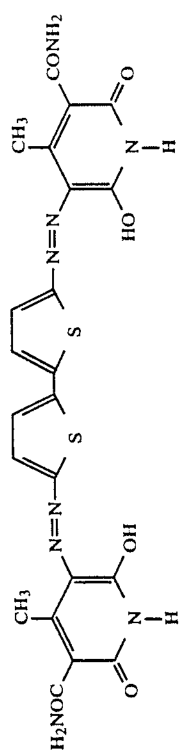
92
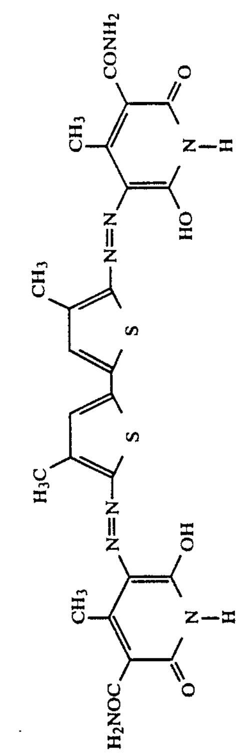
93
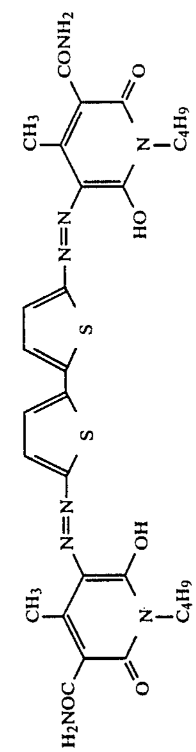
94
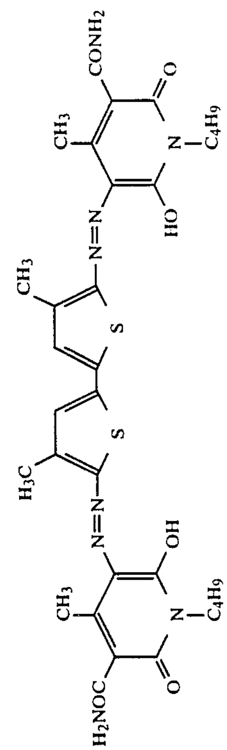

-continued
95
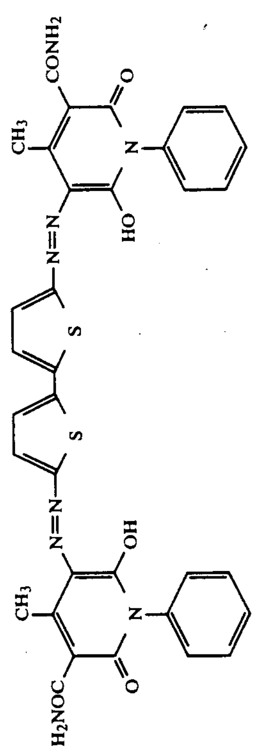
96
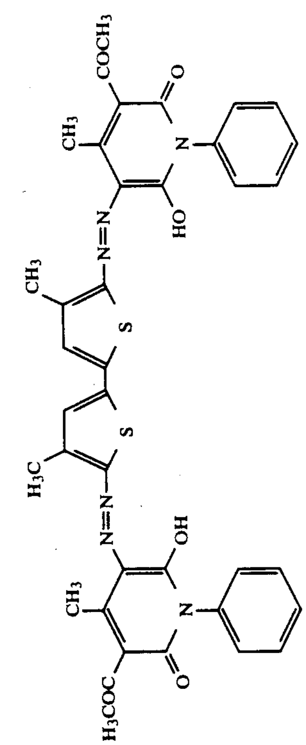
97
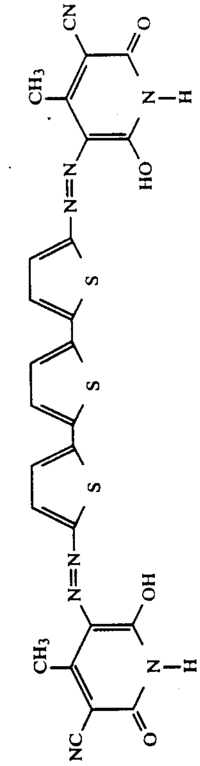
98
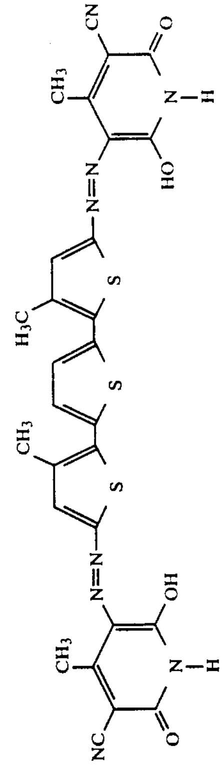

-continued
99
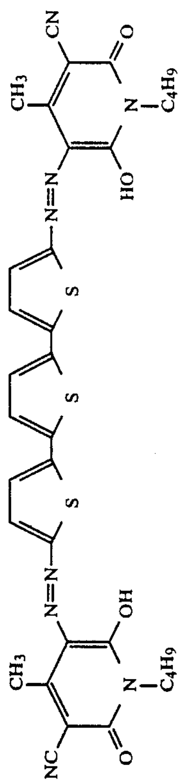
100
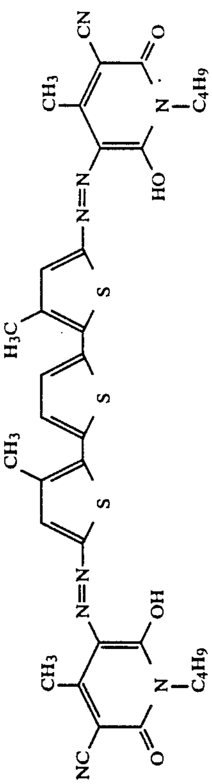
101
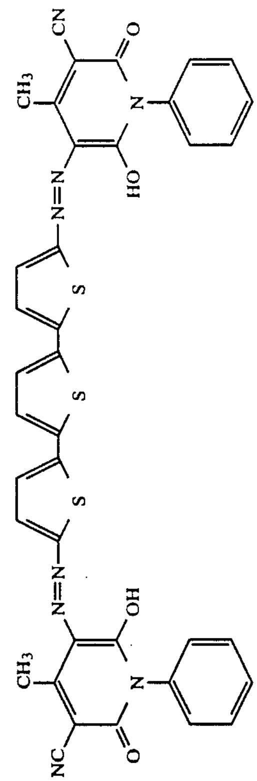

102
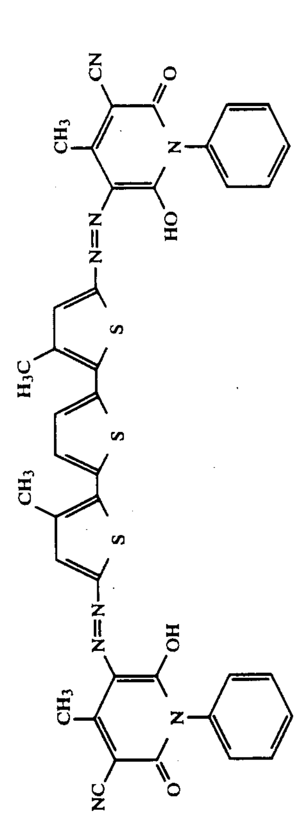
103
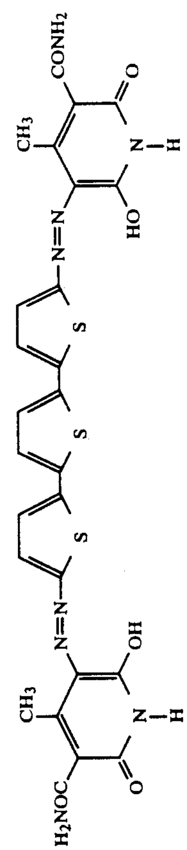
104
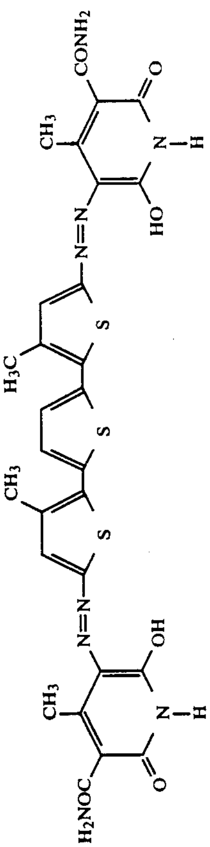

-continued
105
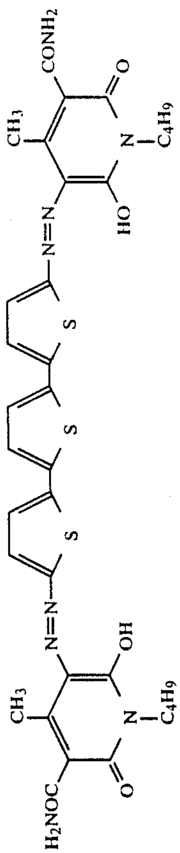
106
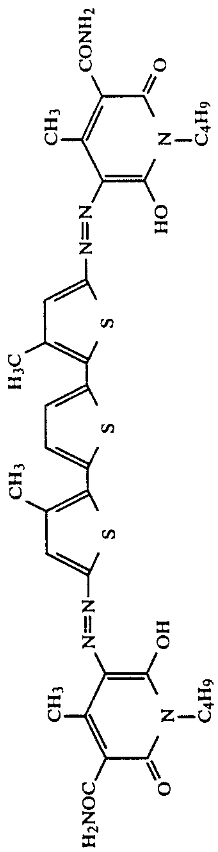
107
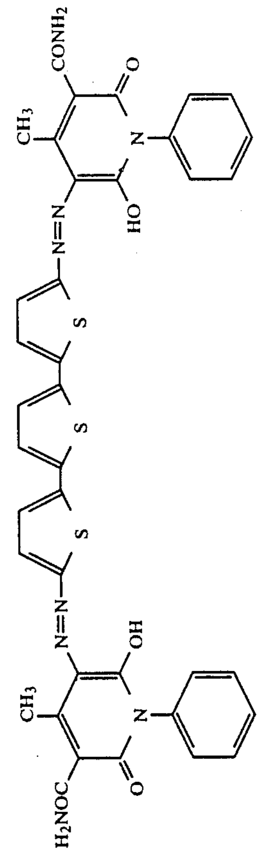
108
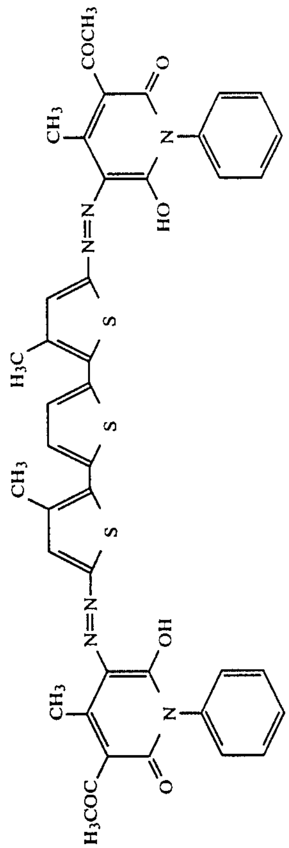

-continued
109
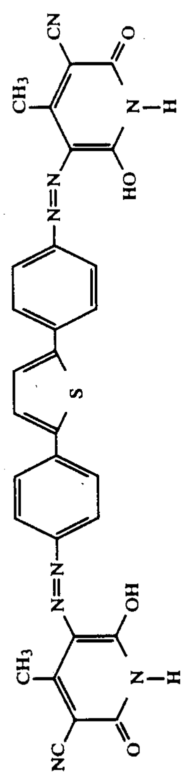
110
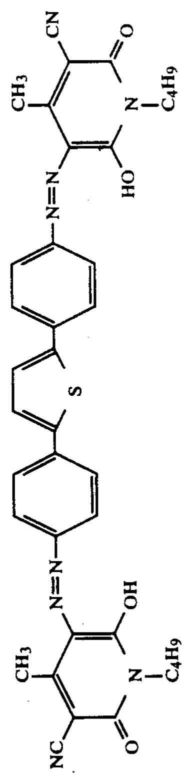
111
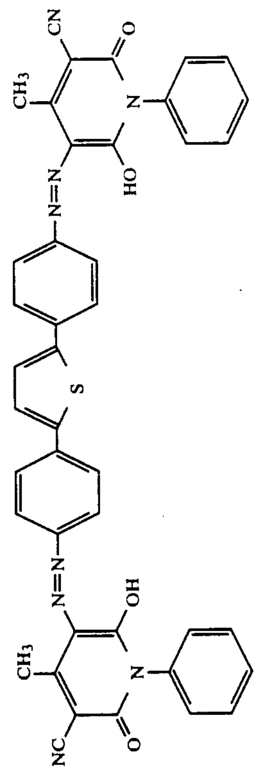
112
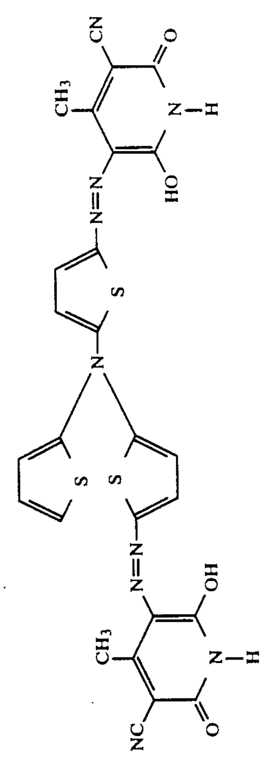

-continued
113
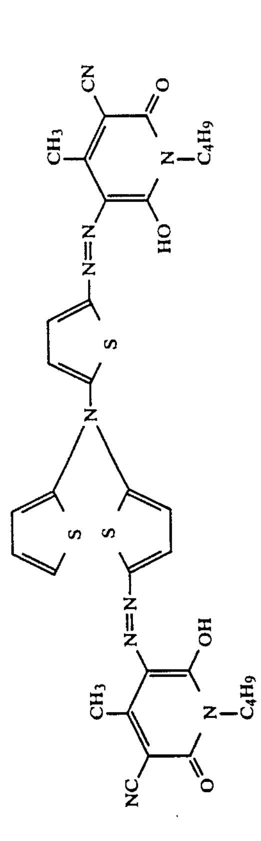
114
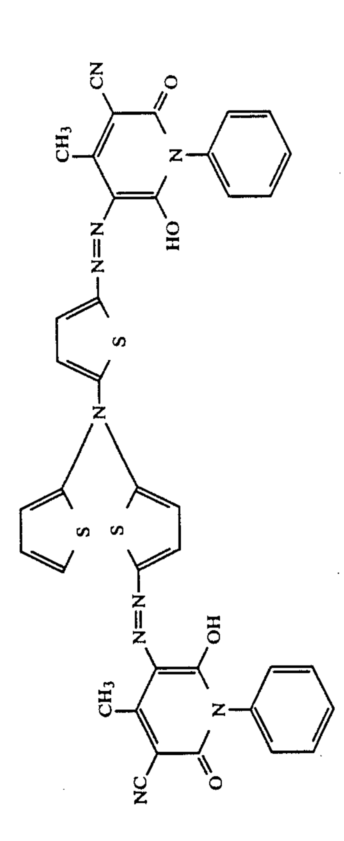
115
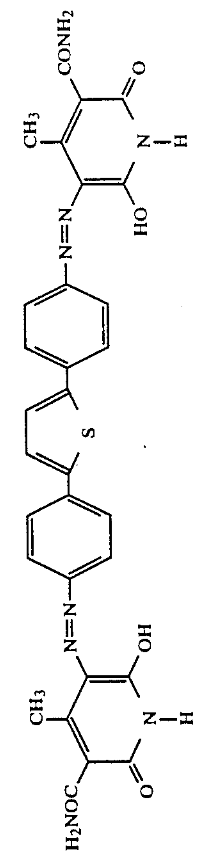
116
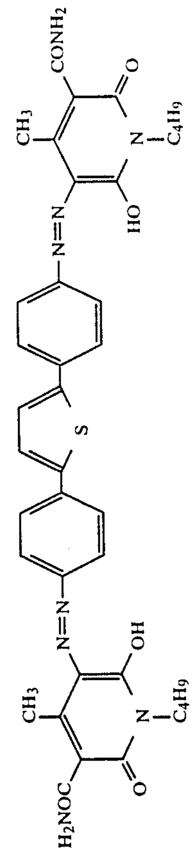

-continued
117
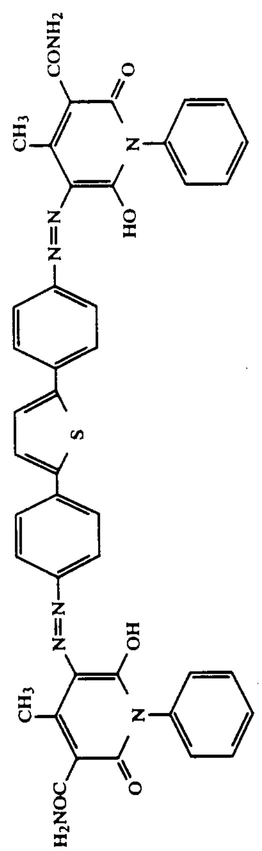
118
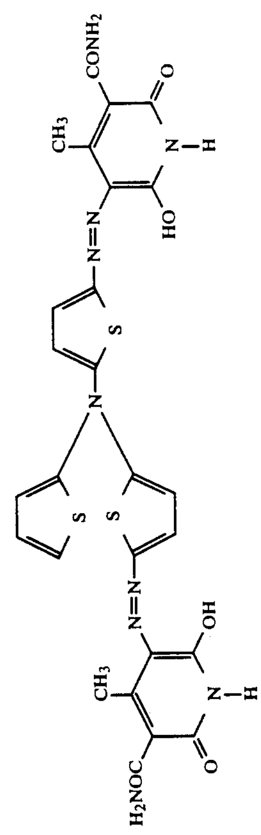
119
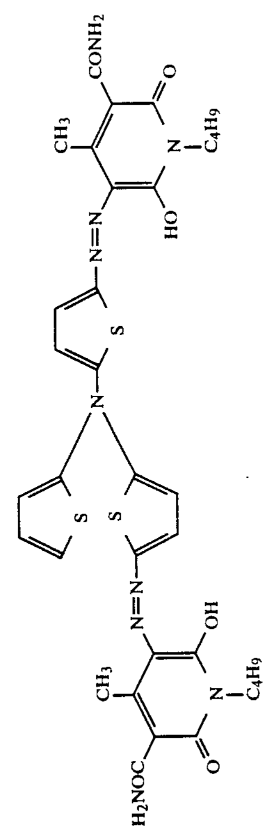

-continued
120
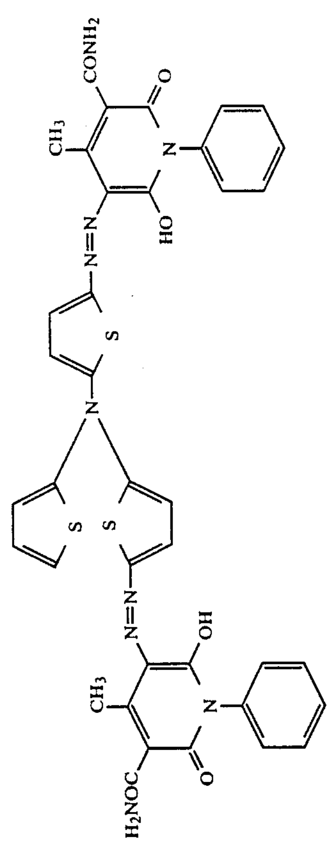
121
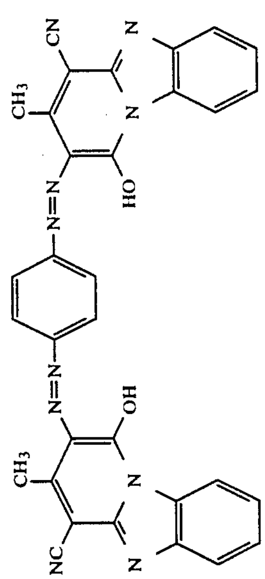
122
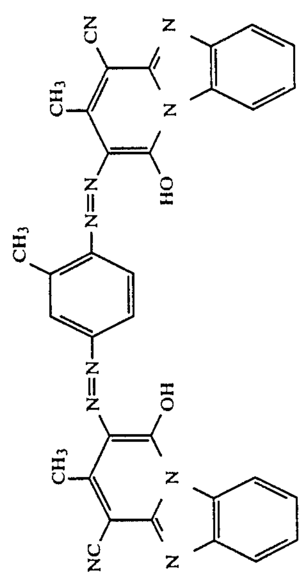

-continued
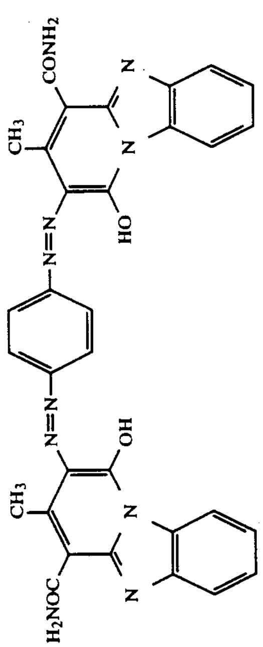
123
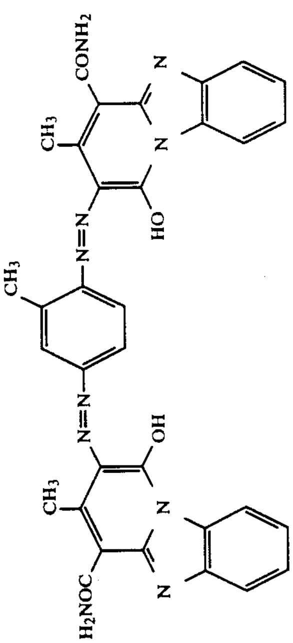
124
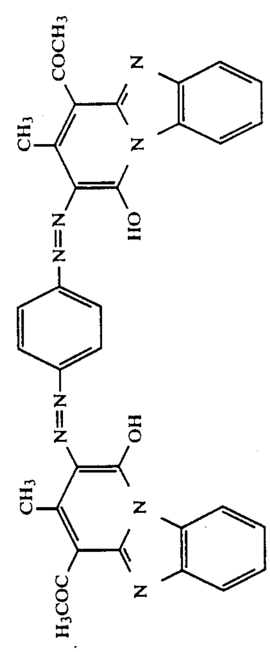
125

-continued
126
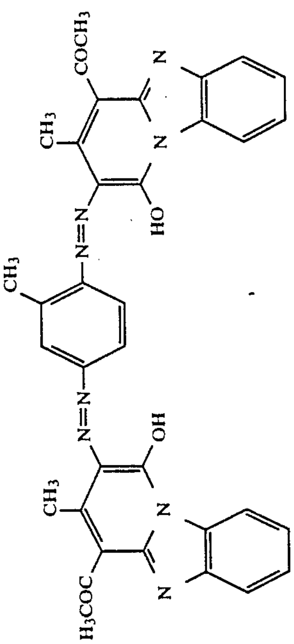
127
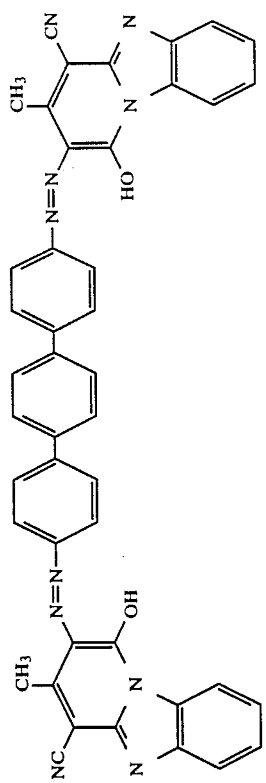
128
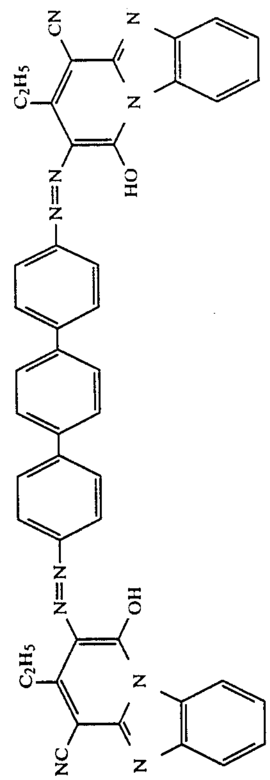

-continued
129
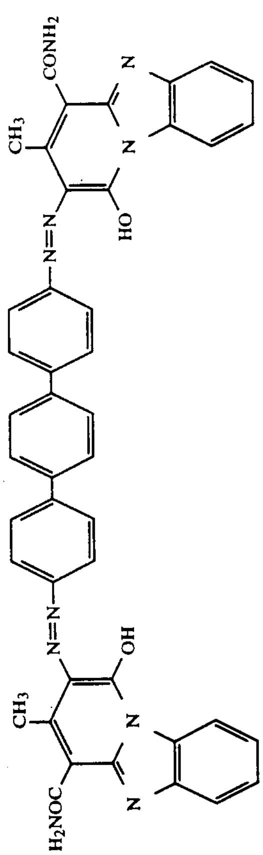
130
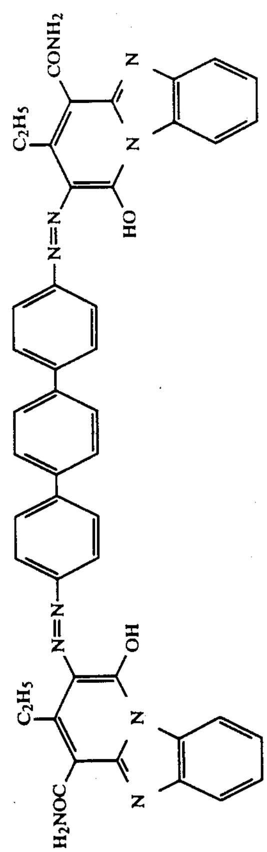
131
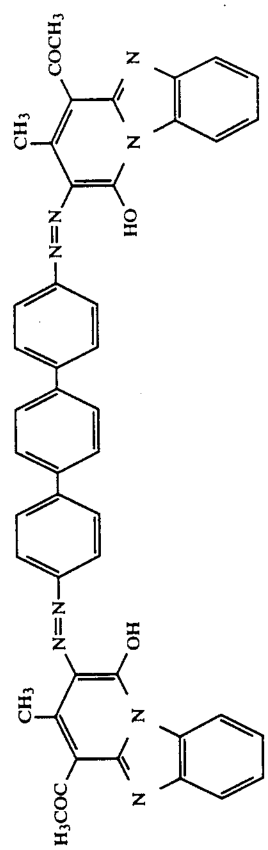
132
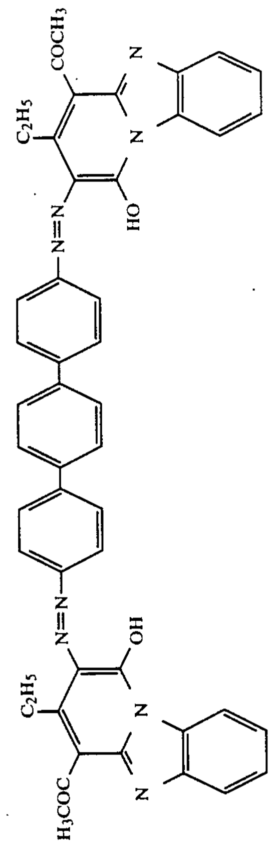

-continued
133
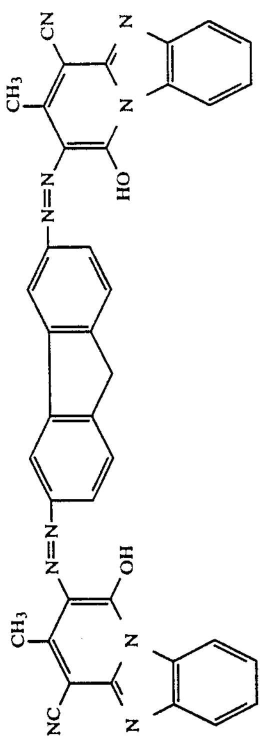
134
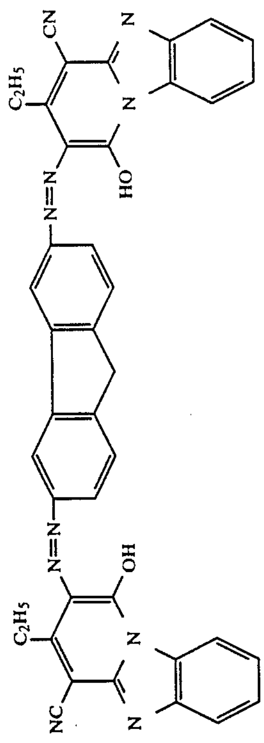
135
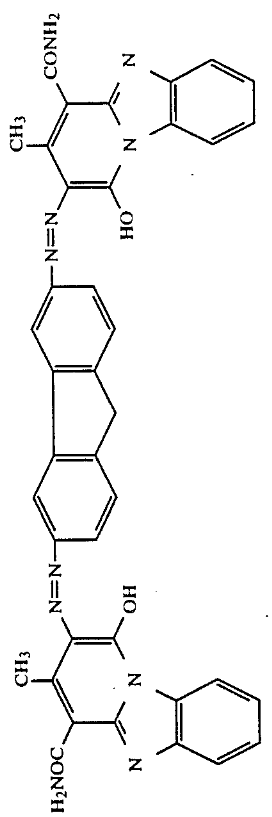
136
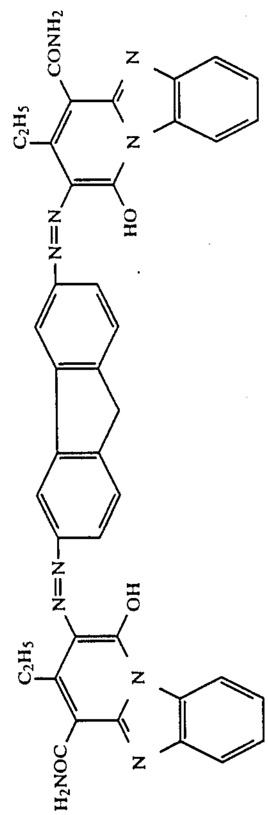

-continued
137
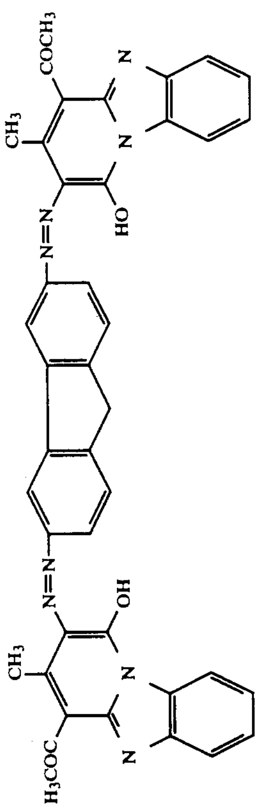
138
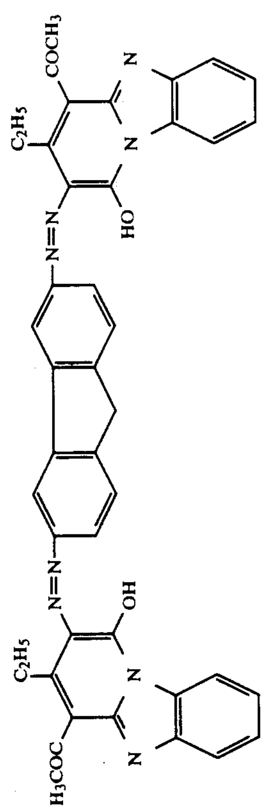
139
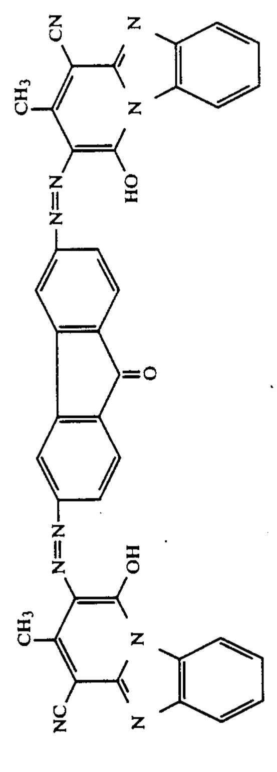
140
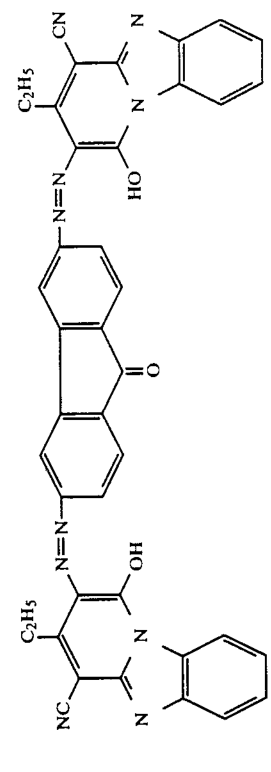

-continued
141
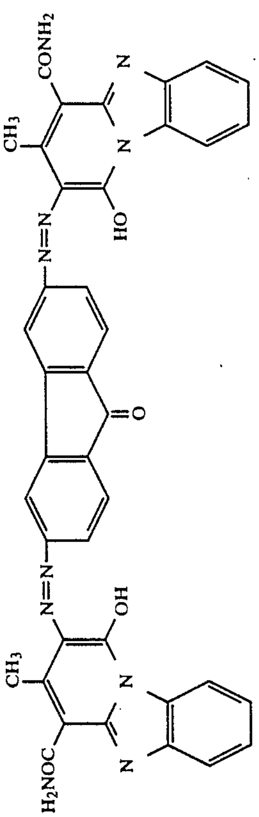
142
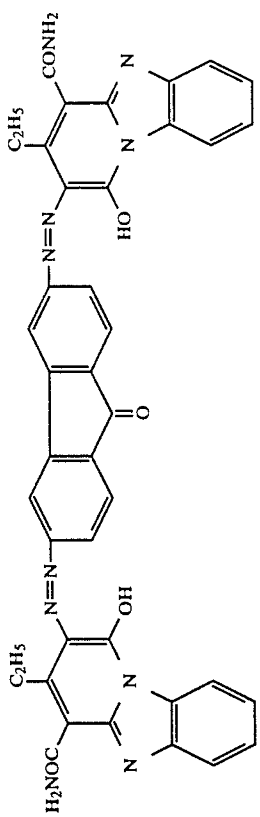
143
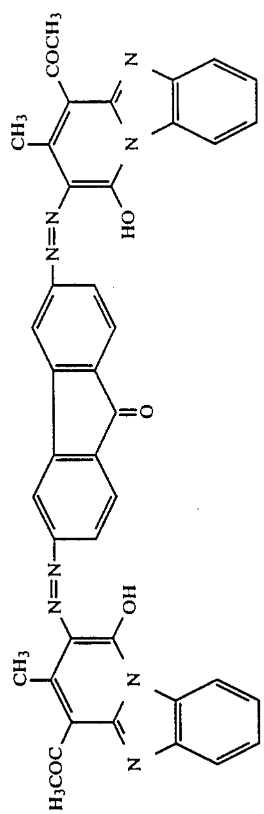
144
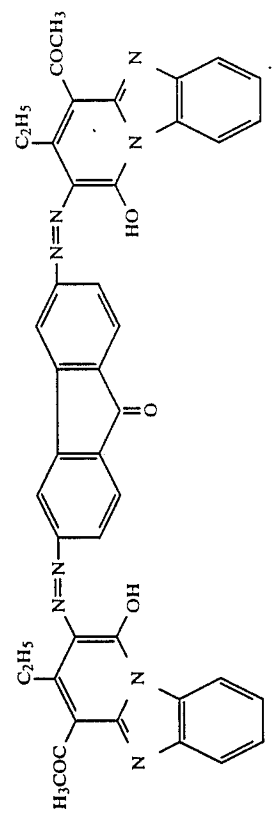

-continued
145
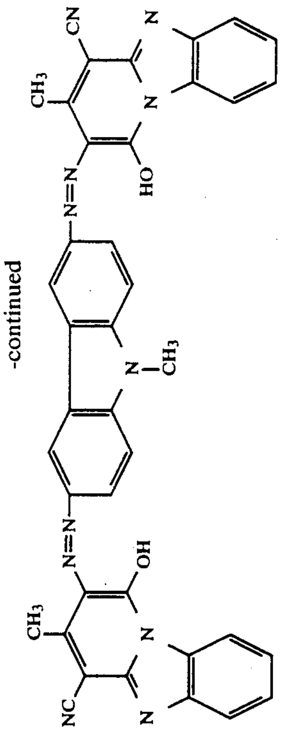
146
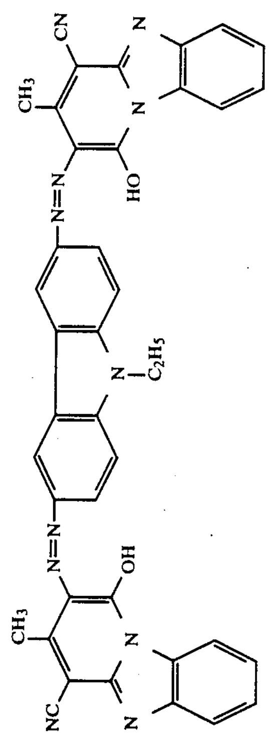

147
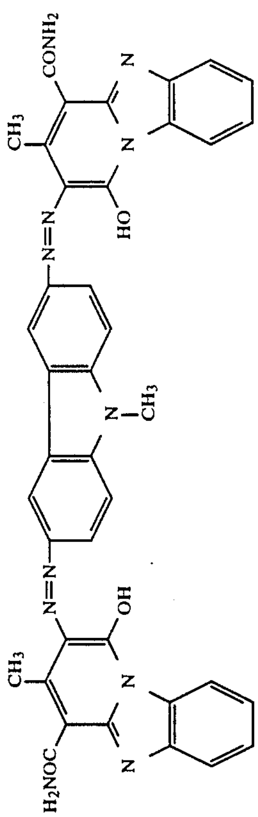
148
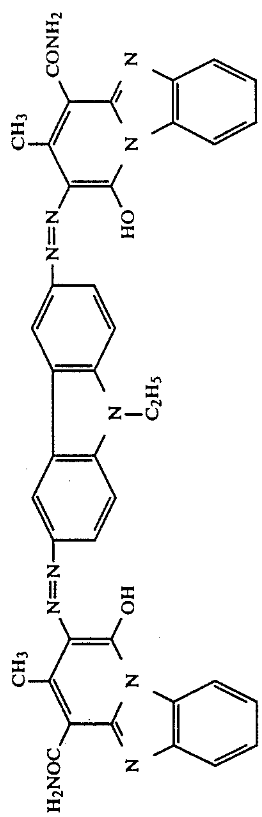
149
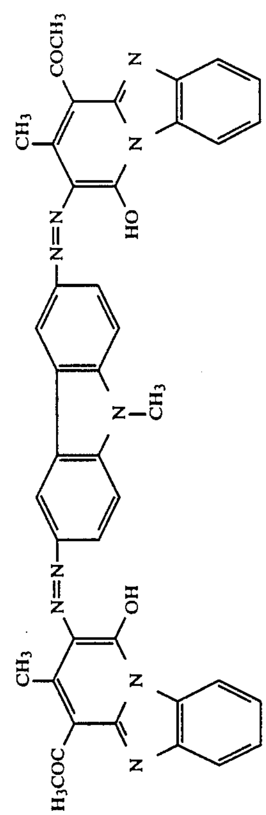

-continued
150
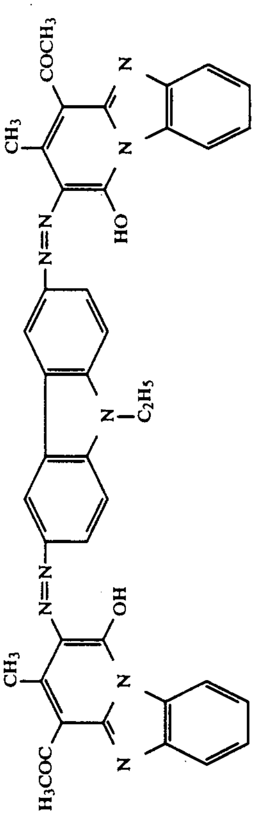
151
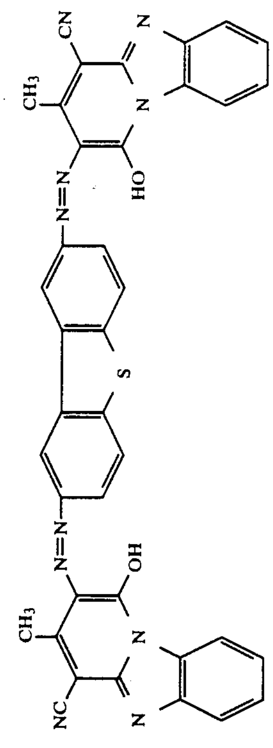

152
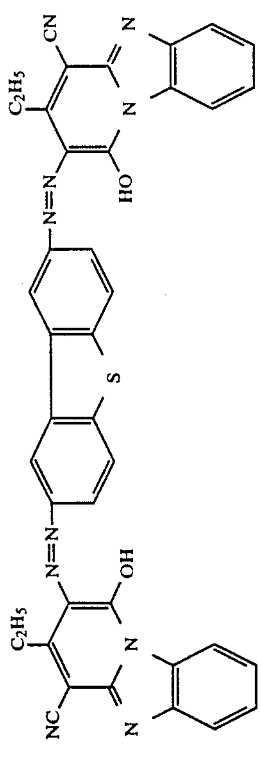
153
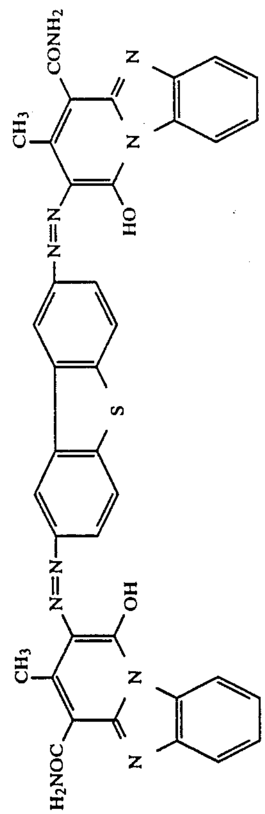
154
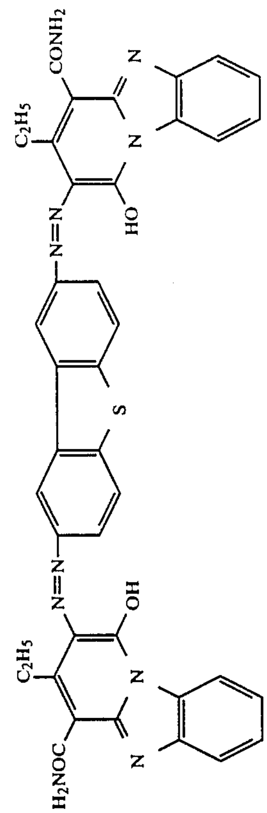

-continued
155
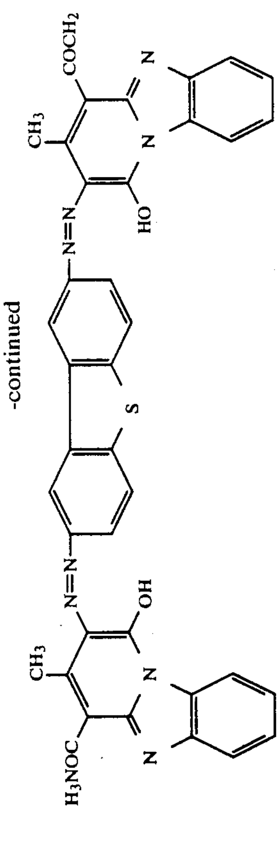
156
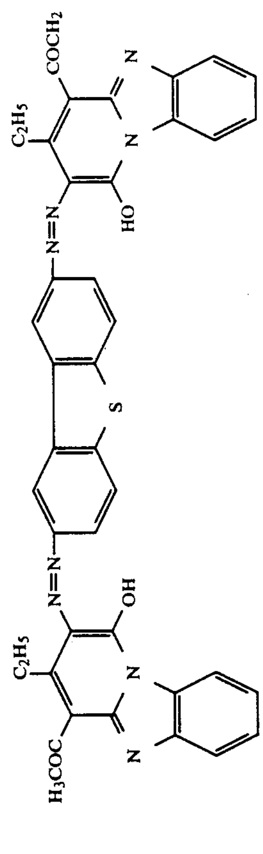
157
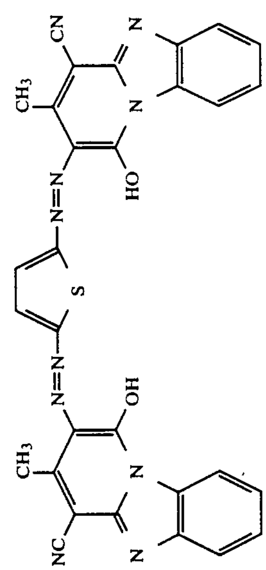
158
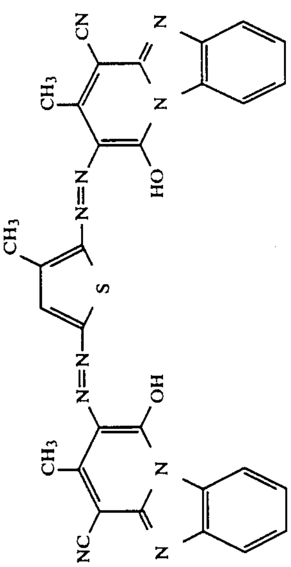

-continued
159
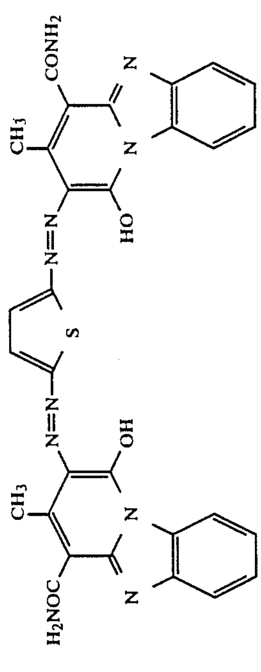
160
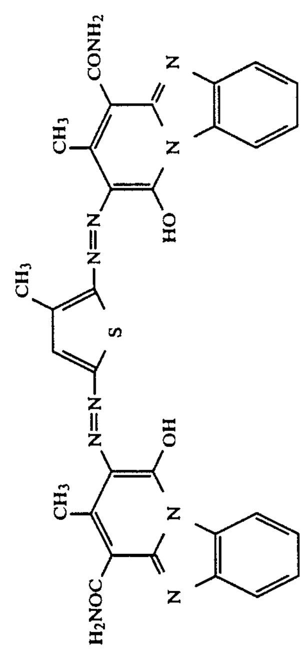
161
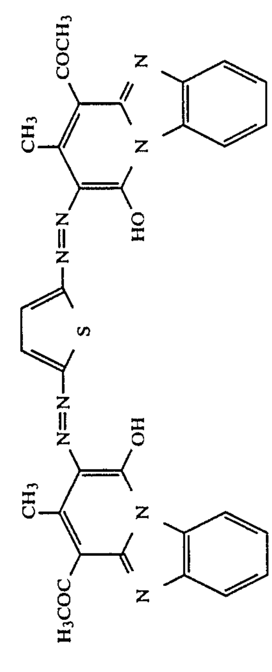

-continued
162
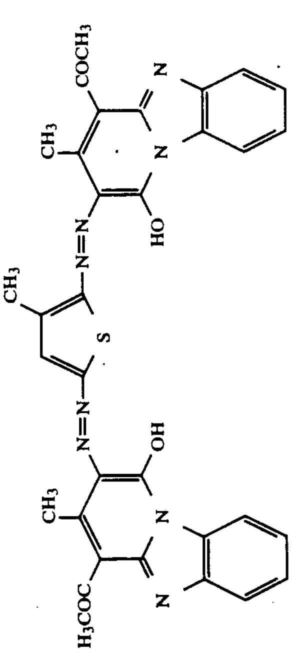
163
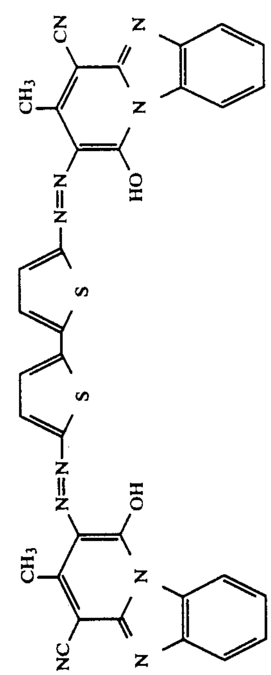
164
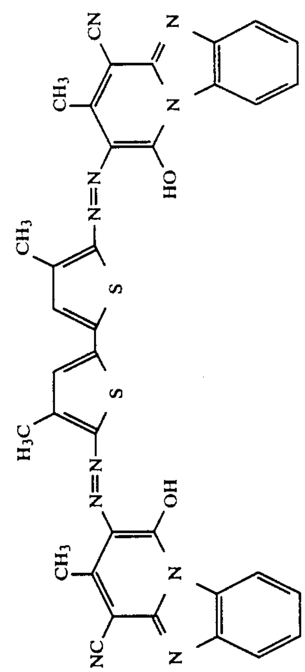

-continued
165
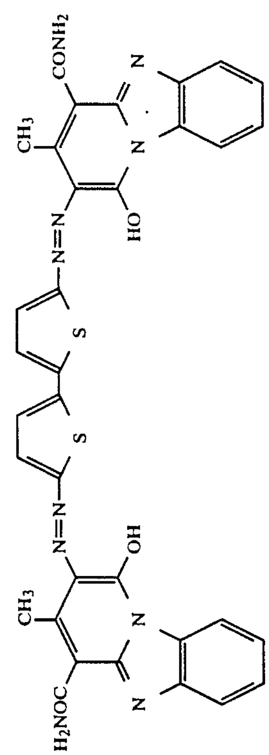
166
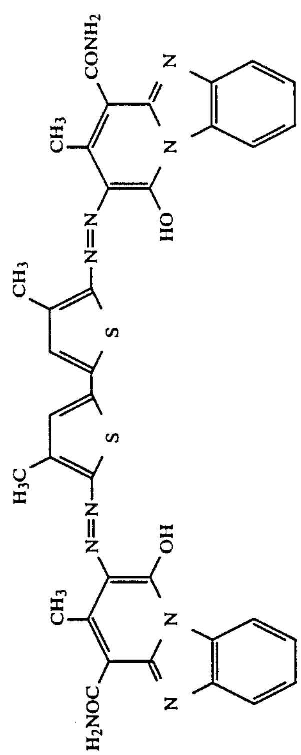
167
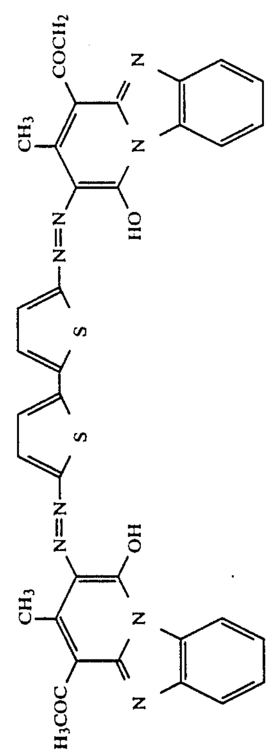

-continued
168
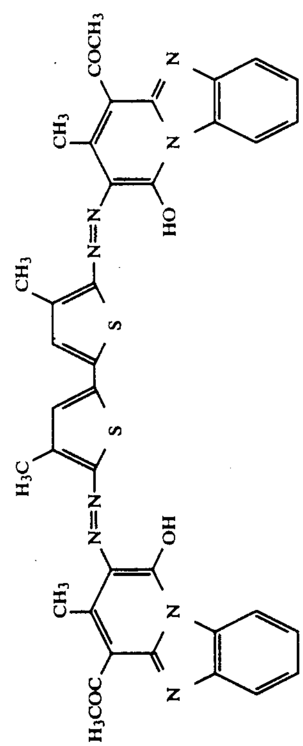
169
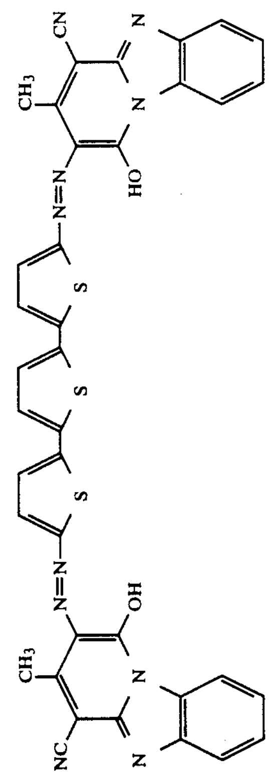
170
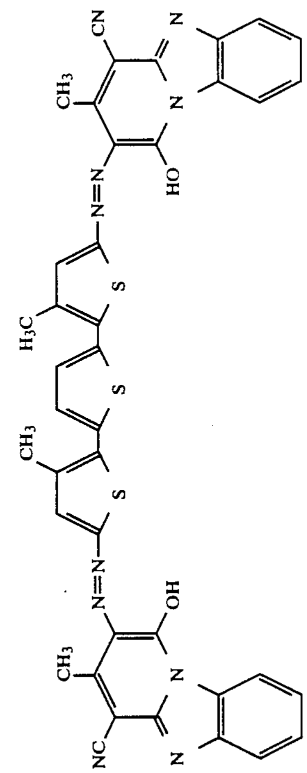

-continued
171
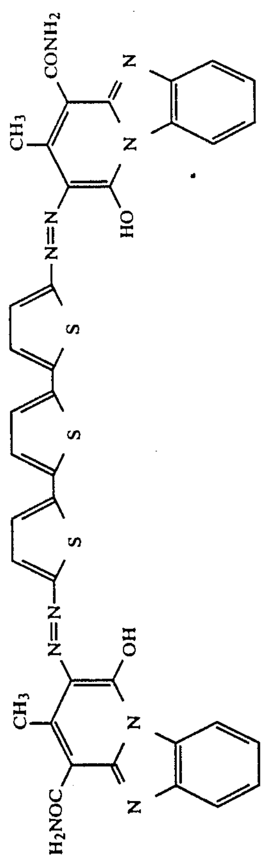
172
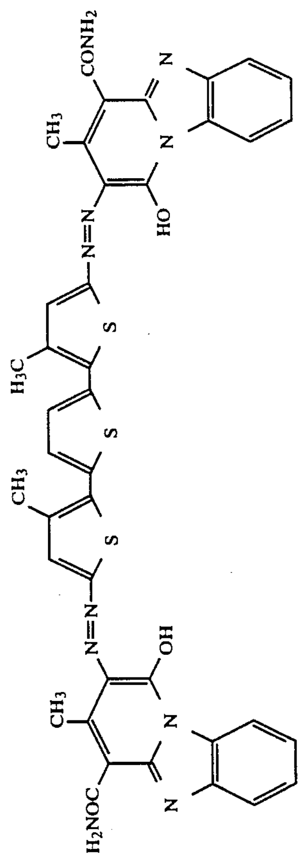
173
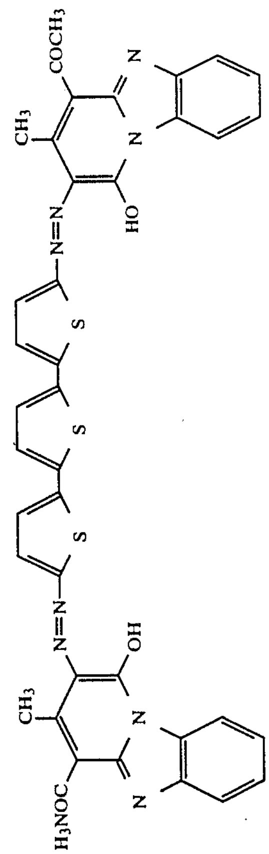

-continued
174
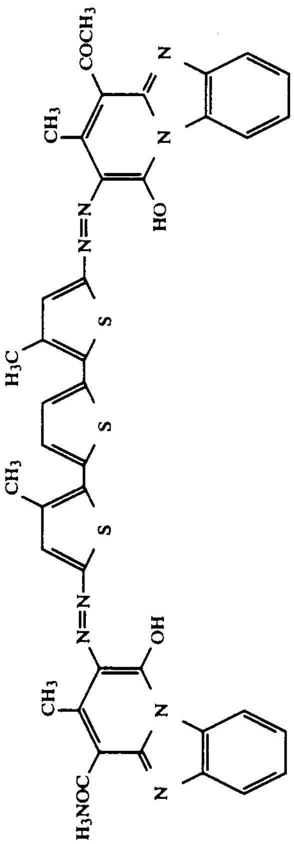
175
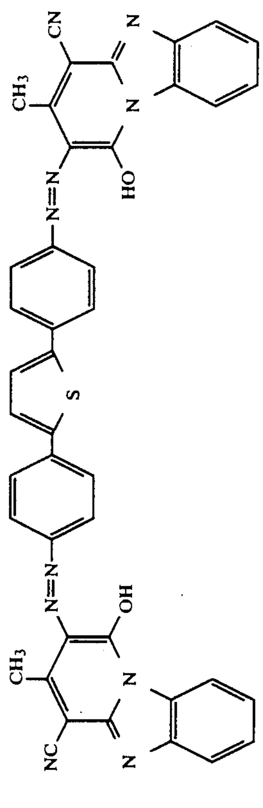
176
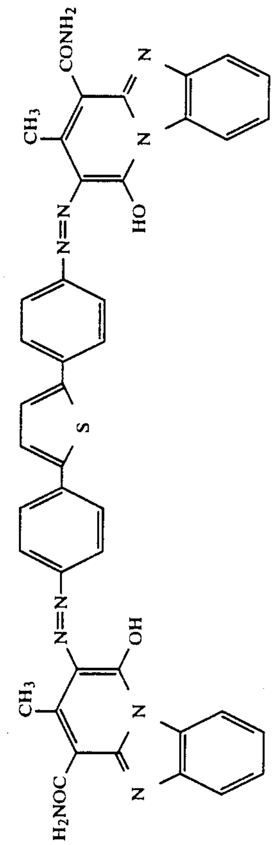

-continued
177
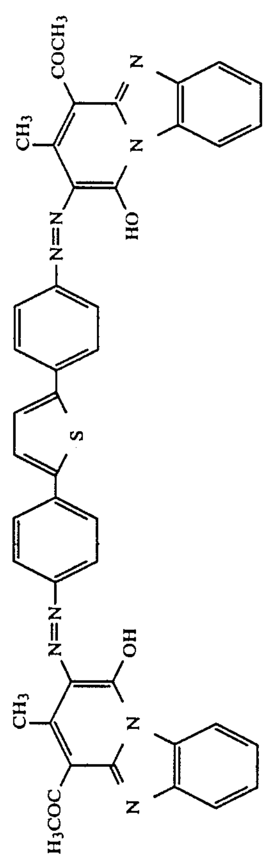
178
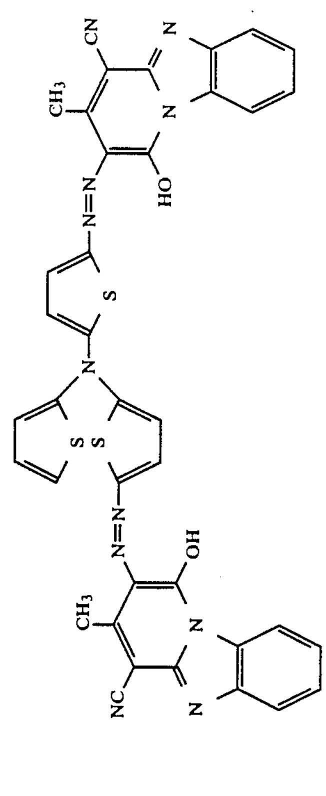
179
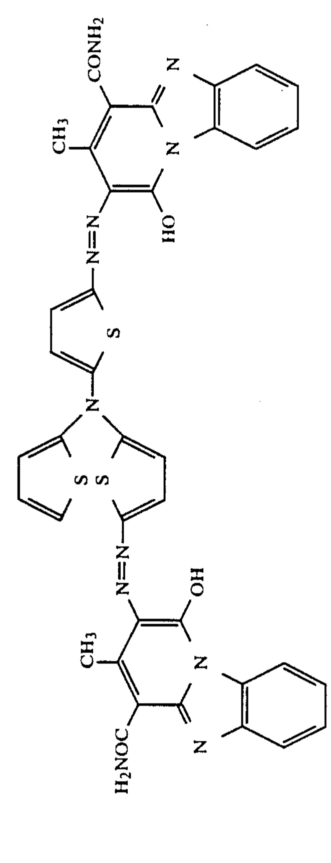

-continued
180
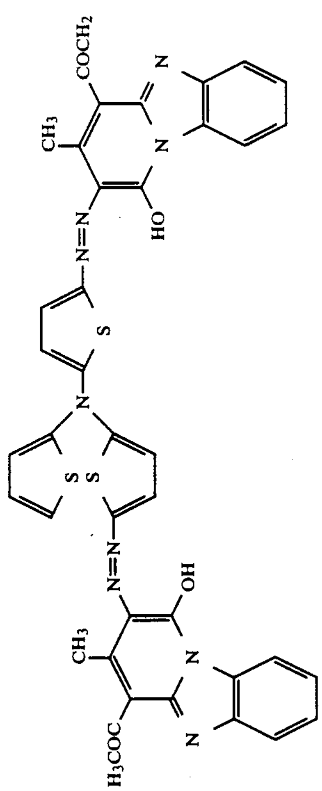
181
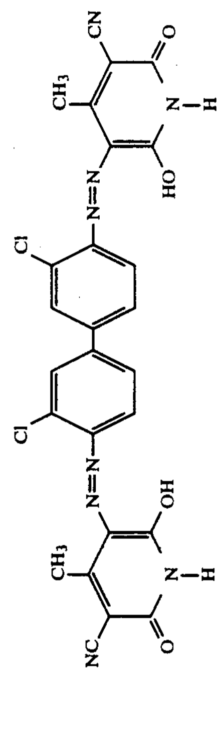
182
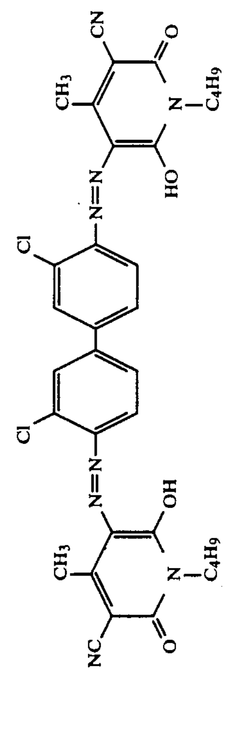
183
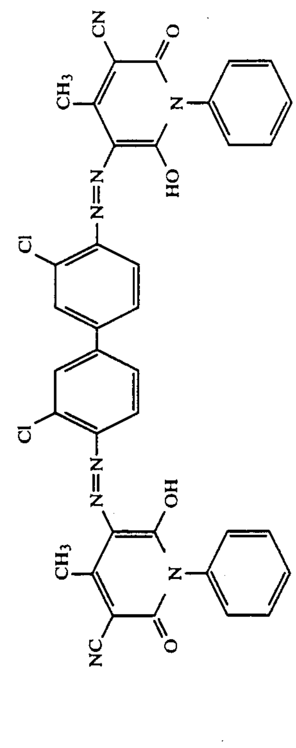

-continued
184
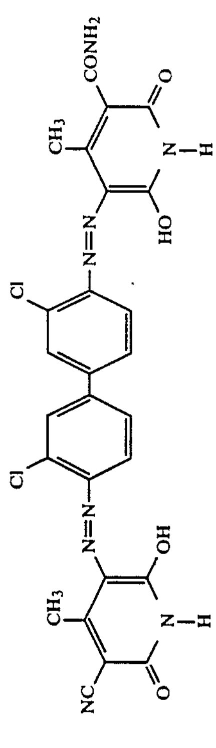
185
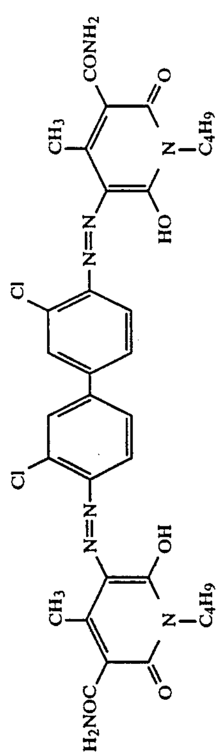
186
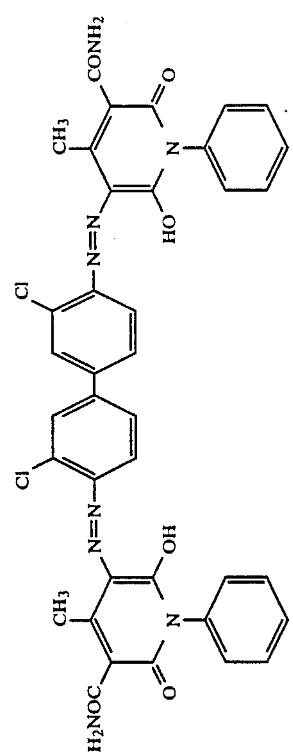
187
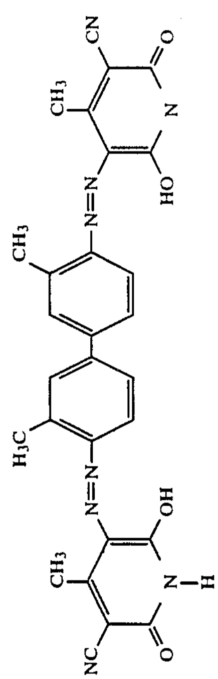

-continued
188
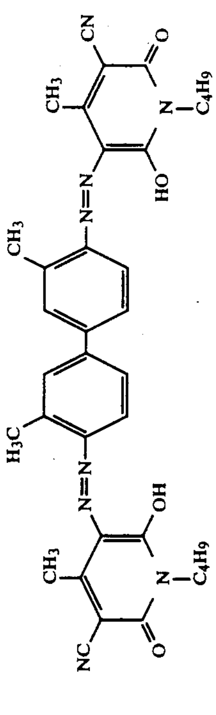
189
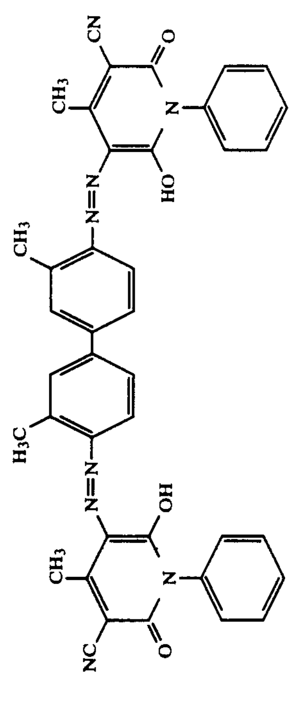
190
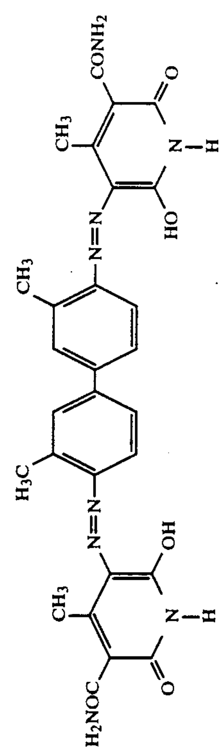
191
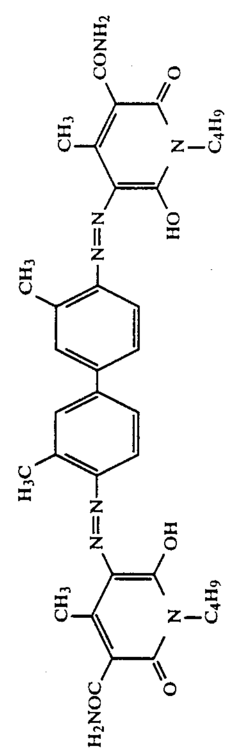

-continued
192
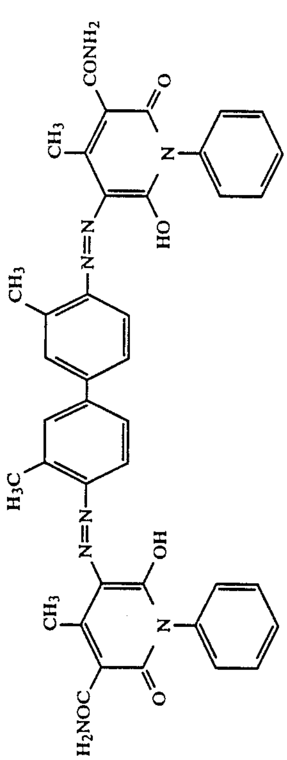
193
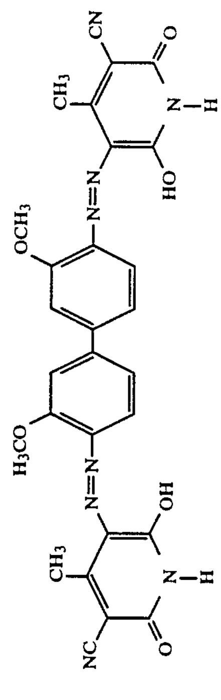
194
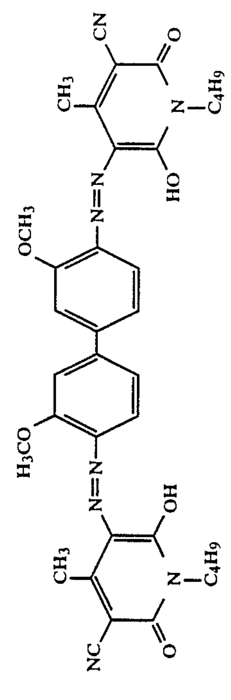
195
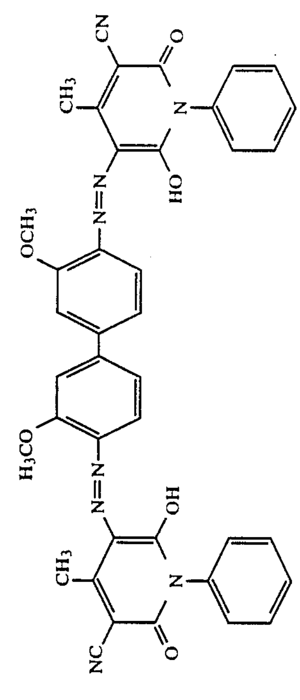

-continued
196
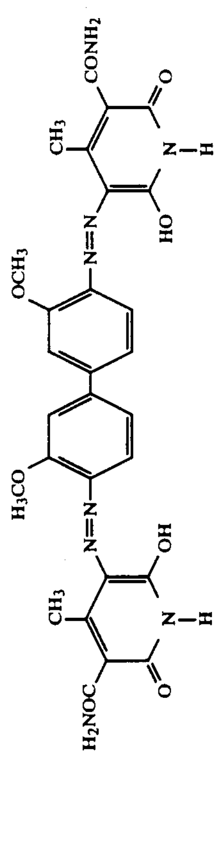
197
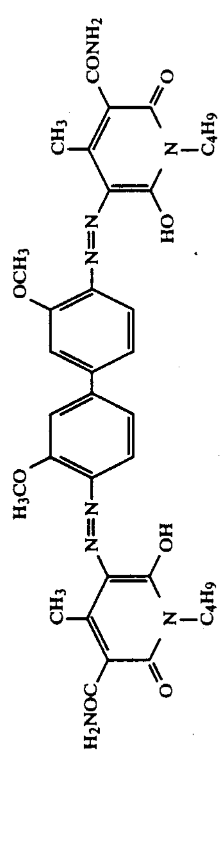
198
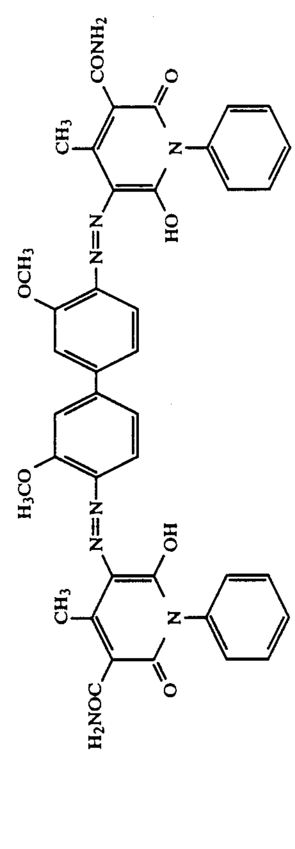
199
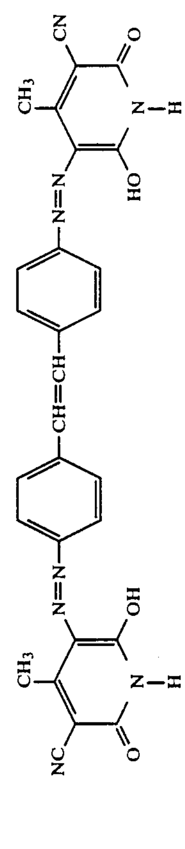

-continued
200
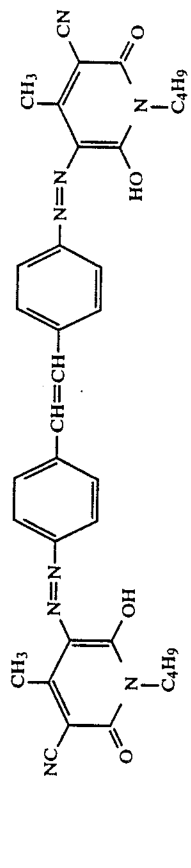
201
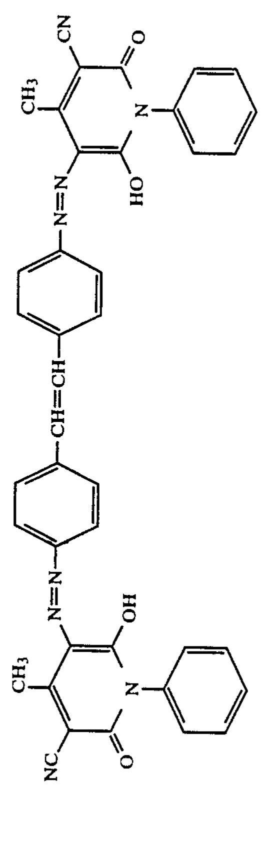
202
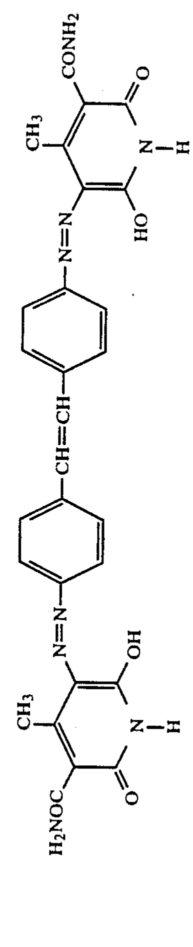
203
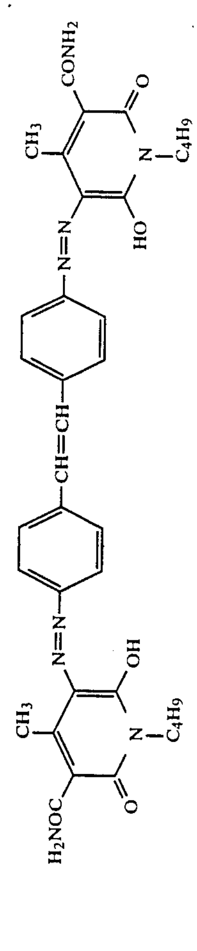

204
205
206
-continued
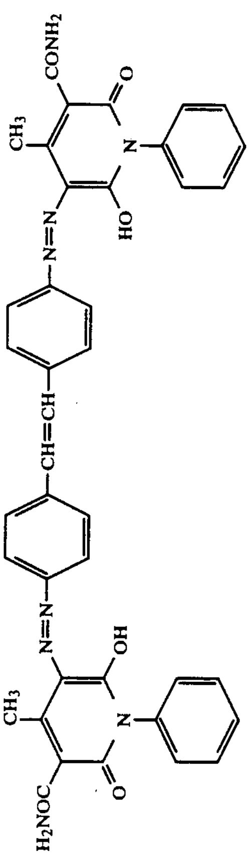
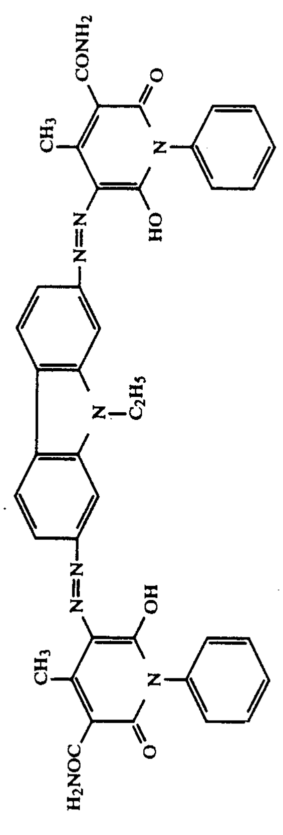
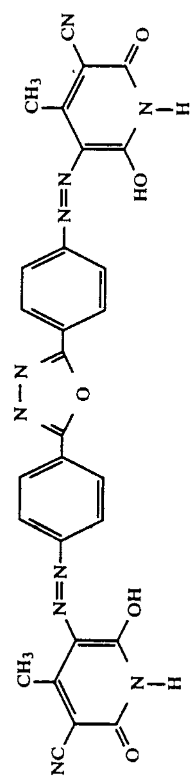

207
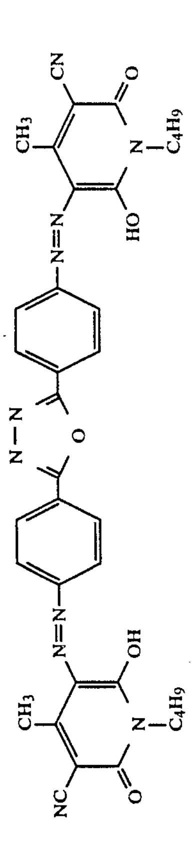
208
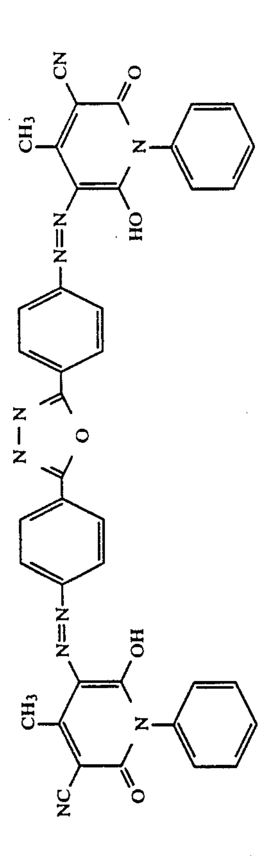
209
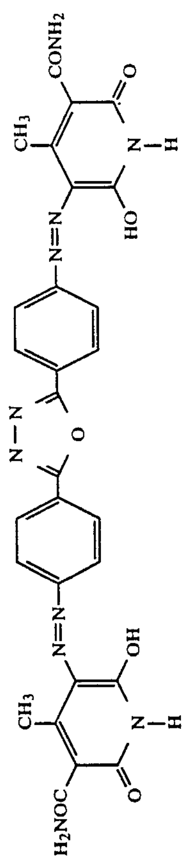
210
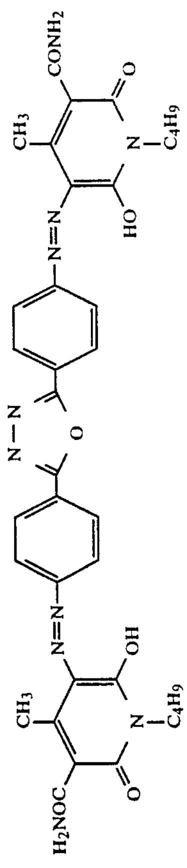

-continued
211
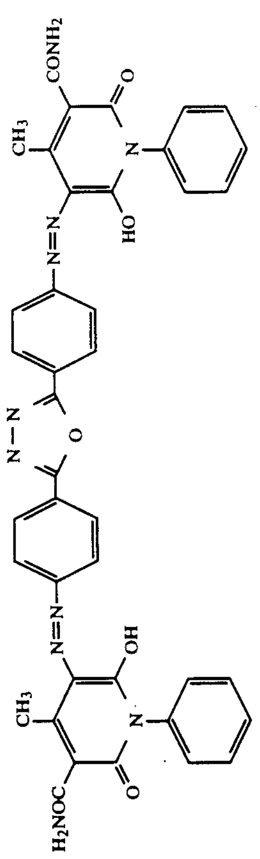
212
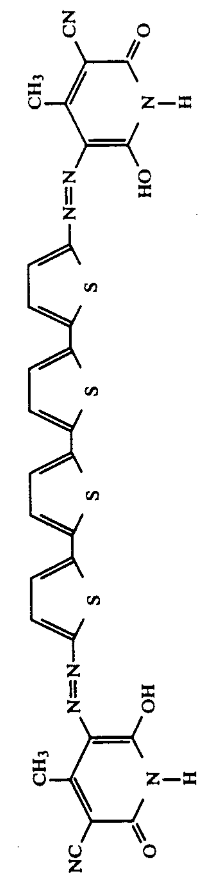
213
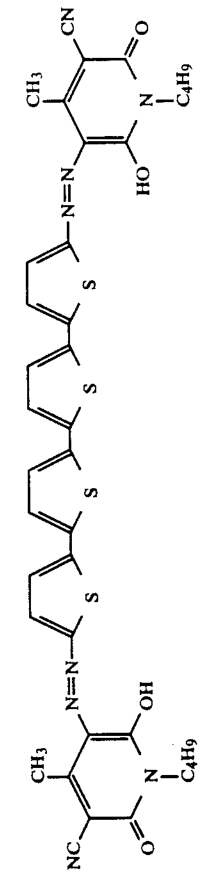
214
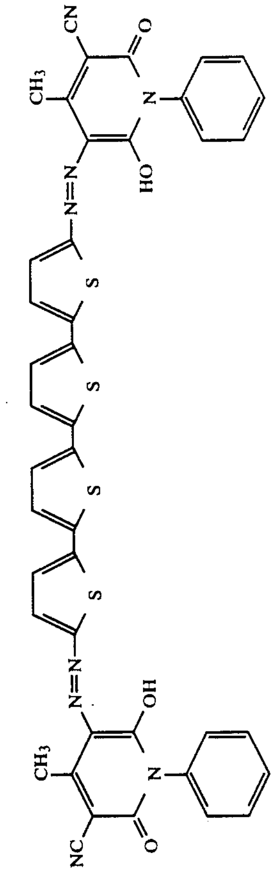

-continued
215
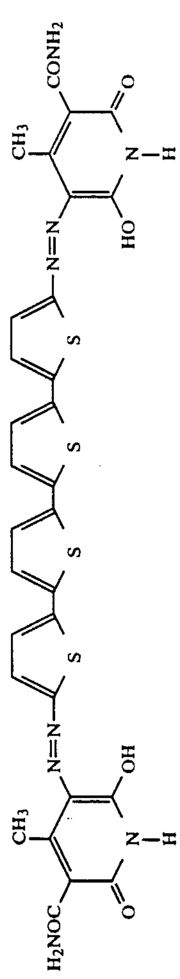
216
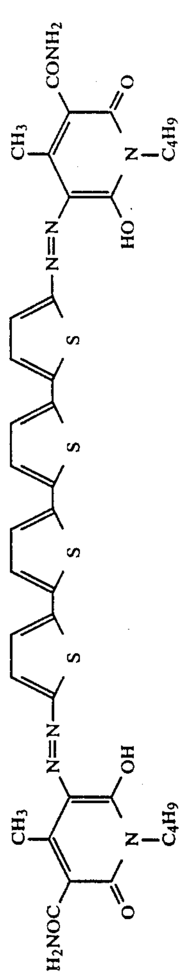
217
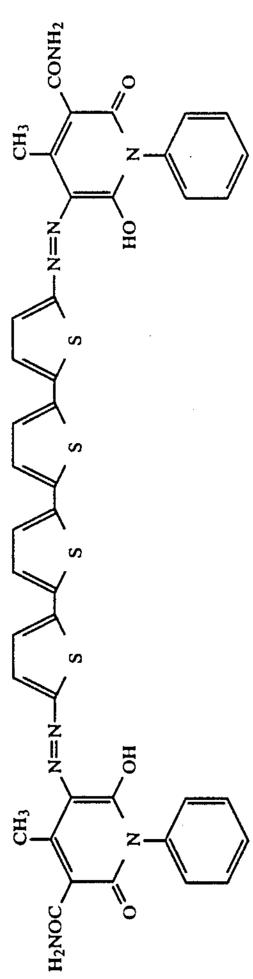
218
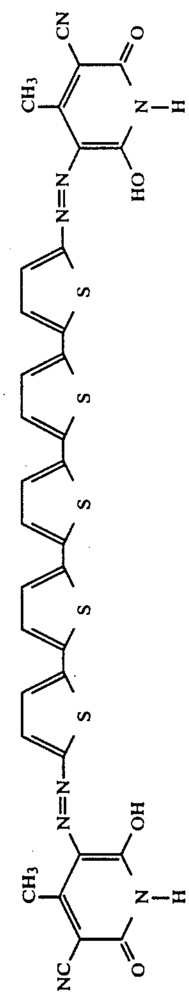
219
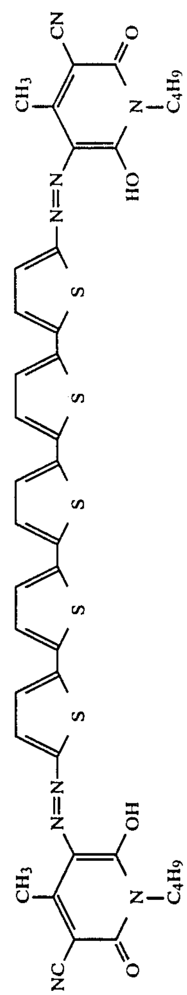

-continued
220
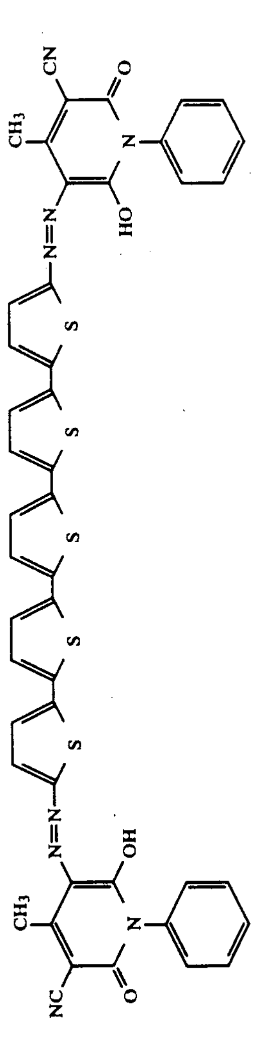
221
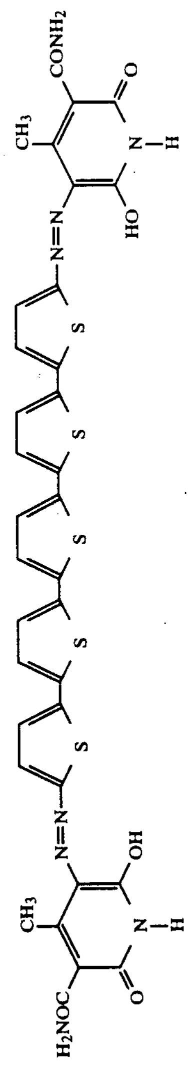
222
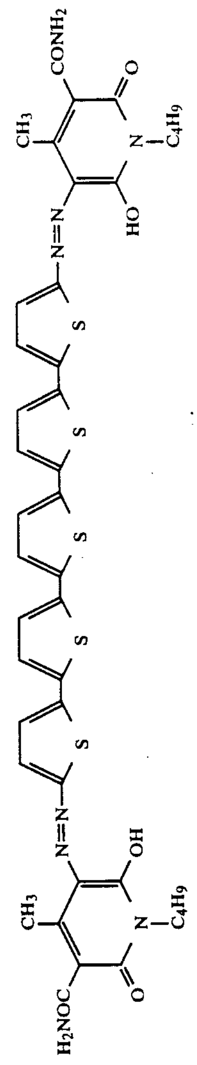
223
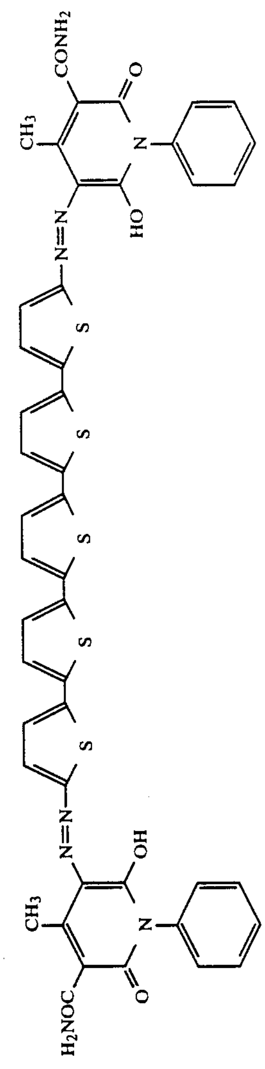

-continued
224
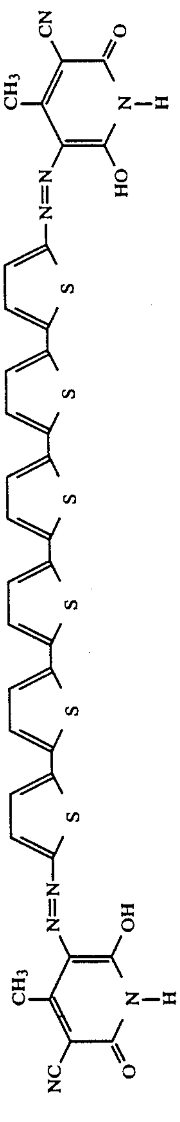
225
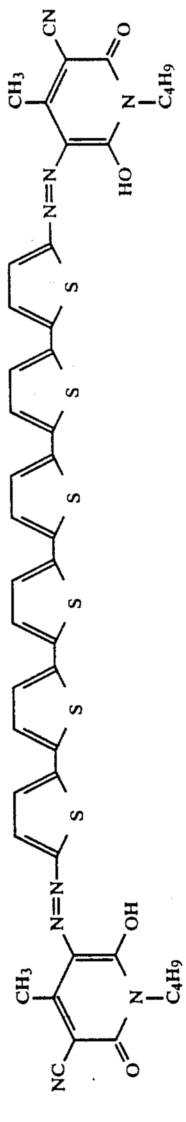
226
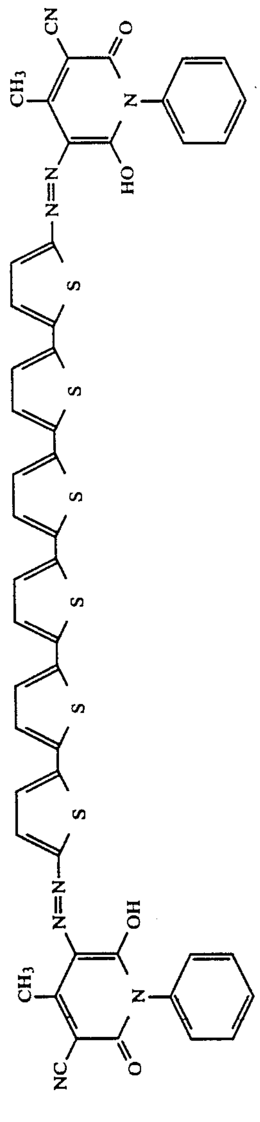
227
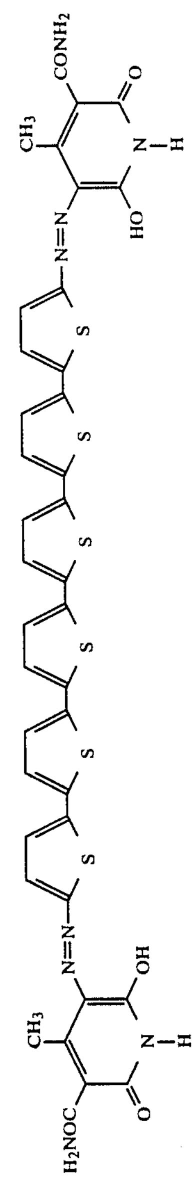
228
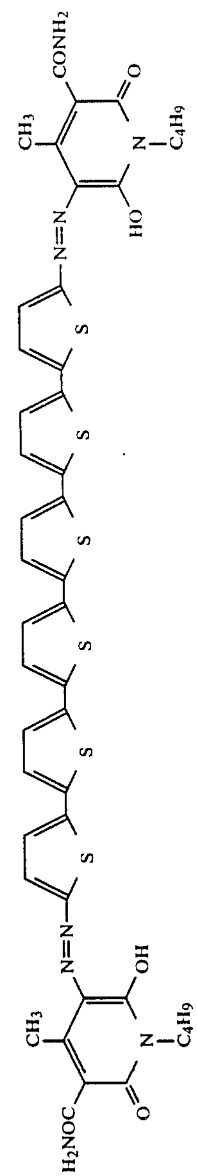

-continued
229
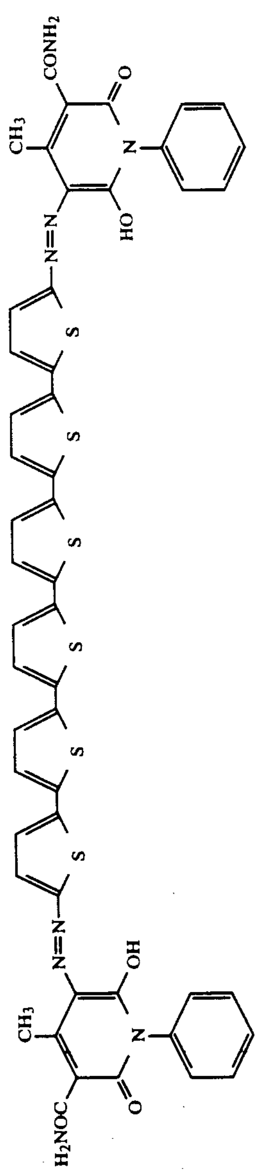
230
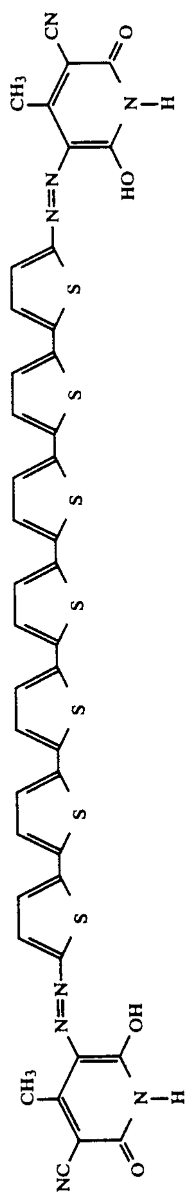
231
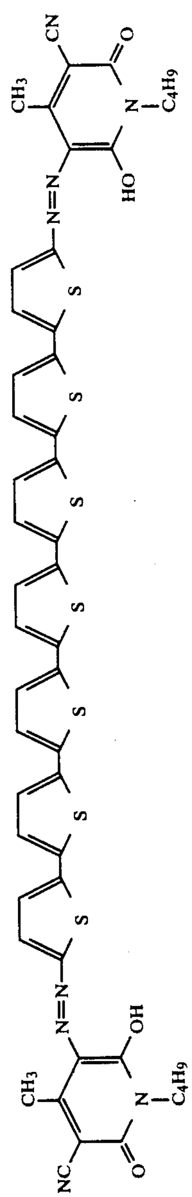
232
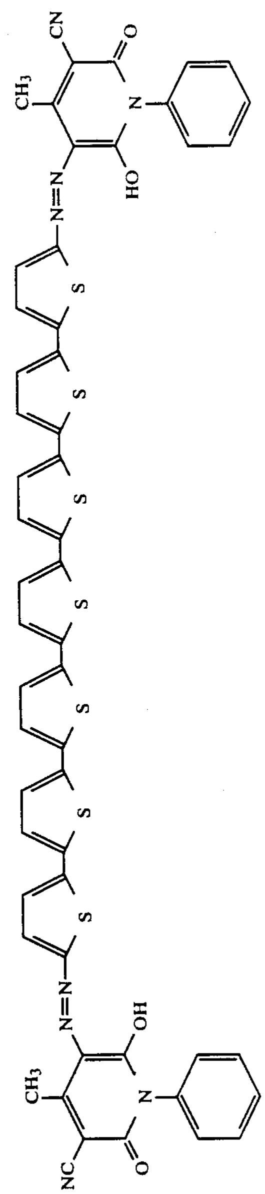

-continued
233
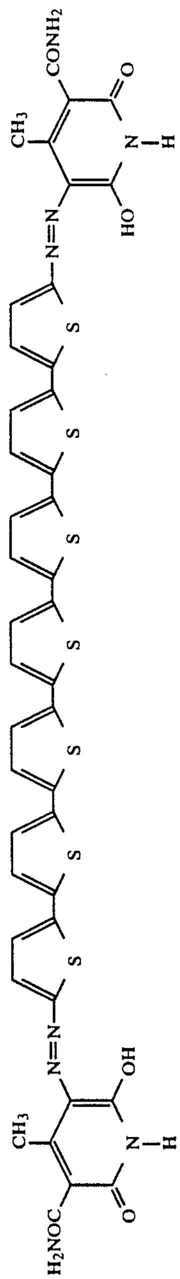
234
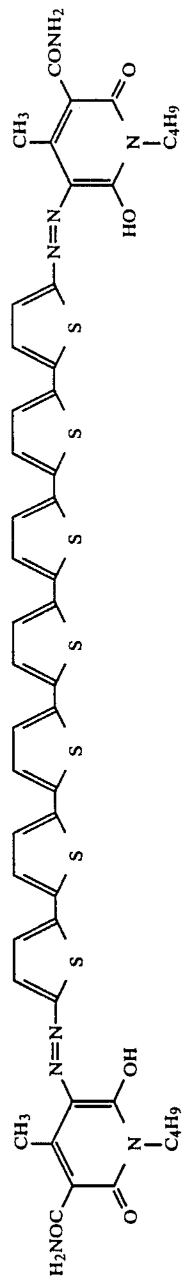
235
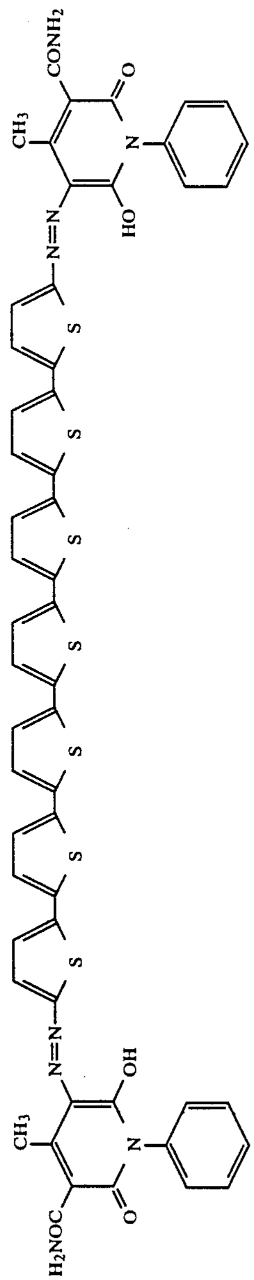
236
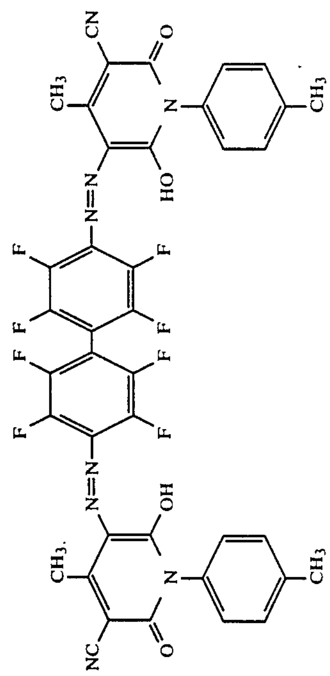

-continued
237
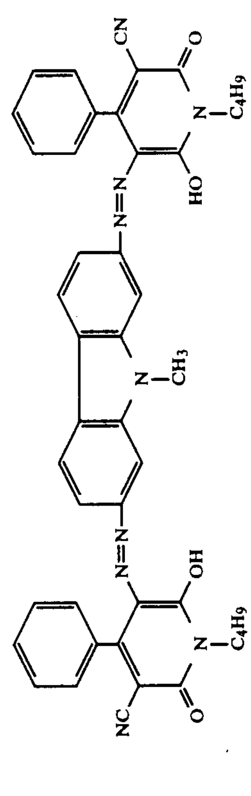
238
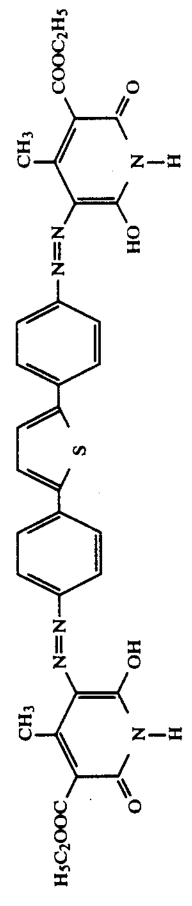
239
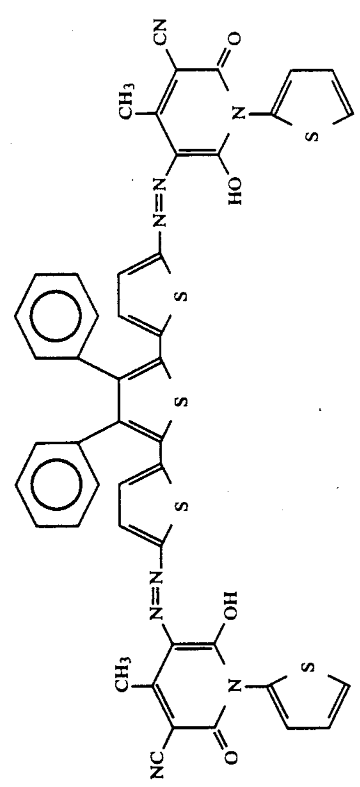
240
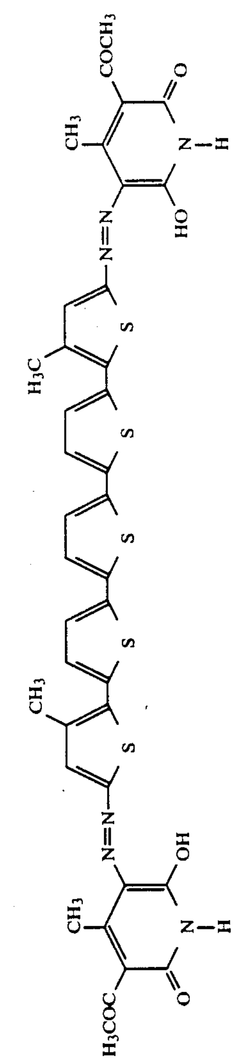

-continued
241
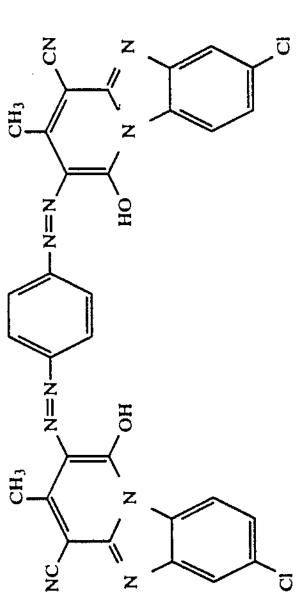
242
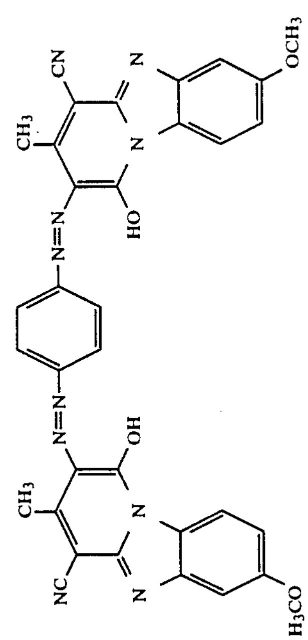
243
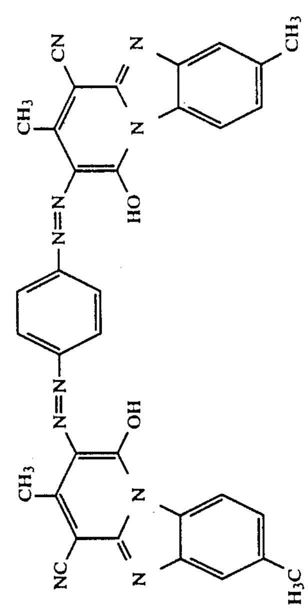

244
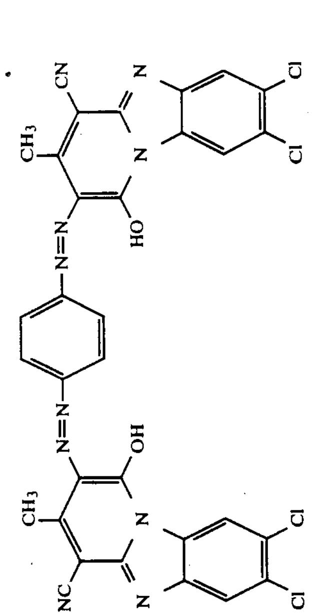
245
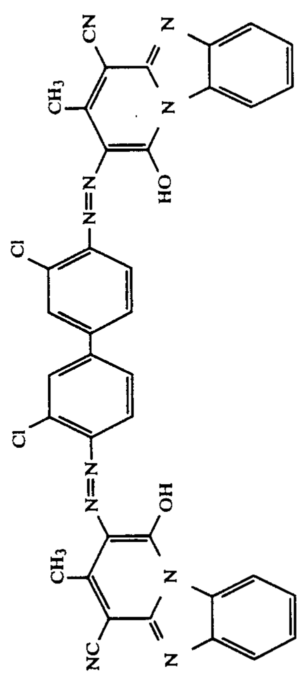
246
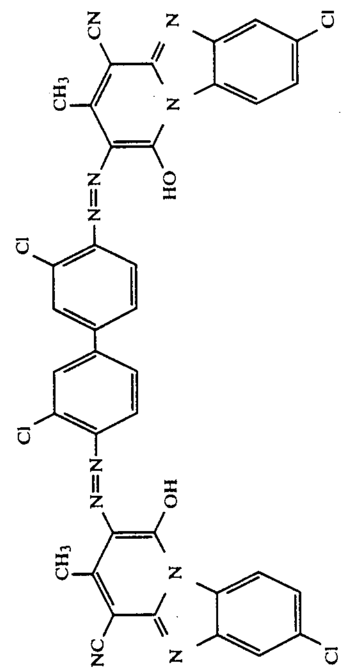

-continued
247
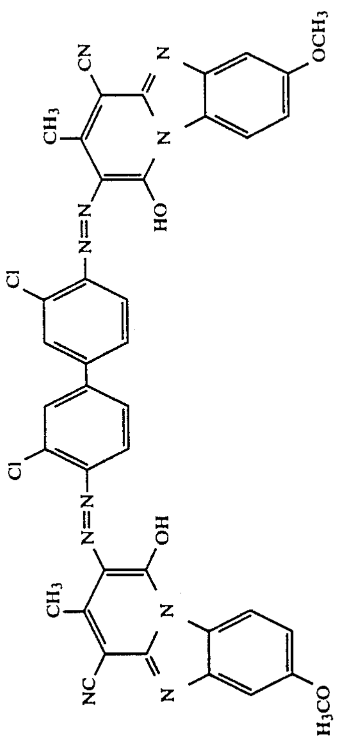
248
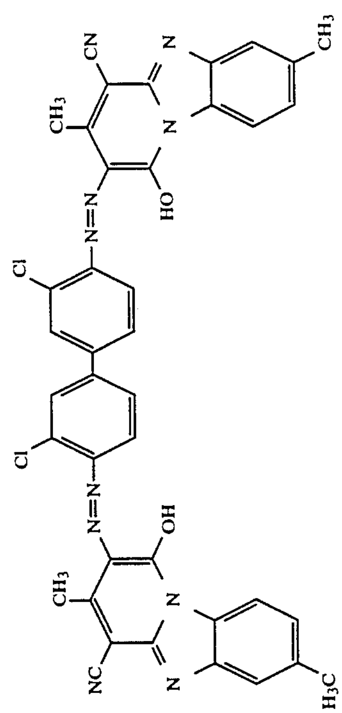
249
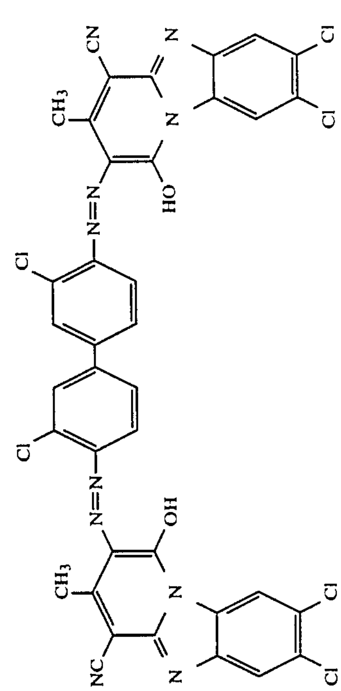

-continued
250
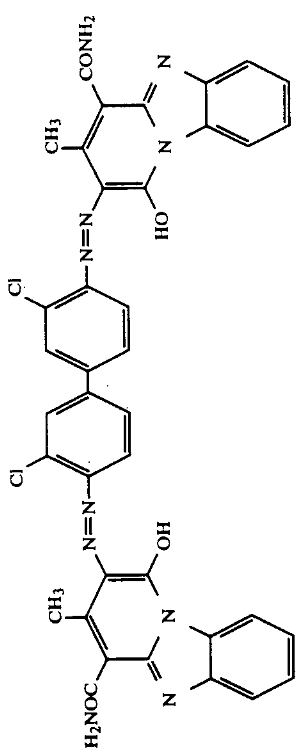
251
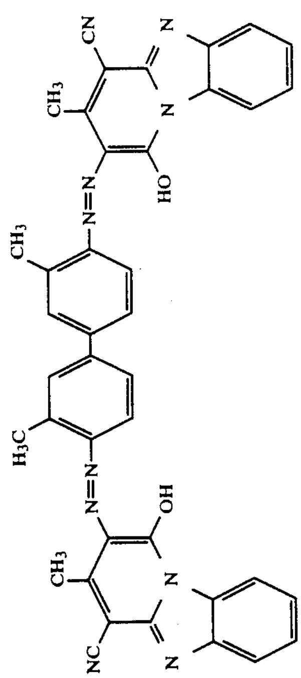
252
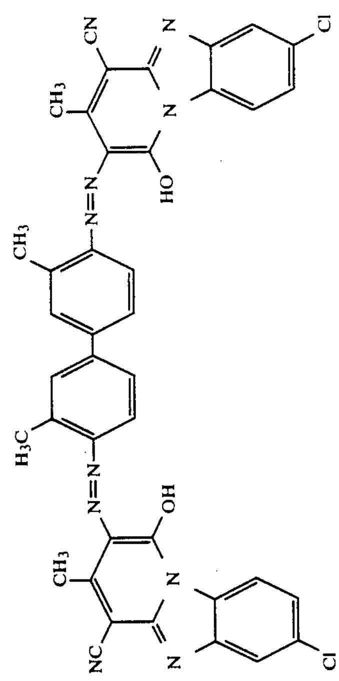

-continued
253
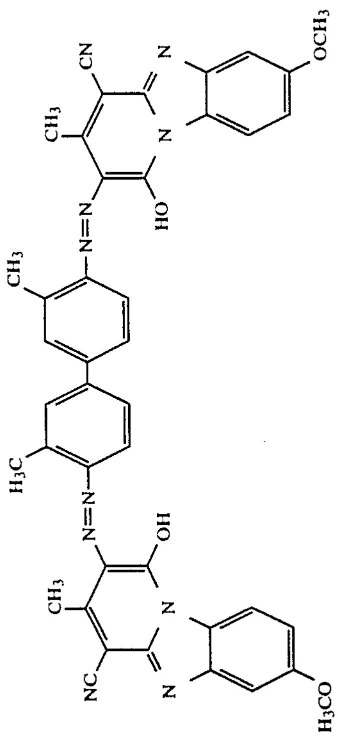
254
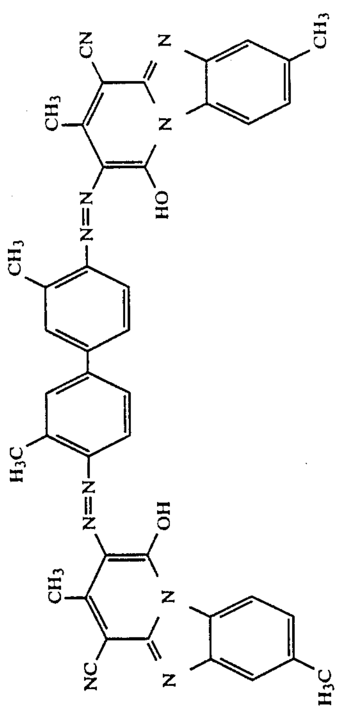
255
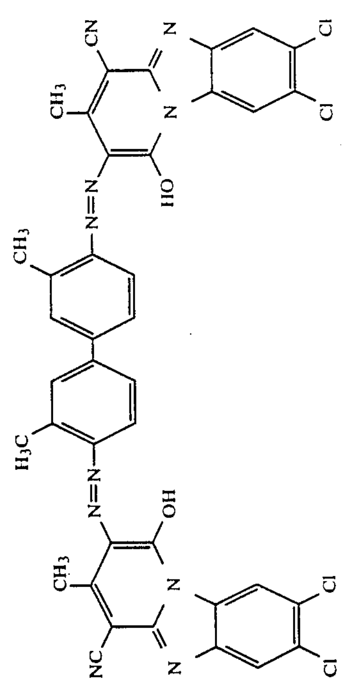

-continued
256
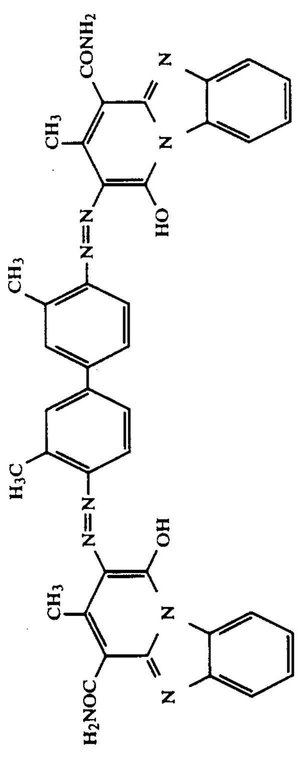
257
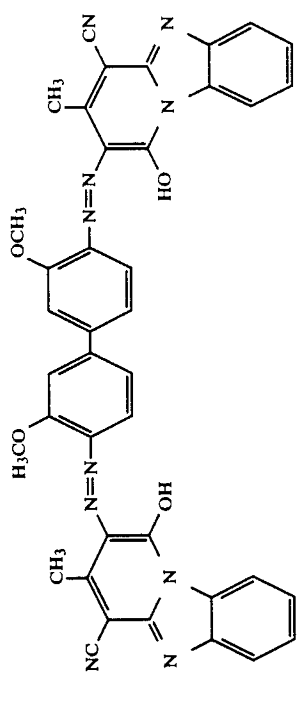
258
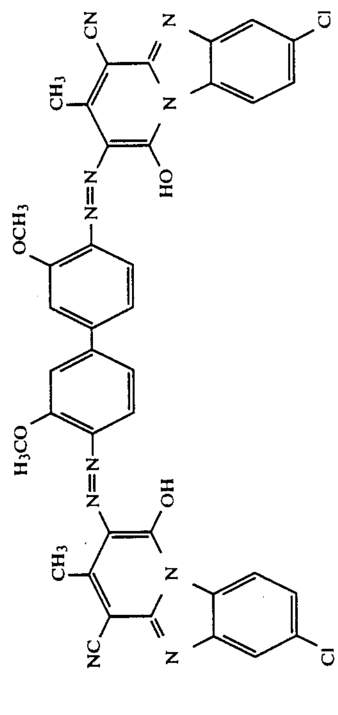

-continued
259
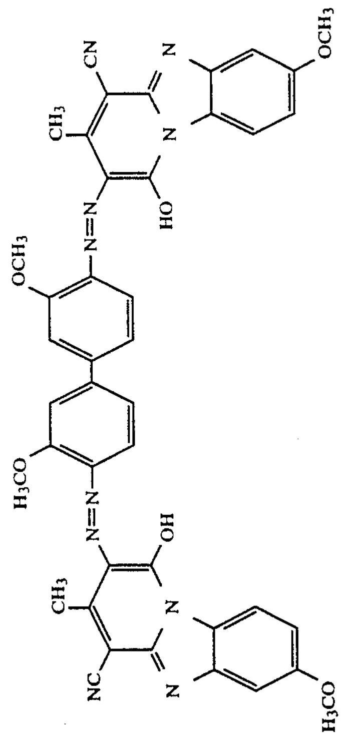
260
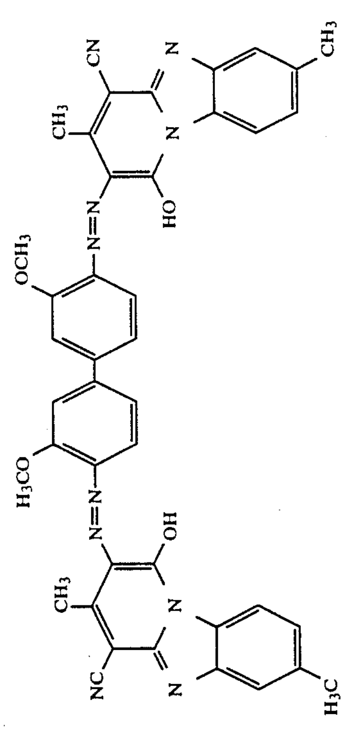
261
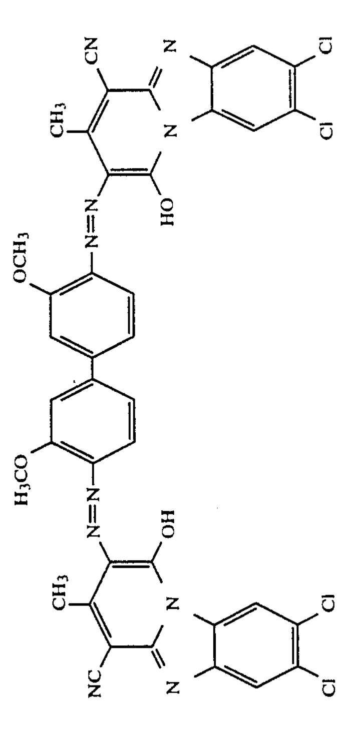

-continued
262
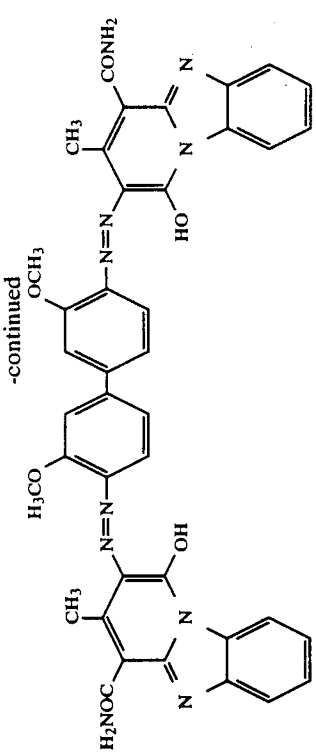
263
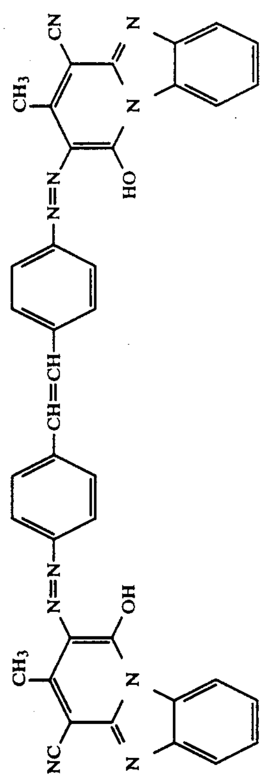
264
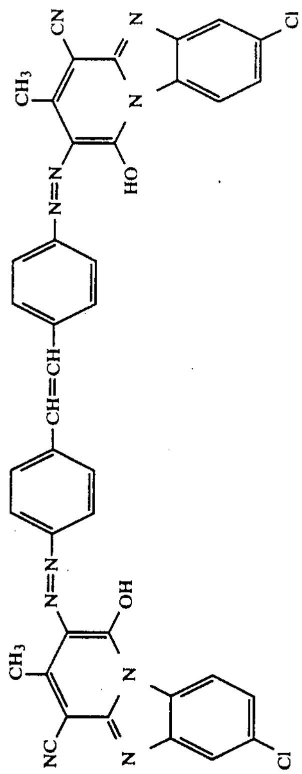

265
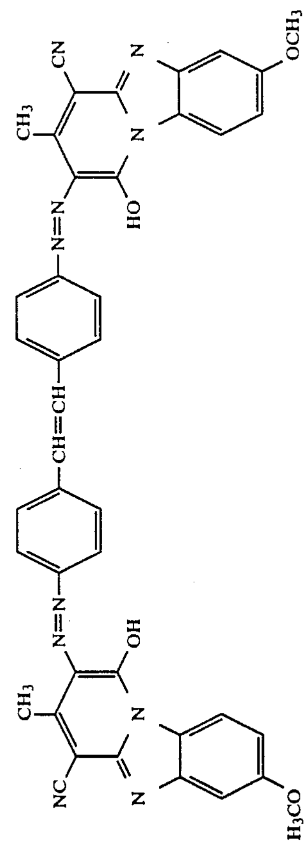
266
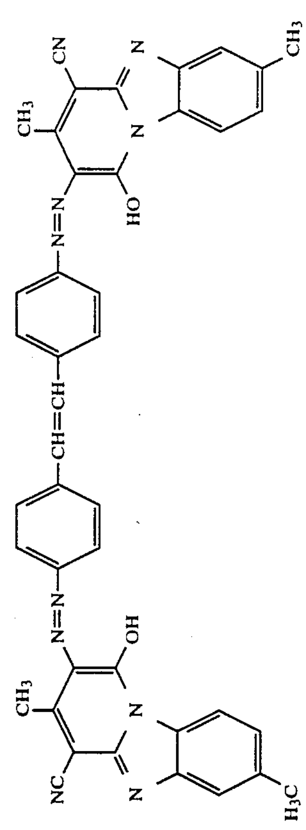

-continued
267
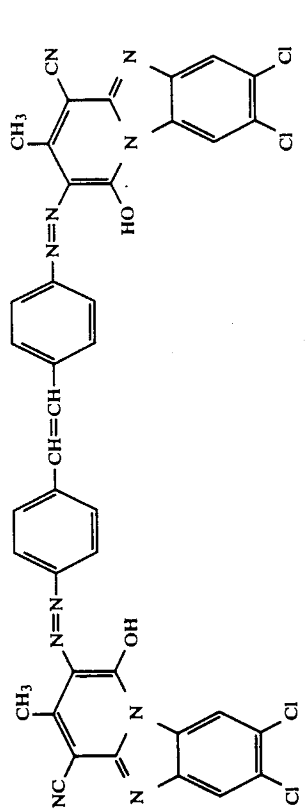
268
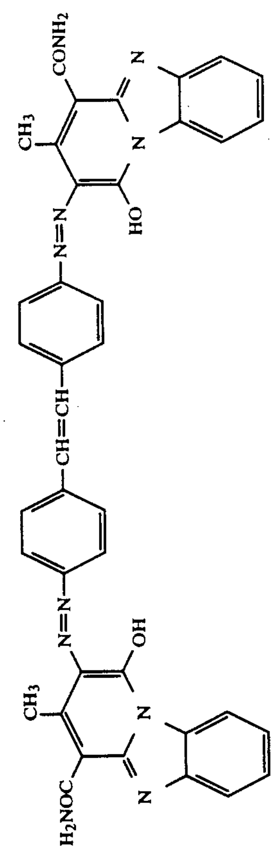
269
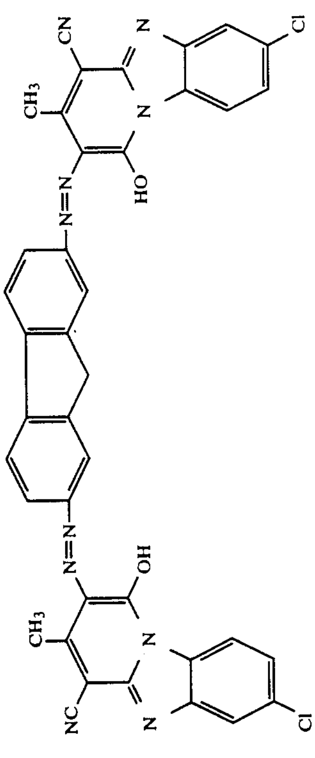

-continued
270
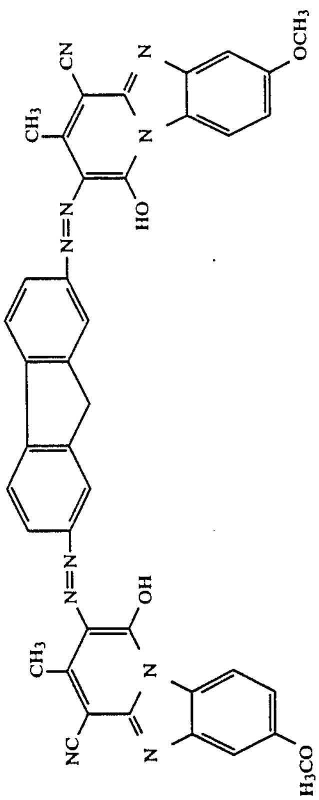
271
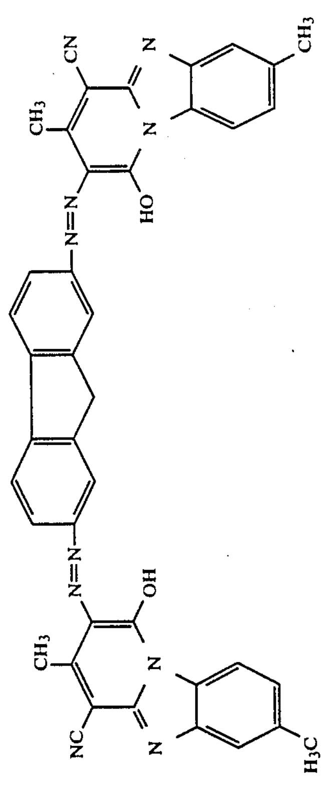
272
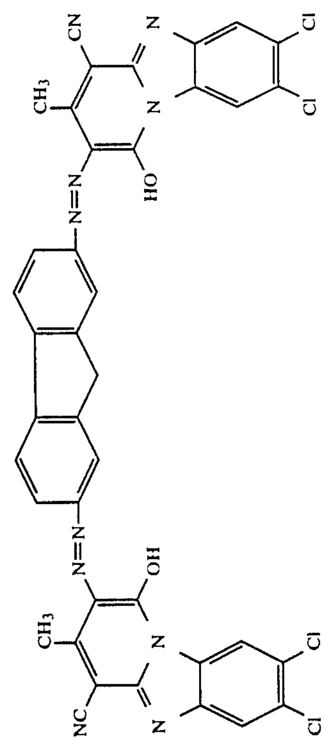

-continued
273
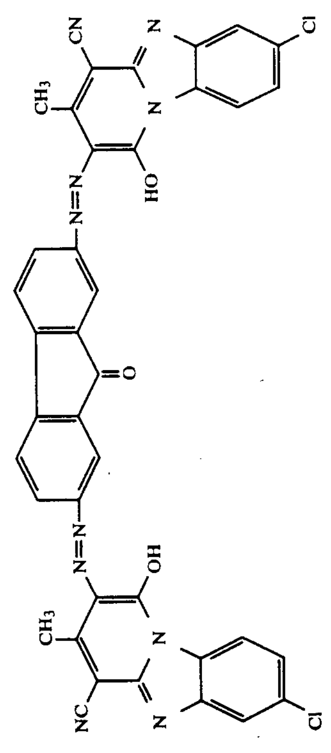
274
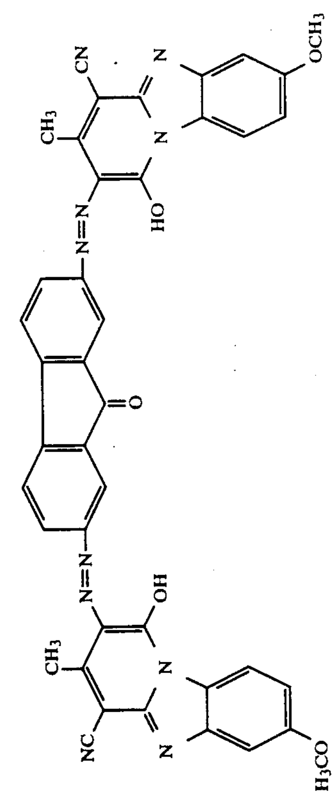
275
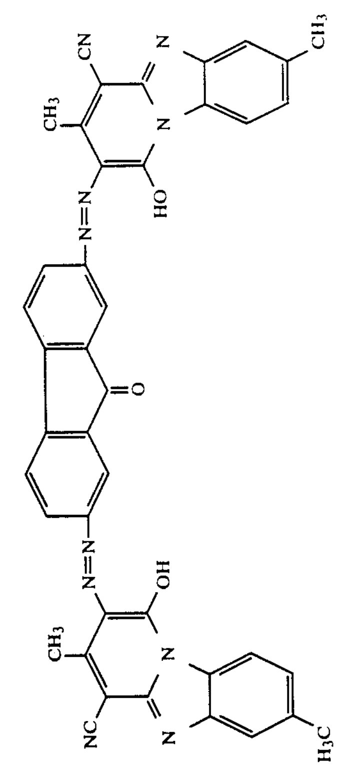

-continued
276
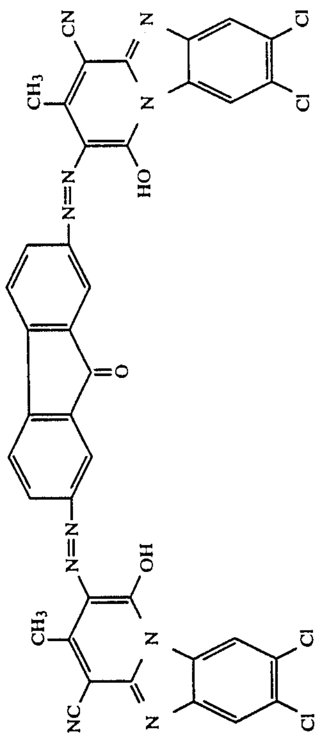
277
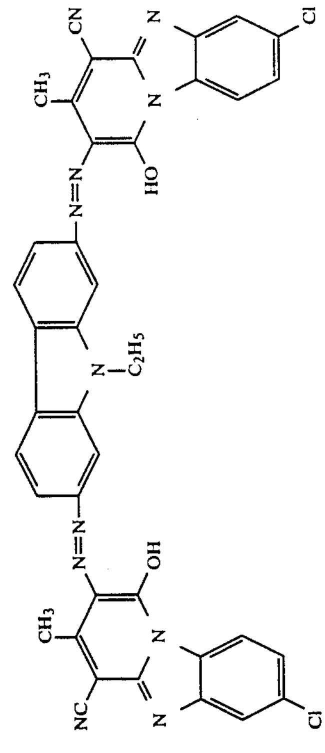
278
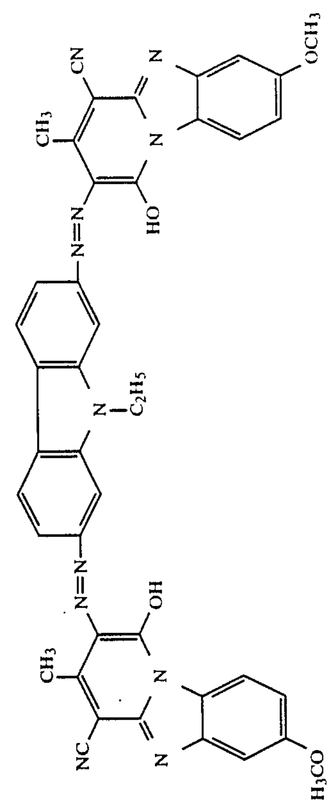

-continued
279
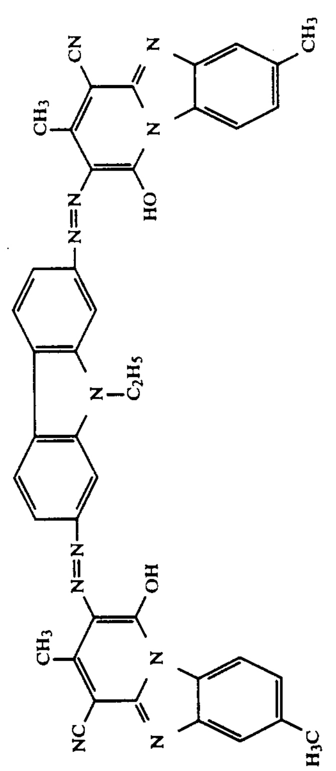
280
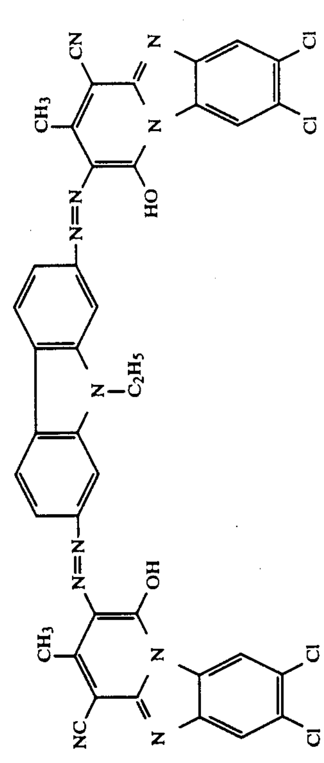
281
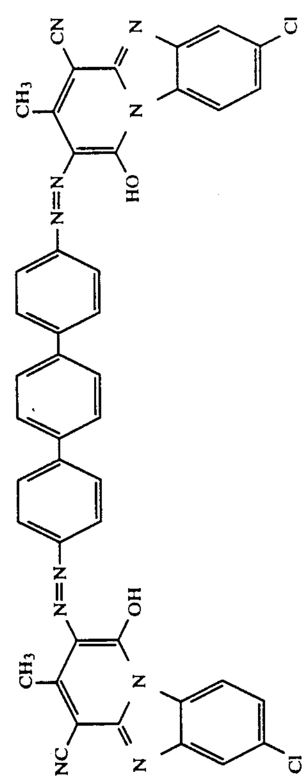

-continued
282
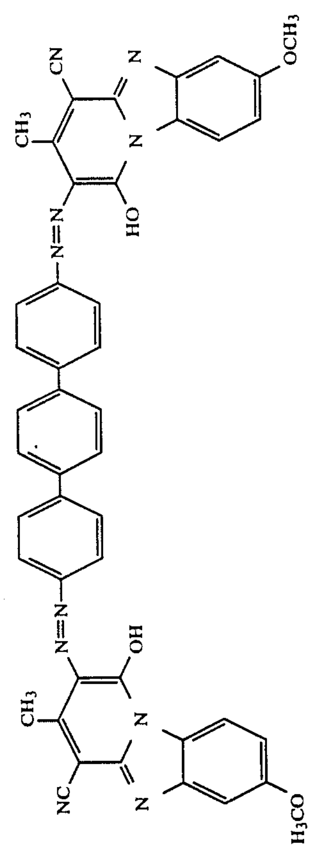
283
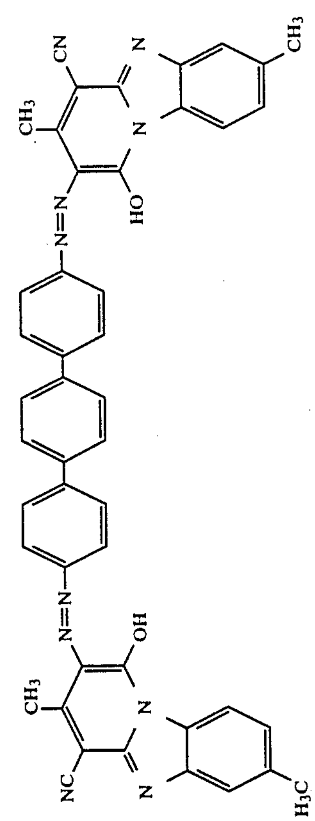
284
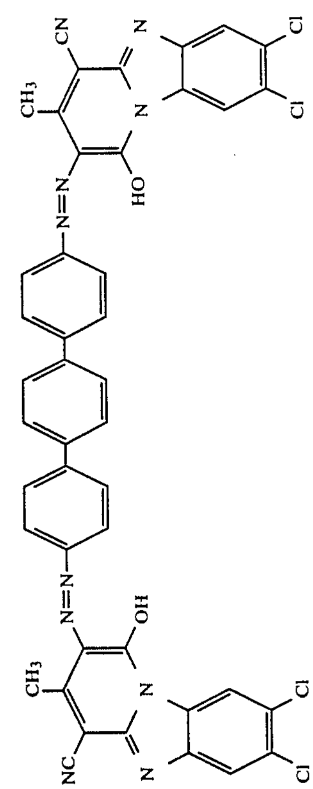

-continued
285
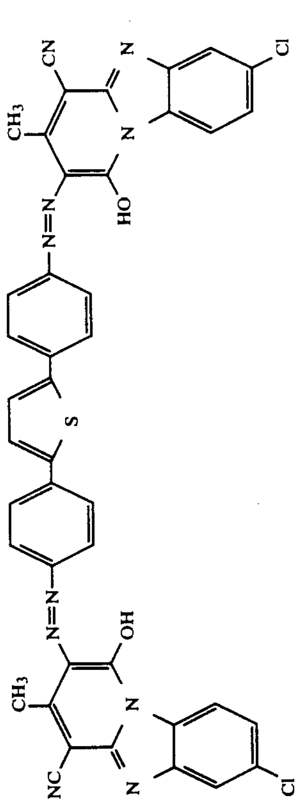
286
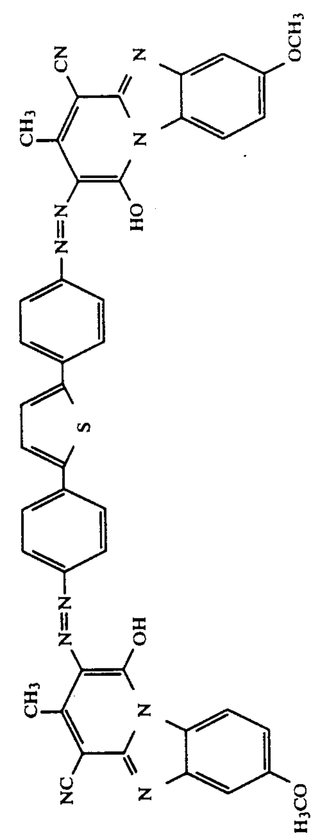
287
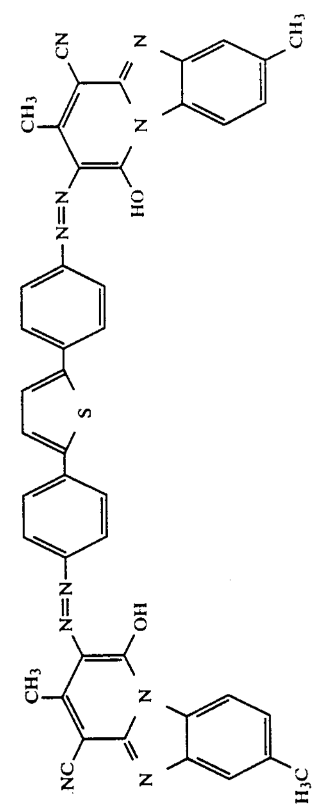

-continued
288
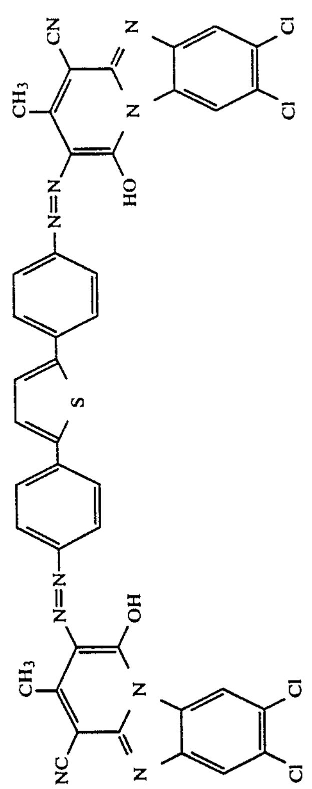
289
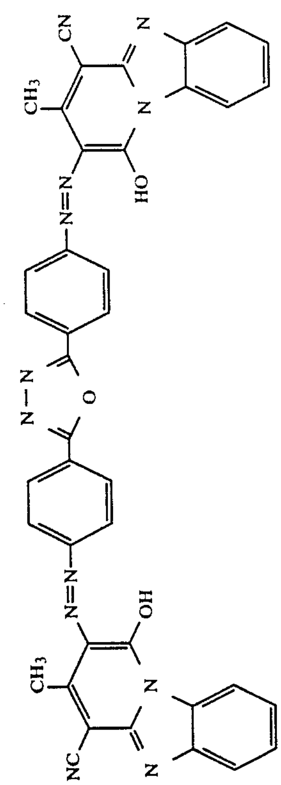
290
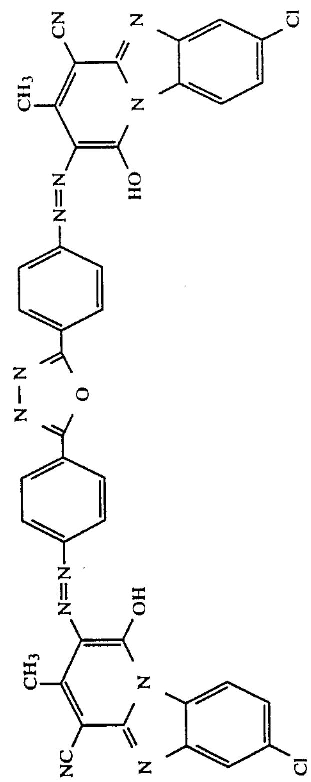

-continued
291
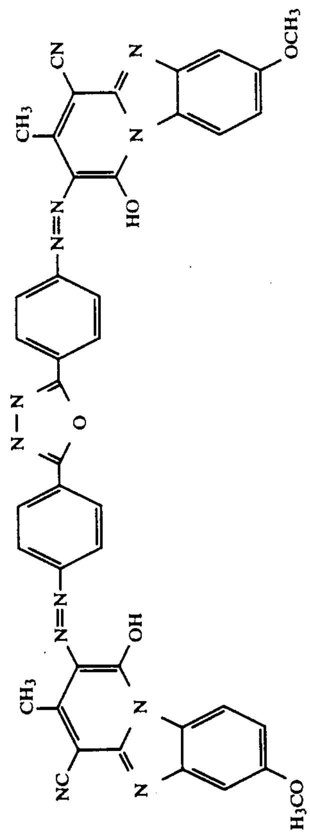
292
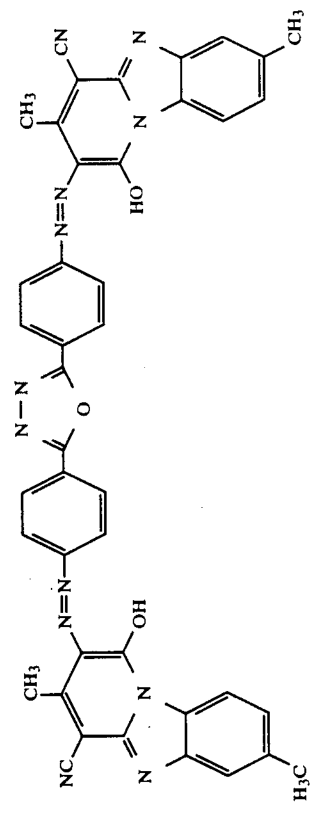
293
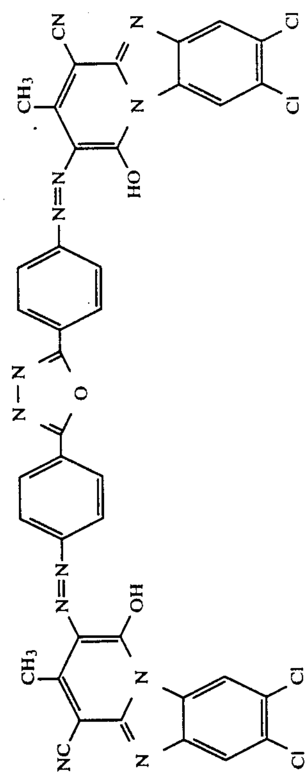

-continued
294
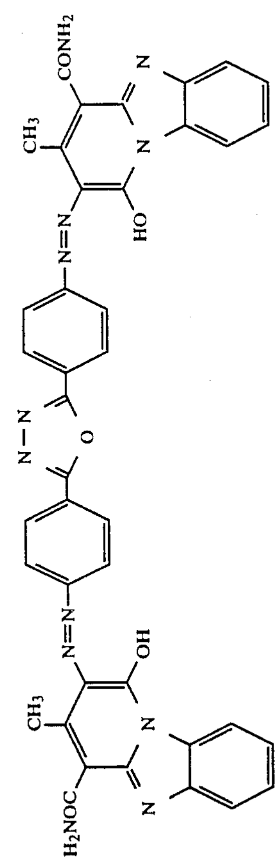
295
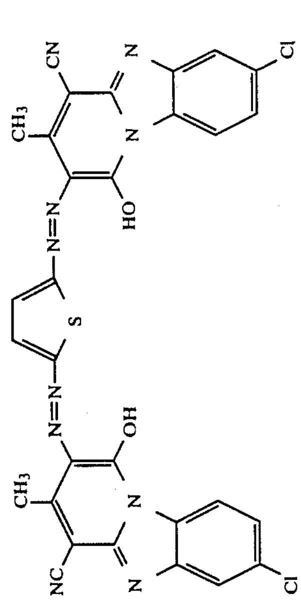
296
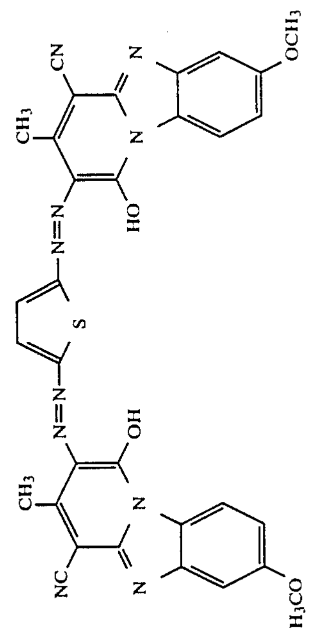

-continued
297
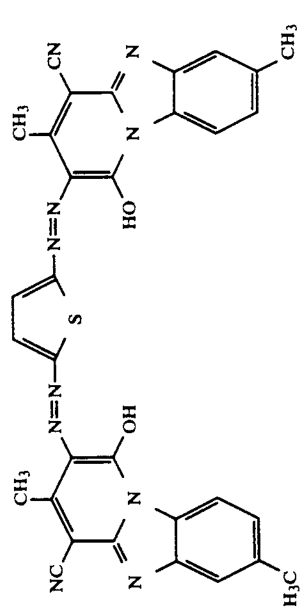
298
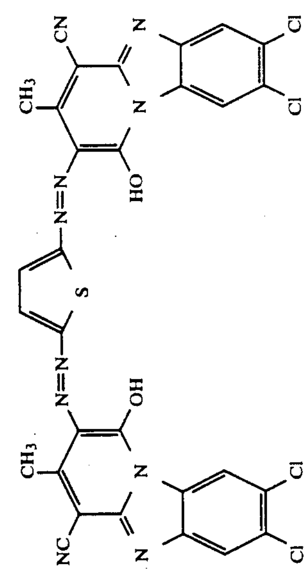
299
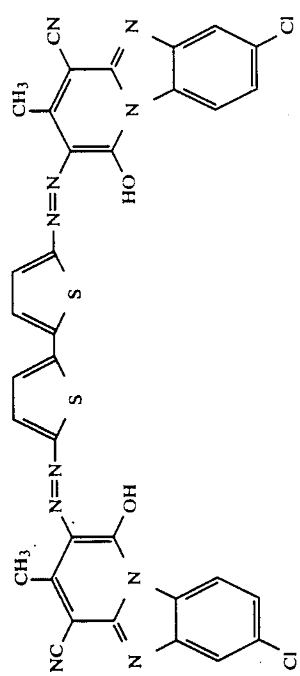

-continued
300
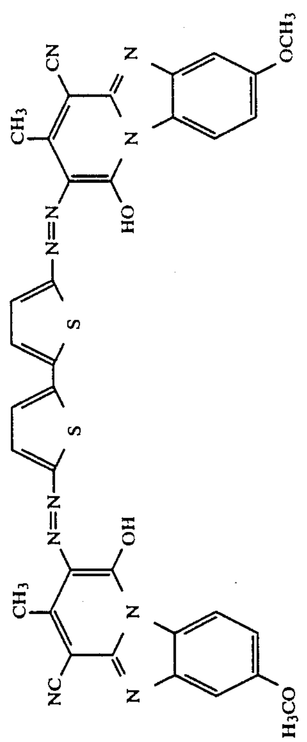
301
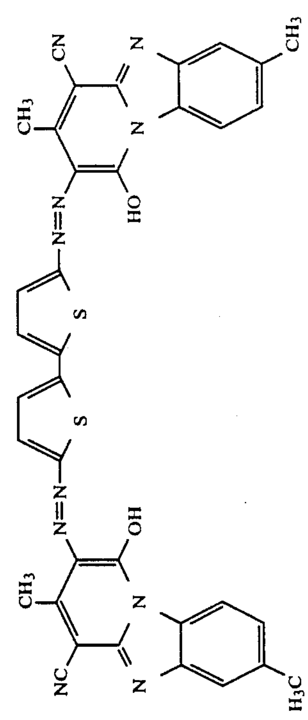
302
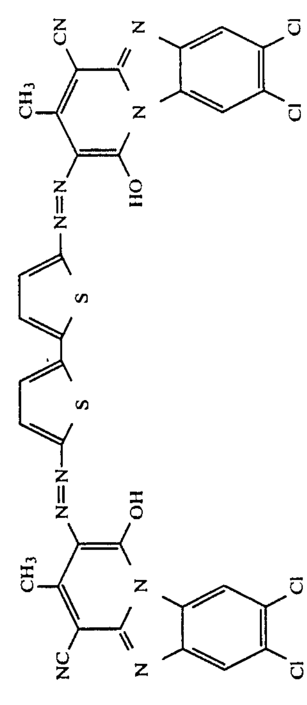

-continued
303
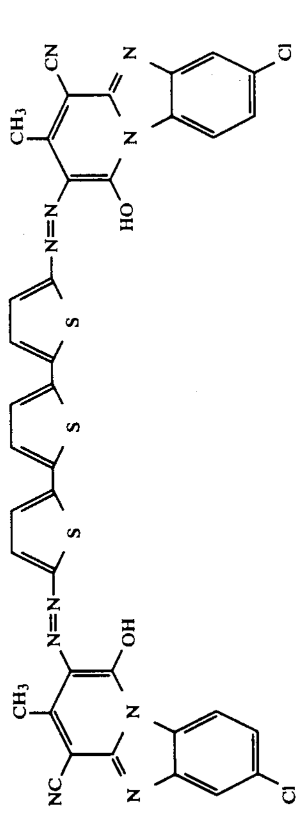
304
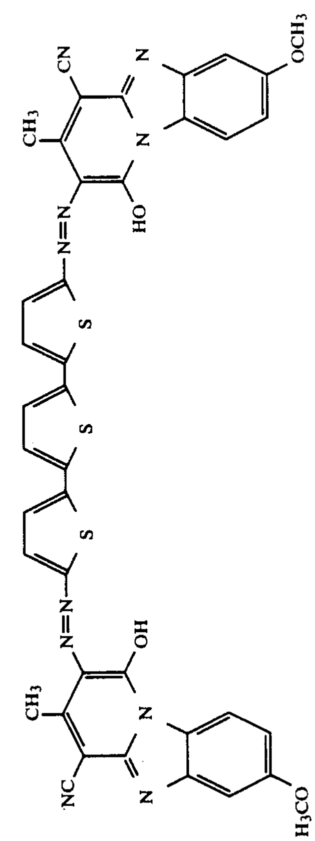
305
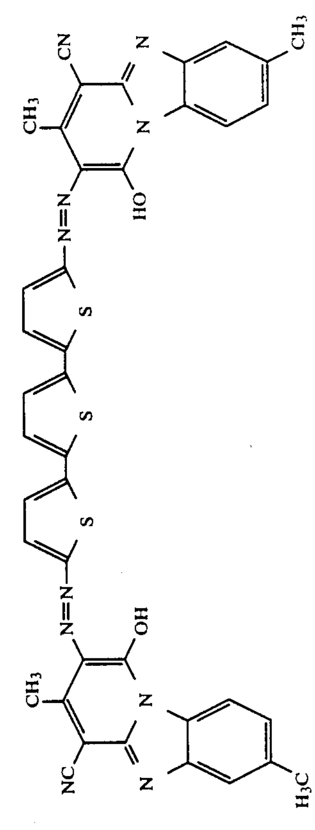

-continued
306
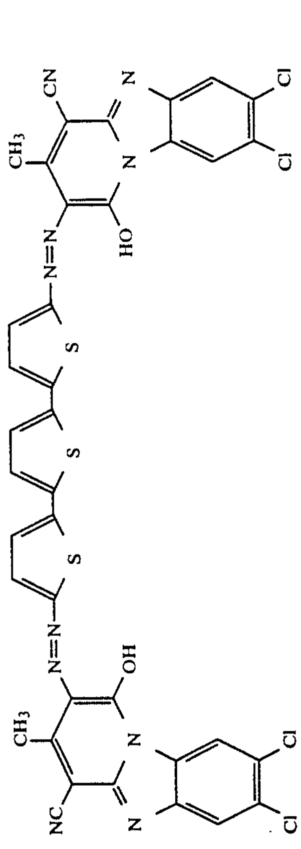
307
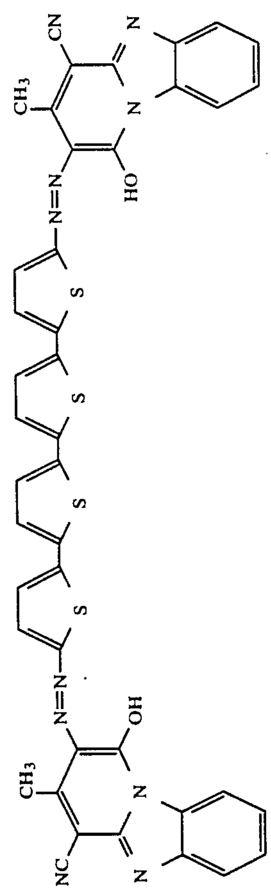
308
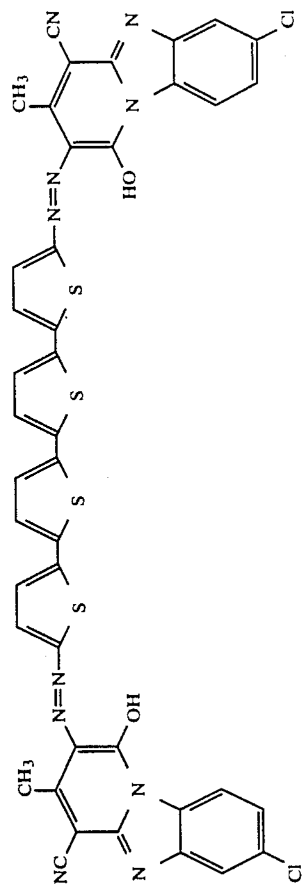

-continued
309
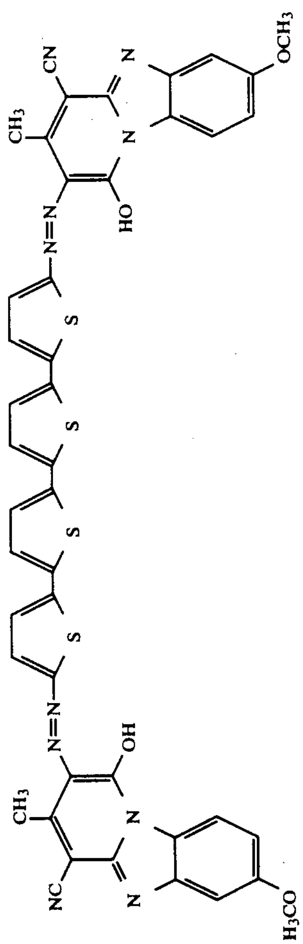
310
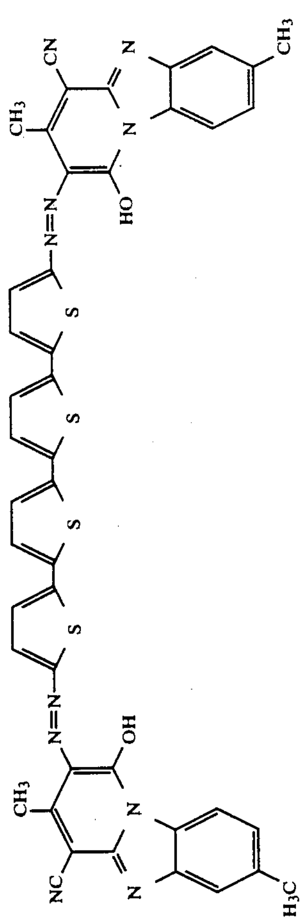
311
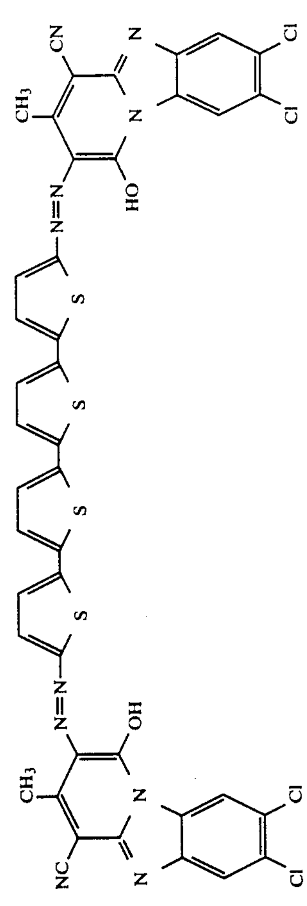

-continued
312
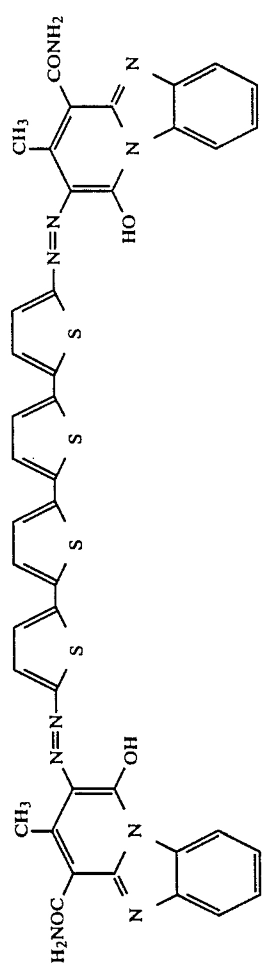
313
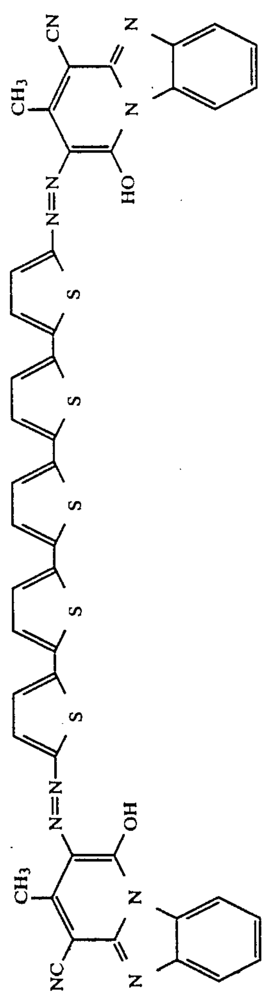
314
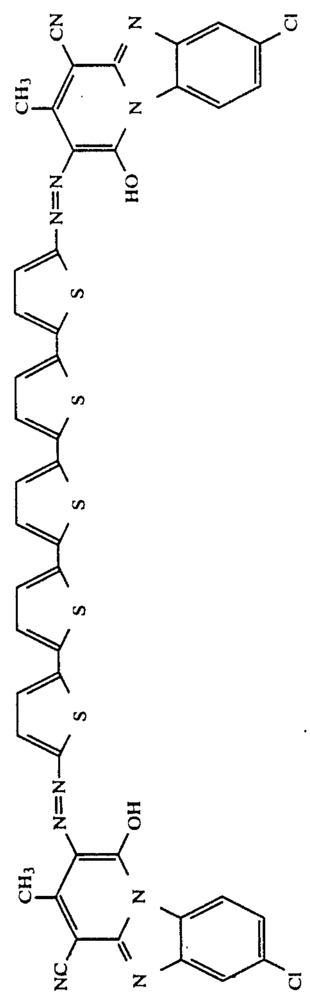

-continued
315
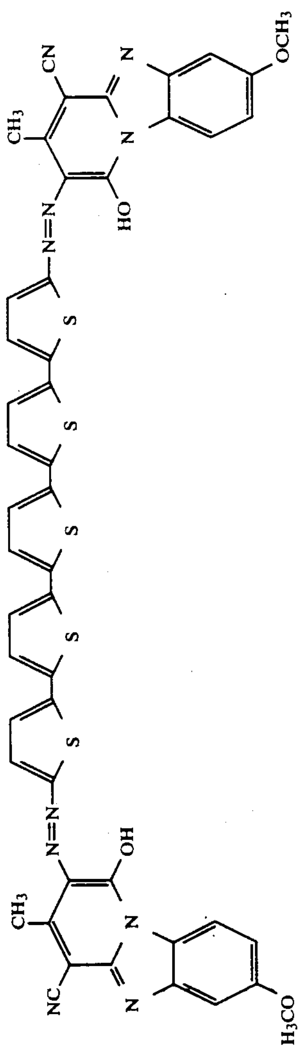
316
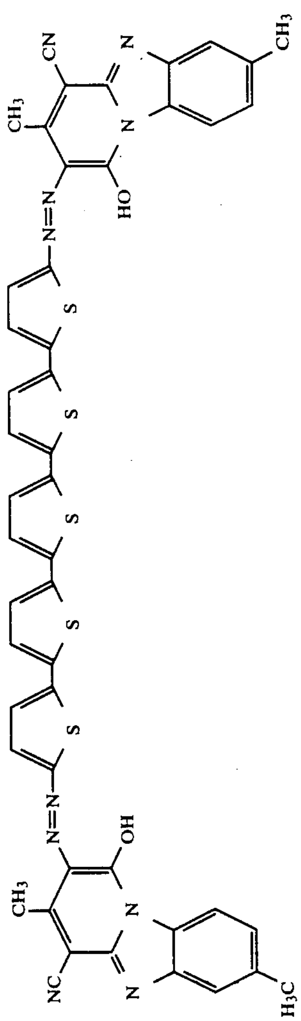
317
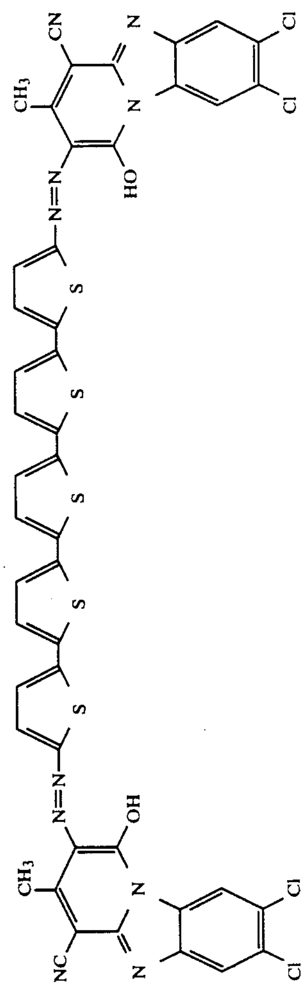

-continued
318
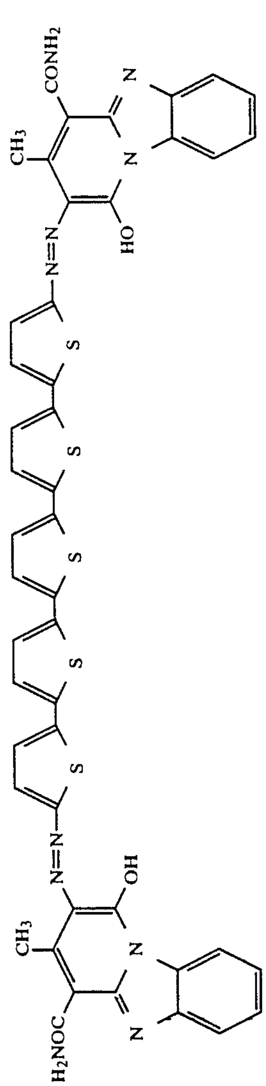
319
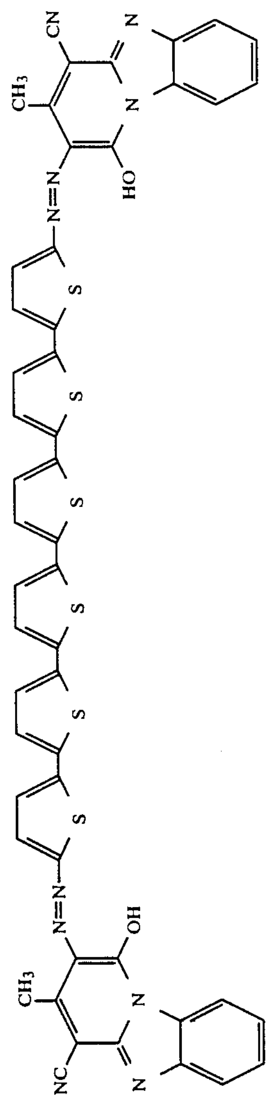
320
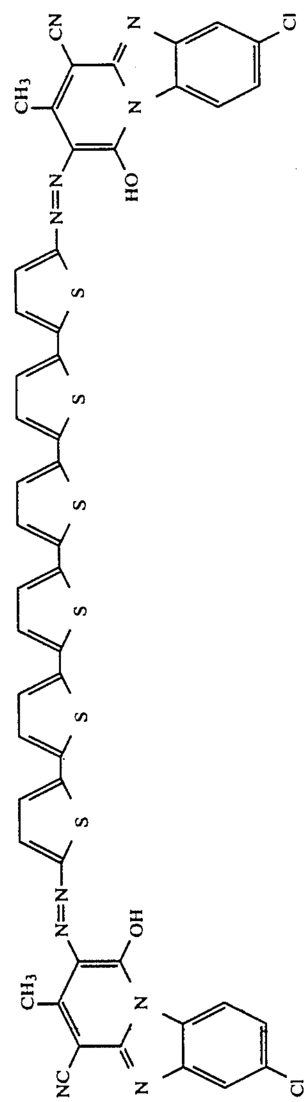

-continued
321
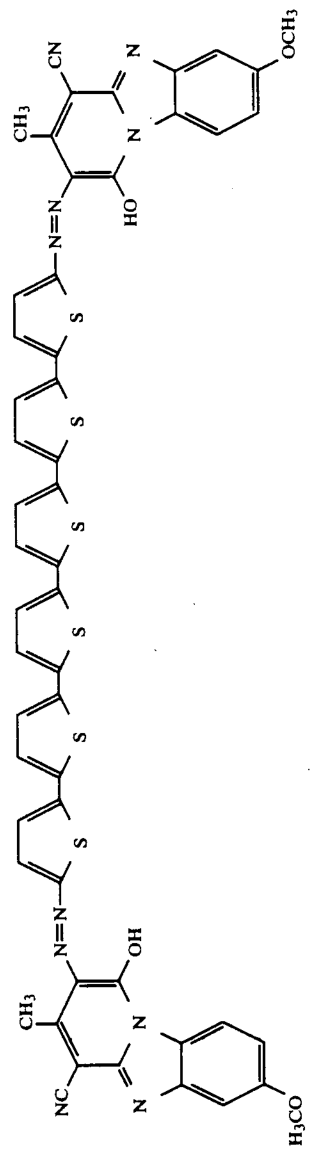
322
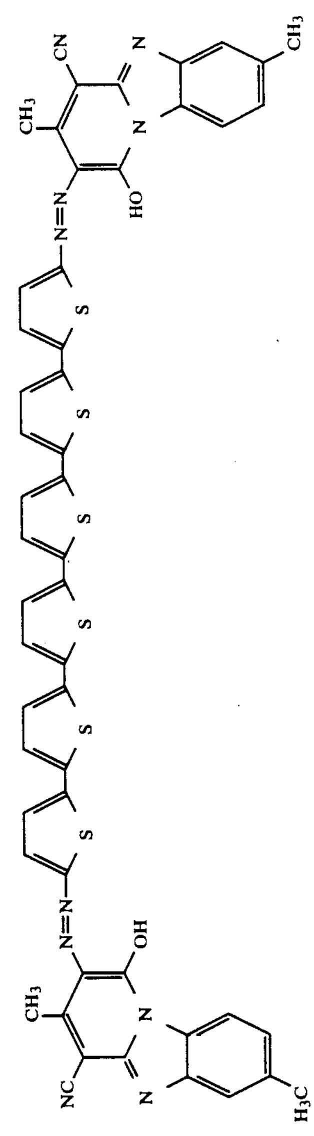
323
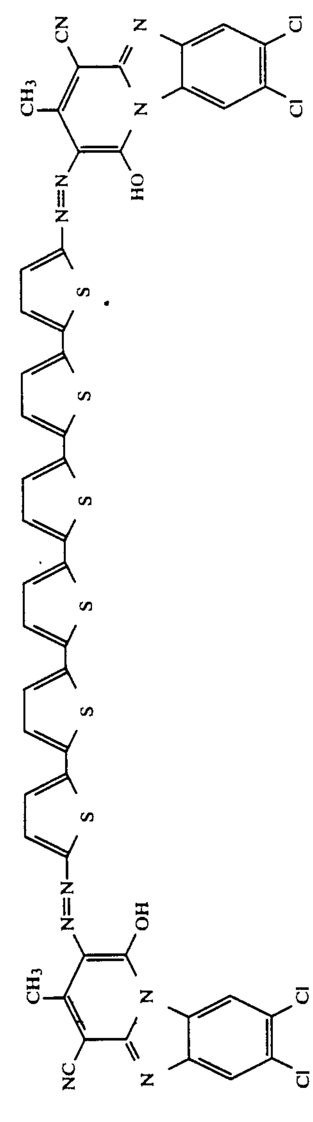

-continued
324
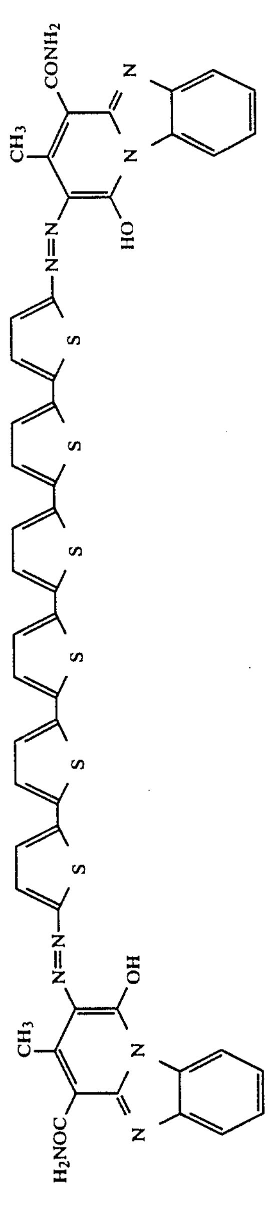
325
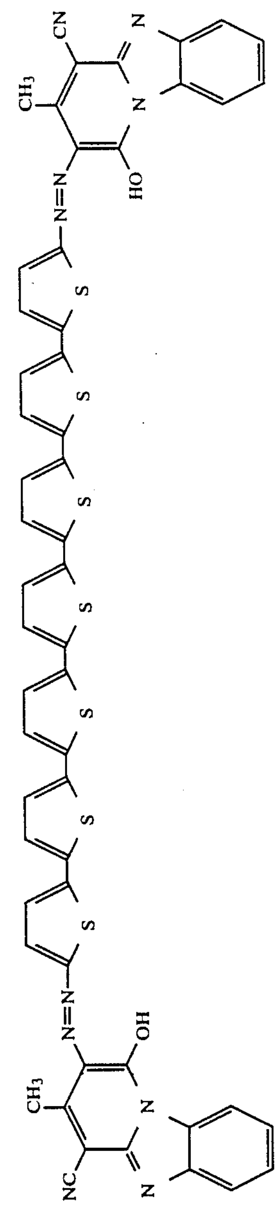
326
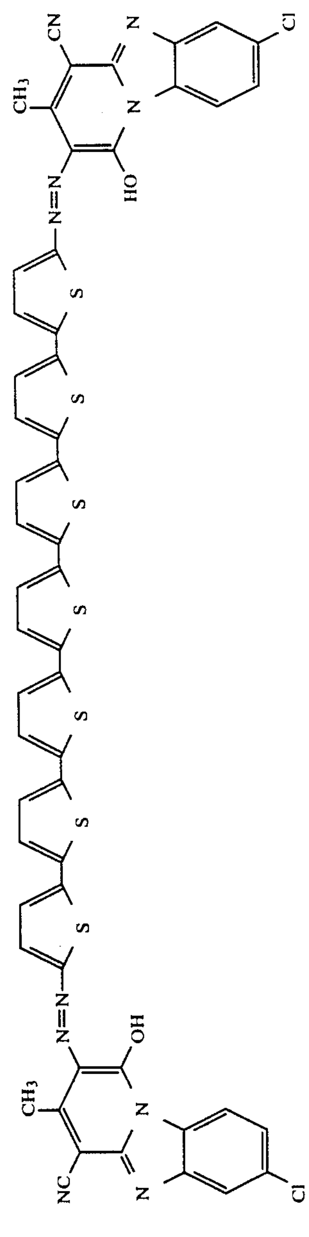

-continued
327
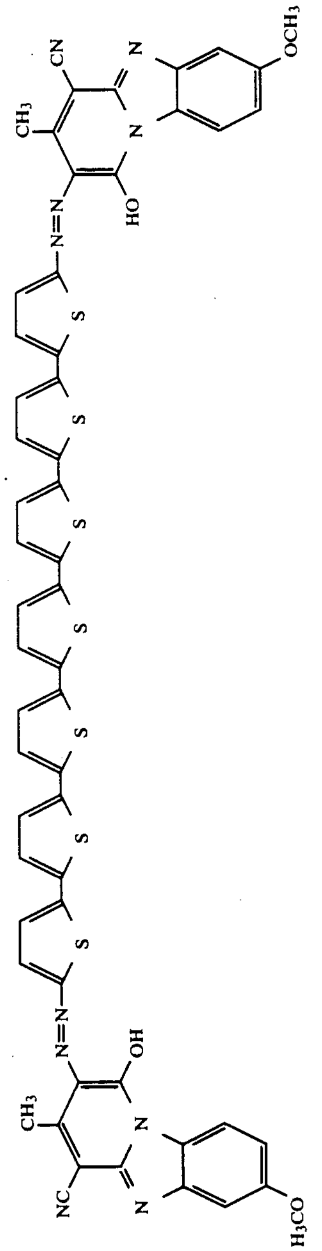
328
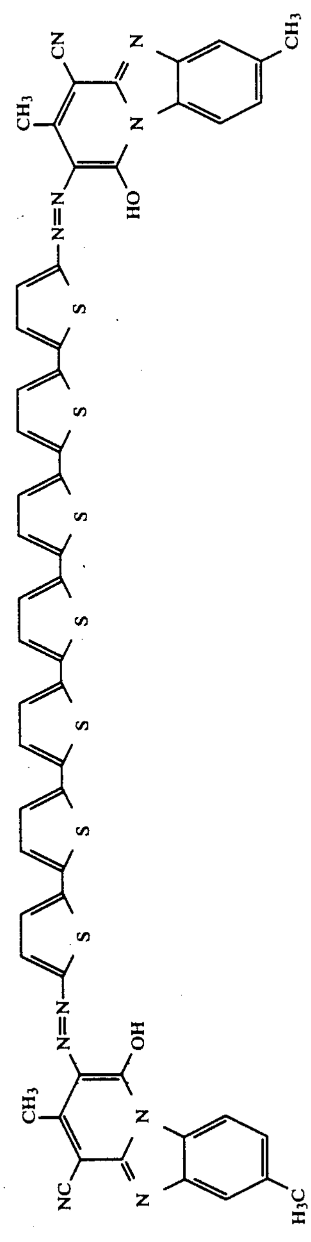
329
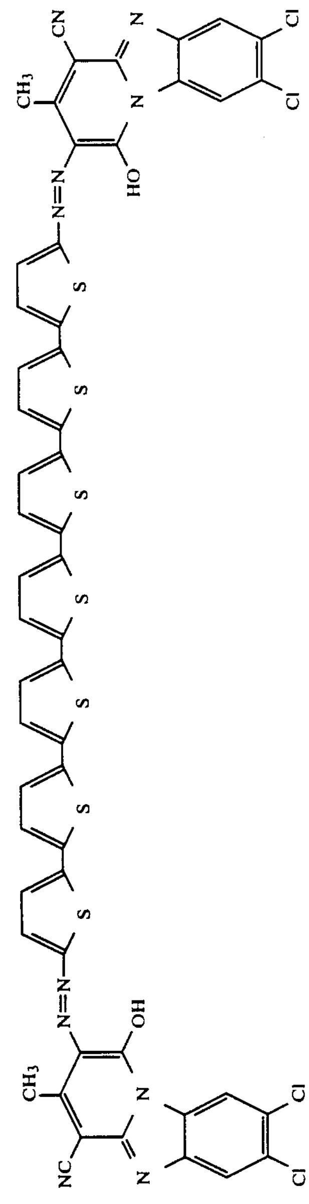

-continued
330
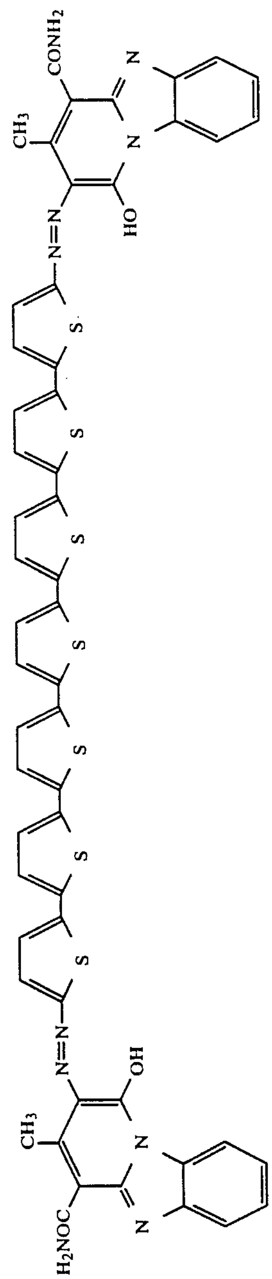
331
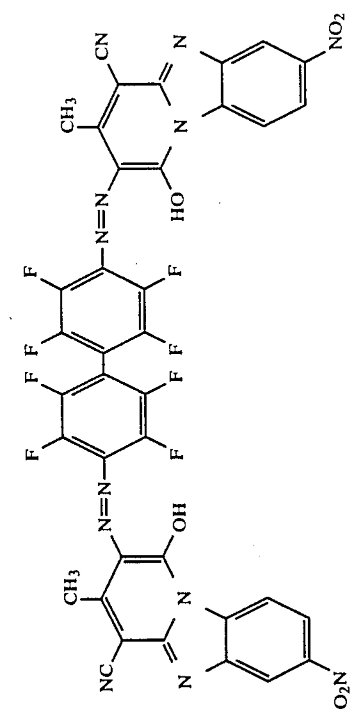
332
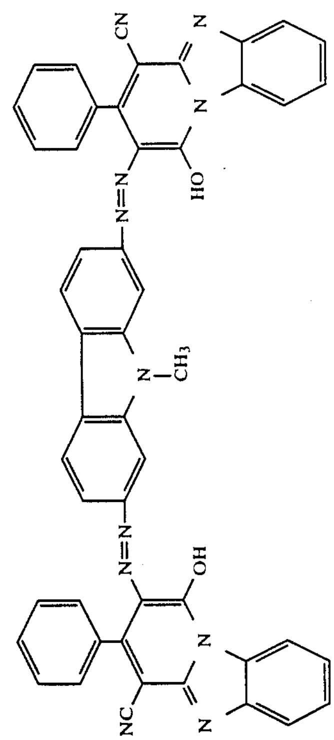

-continued
333
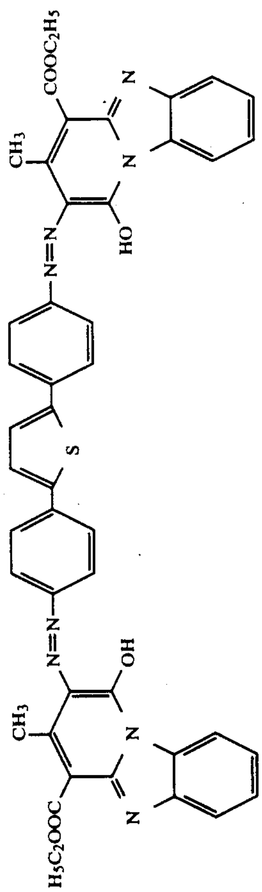
334
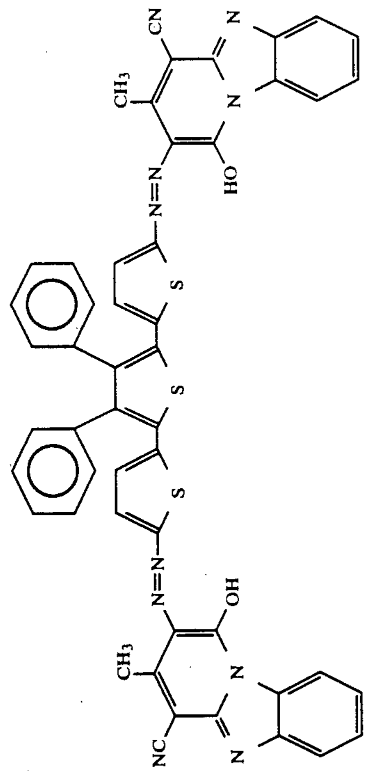
335
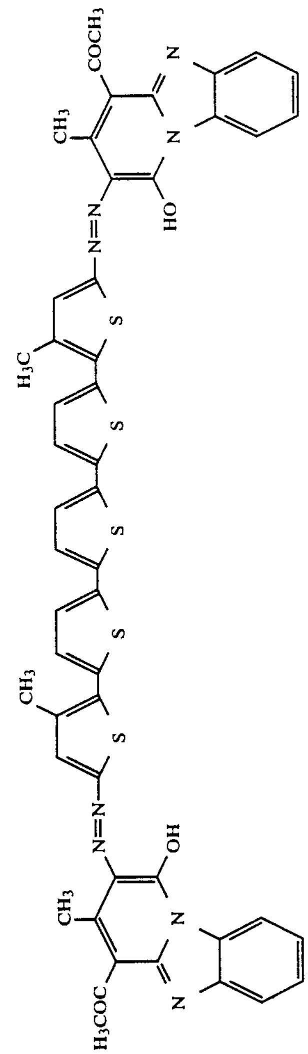

-continued
336
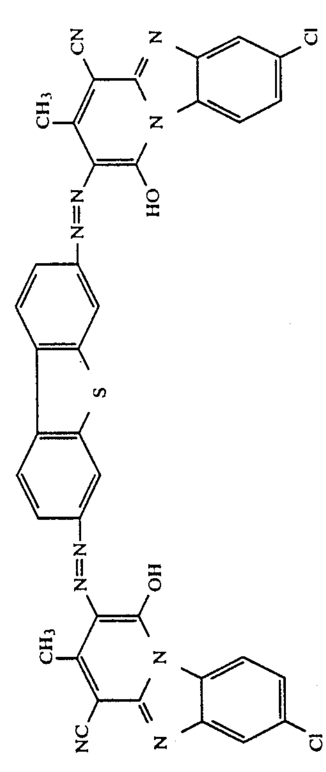
337
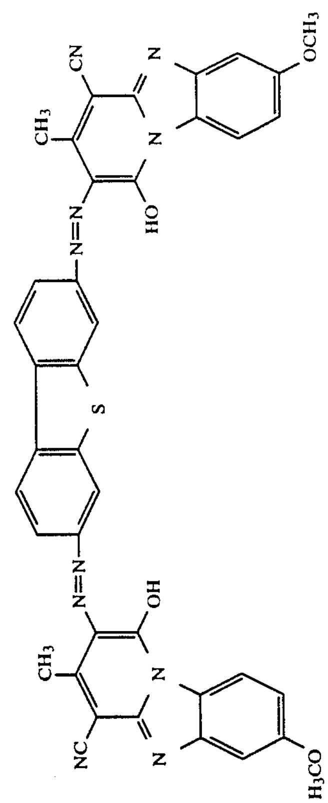
338
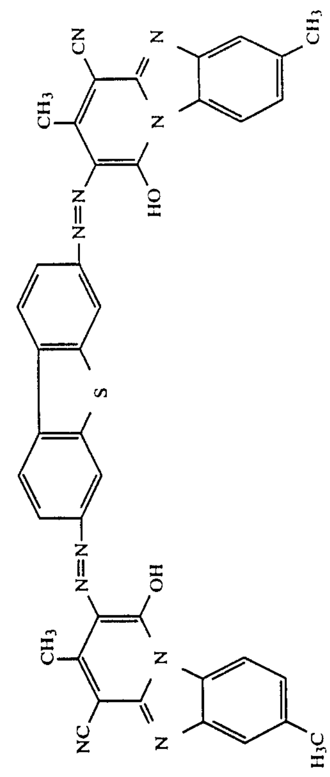

339
-continued
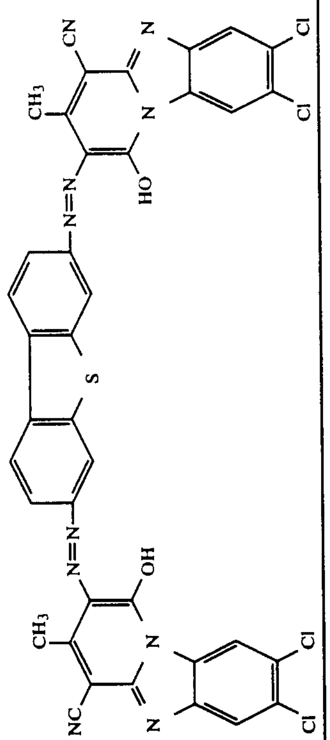

The Examples of the present invention will be explained.

EXAMPLE 1

50 parts by weight of the disazo compound No. 1, 100 parts by weight of a polyester resin (Vylon 200: manufactured by Toyobo Co., Ltd.) and 100 parts by weight of 1-phenyl-3-(p-diethylaminostyryl)-5-(p-diethylaminophenyl)-2-pyrazoline (ASPP) are mixed with tetraphydrofuran (THF) as a solvent with a mixer for 3 hours to prepare a coating liquid. The coating liquid was applied on an aluminum-deposited polyester film (Al-PET) as an electroconductive substrate by means of the wire bar technique to form a photoconductive layer having a dry thickness of 15 μm. Thus, a photoconductor with the structure shown in FIG. 1 was produced.

EXAMPLE 2

A solution of 100 parts by weight of p-diethylaminobenzaldehyde-diphenylhydrazone (ABPH) in 700 parts by weight of tetrahydrofuran (THF) was mixed with a solution of 100 parts by weight of polycarbonate resin (Panlite L-1250: manufactured by Teijin Kasei Co., Ltd.) in 700 parts by weight of mixed solvent including the same parts of THF and dichlormethane to prepare a coating liquid. The coating liquid was applied on an aluminum-deposited polyester film substrate by the wire bar technique to form a charge transporting layer having a dry thickness of 15 μm. 50 parts by weight of disazo compound No. 1, 50 parts by weight of a polyester resin (Vylon 200), and 50 parts by weight of PMMA were kneaded with a mixer for 3 hours together with THF as a solvent to prepare a coating liquid, which was then applied on the charge transporting layer by the wire bar technique to form a charge generating layer having a dry thickness of 0.5 μm. Thus, a photoconductor with a structure corresponding to that shown in FIG. 3 was produced.

EXAMPLE 3

A photoconductive layer was produced by forming a charge transporting layer in substantially the same manner as in Example 2 except that α-phenyl-4'-N,N-dimethylaminostilbene, which is a styryl compound, was used to replace ABPH as the charge transporting substance. Then a charge generating layer was formed on the charge transporting layer, thus a photoconductor was produced.

EXAMPLE 4

A photoconductive layer was produced by forming a charge transporting layer in substantially the same manner as in Example 2 except that tri(p-toryl)amine, which is a triphenylamine compound, was used to replace ABPH as the charge transporting substance. Then a charge generating layer was formed on the charge transporting layer, thus a photoconductor was produced.

EXAMPLE 5

A photoconductive layer was produced by forming a charge transporting layer in substantially the same manner as in Example 2 except that 2,5-bis(p-diethylaminophenyl)-1,3,4-oxadiazole, which is a oxadiazole compound, was used to replace ABPH as the charge transporting substance. Then a charge generating layer was formed on the charge transporting layer, thus a photoconductor was produced.

The electrophotographic characteristics of the five photoconductors thus produced were measured by utilizing an electrostatic recording paper testing apparatus (Kawaguchi Denki Model SP-428).

The surface potential Vs (volts) of each photoconductor is an initial surface potential which was measured when the surface of the photoconductor was positively charged in the dark by corona discharge at +6.0 kV for 10 seconds. After the discontinuation of the corona discharge, the photoconductor was allowed to stand in the dark for 2 seconds, after which the surface potential Vd (volts) of the photoconductor was measured. Subsequently, the surface of the photoconductor was irradiated with white light at an illuminance of 2 luxes and the time (seconds) required for the irradiation to decrease the surface potential of the photoconductor to half of the Vd was measured, then from which time and the illuminance the half decay exposure amount $E_{\frac{1}{2}}$ (lux.sec) was calculated. Also, the surface potential of the photoconductor after 10 seconds of irradiation thereof with white light at an illuminance of 2 luxes was measured as a residual potential Vr (volts). The results of the measurements are shown in Table 1.

TABLE 1

| Example No. | VS (Volts) | Vr (Volts) | $E_{\frac{1}{2}}$ (lux.Sec) |
|---|---|---|---|
| 1 | 480 | 110 | 5.4 |
| 2 | 510 | 95 | 4.9 |
| 3 | 500 | 130 | 6.9 |
| 4 | 450 | 160 | 6.5 |
| 5 | 530 | 100 | 5.2 |

As can be seen in Table 1, the photoconductors of Examples 1, 2, 3, 4 and 5 have good characteristics in the surface potential, the residual potentials and the half decay exposure amount.

EXAMPLE 6

100 parts by weight of each of respective disazo compounds Nos. from 2 to 180 and 100 parts by weight of polyester (Vylon 200) were mixed with THF as a solvent with a mixer for 3 hours to prepare a coating liquid. The respective coating liquids were applied on aluminum substrates to form a charge generating layer having a dry thickness of about 0.5 μm. Further, the coating liquid described in Example 2, which include ASPP as a charge transporting substance, was applied on the respective charge generating layer having a dry thickness of about 15 μm, thus photoconductors as shown in FIG. 2 were produced.

The electrophotographic characteristics of thus produced photoconductors are measured. The respective surface of the photoconductors were negatively charged in the dark by corona discharge at −6.0 kV for 10 seconds. Subsequently, the surface potential Vd, the half decay exposure amount $E_{\frac{1}{2}}$ and the residual potential Vr are measured in the same manner as described before. The obtained $E_{\frac{1}{2}}$ and Vr are shown in Table 2.

TABLE 2

| Example No. | $E_{\frac{1}{2}}$ (lux.sec) | Vr (Volts) |
|---|---|---|
| 2 | 5.2 | −70 |
| 3 | 3.6 | −110 |
| 4 | 4.9 | −80 |
| 5 | 4.1 | −110 |

TABLE 2-continued

| Example No. | E½ (lux.sec) | Vr (Volts) |
|---|---|---|
| 6 | 4.4 | −80 |
| 7 | 4.2 | −100 |
| 8 | 5.1 | −80 |
| 9 | 6.9 | −70 |
| 10 | 5.1 | −90 |
| 11 | 4.9 | −90 |
| 12 | 6.1 | −100 |
| 13 | 6.1 | −80 |
| 14 | 4.8 | −90 |
| 15 | 3.6 | −50 |
| 16 | 5.8 | −70 |
| 17 | 5.2 | −50 |
| 18 | 5.3 | −80 |
| 19 | 4.2 | −70 |
| 20 | 5.2 | −90 |
| 21 | 6.6 | −60 |
| 22 | 4.9 | −70 |
| 23 | 3.1 | −100 |
| 24 | 5.4 | −90 |
| 25 | 4.2 | −80 |
| 26 | 5.1 | −70 |
| 27 | 4.9 | −120 |
| 28 | 6.1 | −60 |
| 29 | 6.9 | −80 |
| 30 | 4.1 | −90 |
| 31 | 5.1 | −100 |
| 32 | 3.8 | −80 |
| 33 | 4.6 | −90 |
| 34 | 4.8 | −50 |
| 35 | 5.3 | −70 |
| 36 | 4.2 | −90 |
| 37 | 5.9 | −70 |
| 38 | 5.1 | −80 |
| 39 | 5.9 | −80 |
| 40 | 4.1 | −100 |
| 41 | 6.1 | −50 |
| 42 | 6.7 | −40 |
| 43 | 4.6 | −80 |
| 44 | 3.8 | −70 |
| 45 | 4.2 | −120 |
| 46 | 5.2 | −60 |
| 47 | 6.5 | −100 |
| 48 | 5.3 | −70 |
| 49 | 5.4 | −80 |
| 50 | 4.8 | −60 |
| 51 | 4.0 | −90 |
| 52 | 8.9 | −50 |
| 53 | 6.5 | −70 |
| 54 | 3.6 | −50 |
| 55 | 7.4 | −80 |
| 56 | 4.1 | −80 |
| 57 | 2.6 | −110 |
| 58 | 3.7 | −80 |
| 59 | 6.1 | −100 |
| 60 | 5.0 | −80 |
| 61 | 3.1 | −70 |
| 62 | 4.7 | −90 |
| 63 | 5.6 | −60 |
| 64 | 4.4 | −70 |
| 65 | 6.4 | −100 |
| 66 | 4.3 | −70 |
| 67 | 3.3 | −90 |
| 68 | 8.7 | −90 |
| 69 | 5.4 | −100 |
| 70 | 6.4 | −80 |
| 71 | 7.8 | −90 |
| 72 | 4.3 | −80 |
| 73 | 4.8 | −70 |
| 74 | 3.9 | −110 |
| 75 | 6.2 | −90 |
| 76 | 3.6 | −50 |
| 77 | 4.6 | −70 |
| 78 | 7.9 | −90 |
| 79 | 2.7 | −100 |
| 80 | 7.1 | −50 |
| 81 | 8.5 | −40 |
| 82 | 4.6 | −80 |
| 83 | 8.6 | −70 |
| 84 | 2.5 | −70 |
| 85 | 5.3 | −80 |

TABLE 2-continued

| Example No. | E½ (lux.sec) | Vr (Volts) |
|---|---|---|
| 86 | 8.9 | −80 |
| 87 | 8.4 | −80 |
| 88 | 6.8 | −90 |
| 89 | 6.9 | −100 |
| 90 | 4.6 | −80 |
| 91 | 4.4 | −90 |
| 92 | 6.2 | −120 |
| 93 | 8.5 | −60 |
| 94 | 3.8 | −100 |
| 95 | 5.6 | −70 |
| 96 | 4.4 | −70 |
| 97 | 4.3 | −120 |
| 98 | 7.3 | −60 |
| 99 | 3.3 | −80 |
| 100 | 8.4 | −60 |
| 101 | 8.7 | −50 |
| 102 | 8.1 | −70 |
| 103 | 4.2 | −90 |
| 104 | 7.8 | −70 |
| 105 | 5.1 | −80 |
| 106 | 3.5 | −80 |
| 107 | 8.4 | −80 |
| 108 | 4.7 | −70 |
| 109 | 7.1 | −90 |
| 110 | 4.5 | −60 |
| 111 | 5.0 | −100 |
| 112 | 8.6 | −50 |
| 113 | 5.9 | −100 |
| 114 | 7.0 | −70 |
| 115 | 4.1 | −80 |
| 116 | 6.1 | −60 |
| 117 | 8.1 | −80 |
| 118 | 4.4 | −90 |
| 119 | 8.2 | −50 |
| 120 | 4.3 | −70 |
| 121 | 3.0 | −110 |
| 122 | 8.1 | −80 |
| 123 | 5.9 | −110 |
| 124 | 7.7 | −100 |
| 125 | 5.5 | −100 |
| 126 | 6.1 | −70 |
| 127 | 4.7 | −120 |
| 128 | 5.5 | −60 |
| 129 | 7.8 | 80 |
| 130 | 6.2 | −90 |
| 131 | 7.5 | −100 |
| 132 | 8.8 | −80 |
| 133 | 4.2 | −90 |
| 134 | 5.0 | −70 |
| 135 | 7.8 | −50 |
| 136 | 3.1 | −80 |
| 137 | 4.9 | −70 |
| 138 | 8.1 | −90 |
| 139 | 6.4 | −90 |
| 140 | 8.4 | −100 |
| 141 | 4.8 | −80 |
| 142 | 5.6 | −40 |
| 143 | 8.0 | −80 |
| 144 | 6.3 | −70 |
| 145 | 5.1 | −120 |
| 146 | 8.9 | −60 |
| 147 | 8.1 | −70 |
| 148 | 7.4 | −100 |
| 149 | 6.7 | −90 |
| 150 | 8.1 | −80 |
| 151 | 8.3 | −90 |
| 152 | 8.2 | −100 |
| 153 | 5.4 | −80 |
| 154 | 8.0 | −90 |
| 155 | 3.5 | −50 |
| 156 | 4.6 | −70 |
| 157 | 5.3 | −80 |
| 158 | 5.4 | −100 |
| 159 | 6.2 | −70 |
| 160 | 8.6 | −120 |
| 161 | 4.8 | −60 |
| 162 | 5.9 | −80 |
| 163 | 8.1 | −110 |
| 164 | 3.6 | −80 |
| 165 | 7.7 | −110 |

TABLE 2-continued

| Example No. | E½ (lux.sec) | Vr (Volts) |
|---|---|---|
| 166 | 8.8 | −100 |
| 167 | 3.6 | −80 |
| 168 | 5.8 | −90 |
| 169 | 7.2 | −50 |
| 170 | 8.1 | −70 |
| 171 | 8.6 | −90 |
| 172 | 6.1 | −70 |
| 173 | 5.4 | −80 |
| 174 | 7.9 | −80 |
| 175 | 4.3 | −100 |
| 176 | 5.2 | −80 |
| 177 | 7.6 | −70 |
| 178 | 3.7 | −90 |
| 179 | 4.1 | −90 |
| 180 | 5.9 | −70 |

As can be seen in Table 2, the photoconductors of Examples 2-180 have good characteristics in the half decay exposure amount E½ and the residual potential Vr.

It is preferable to use a hydrazone compound represented by the following general formula (III) or a pyrazoline compound represented by the following general formula (IV) as a charge transporting substance in combination with the aforementioned disazo compound as a charge generating substance.

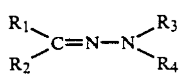

(III)

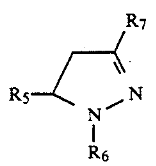

(IV)

Wherein each of $R_1$, $R_2$, $R_3$ and $R_4$ stands for one of an alkyl group, an alkenyl group, an aryl group and an aromatic heterocyclic group, each of which groups may be or not may be substituted, and each of $R_5$, $R_6$ and $R_7$ stands for one of an alkenyl group, an aryl group and an aromatic heterocyclic group each of which groups may be or not may be substituted.

The hydrazone compounds represented by the general formula (III) can be synthesized by dehydration condensing the corresponding hydrazine compound with the corresponding carbonyl compound in an appropriate solvent such as ethanol in the presence of an acid. The pyrazoline compounds represented by the general formula (IV) can be synthesized by reacting a corresponding pyrazoline with a corresponding chalcone derivative in an appropriate solvent such as ethanol in the presence of an acid as a catalyzer. As for the use of the hydrazone compounds represented by the general formula (III) or the pyrazoline compounds represented by the general formula (IV) as a charge transporting substance in combination with the disazo compounds represented by the general formula (I) or (II) as a charge generating substance in photoconductive layers, there has been no precedent before. In the course of the intensive study of various organic materials as made in an attempt to achieve the above object, the present inventors conducted a number of experiments with those compounds and, as a result, found that the use of such specific hydrazone compounds or pyrazoline compounds together with such specific disazo compounds is very effective in improving electrophotographic characteristics. Based on this finding, photoconductors having a high sensitivity and good repeated use characteristics are obtained.

Specific examples of the hydrazone compounds represented by the general formula (III) and to be used in the present invention include:

Compound No.

2-1

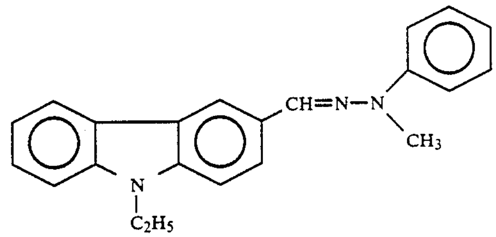

2-2

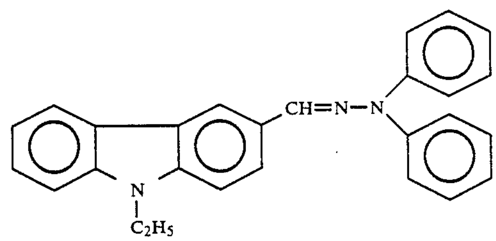

2-3

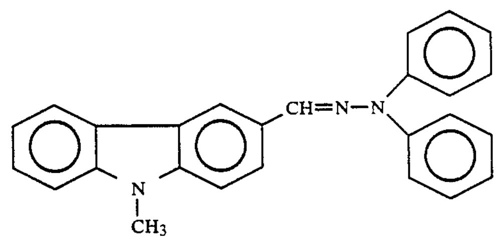

2-4

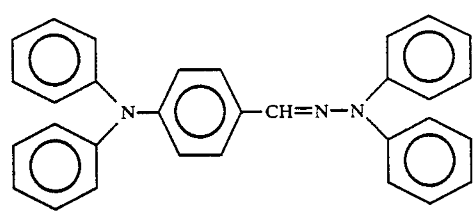

2-5

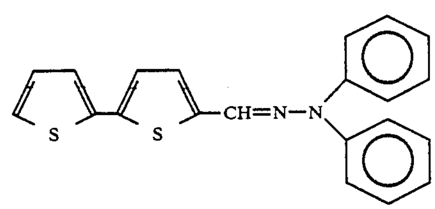

2-6

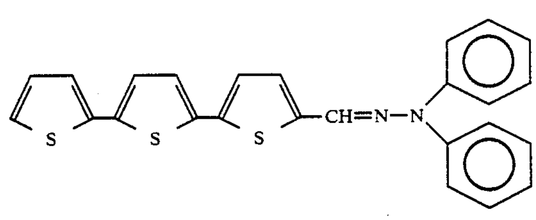

-continued
Compound No.
2-7
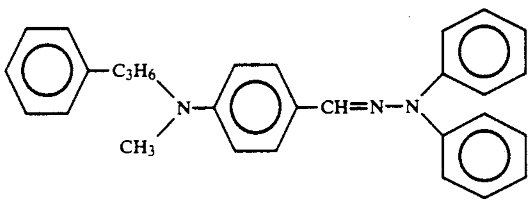
2-8
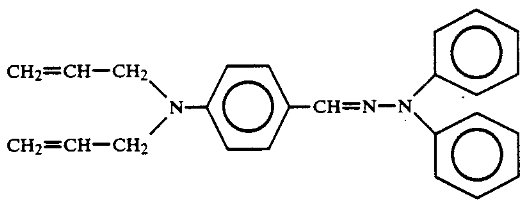
-continued
Compound No.
2-9
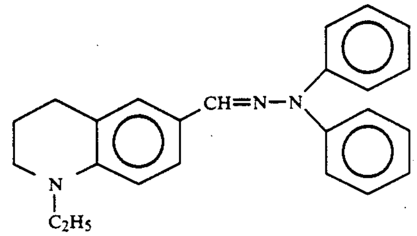
2-10
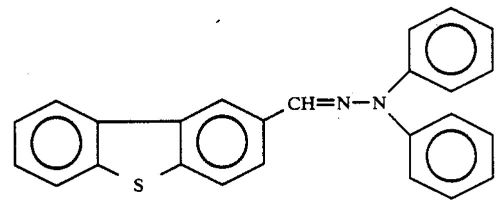
Specific examples of the pyrazoline compounds represented by the general formula (IV) and to be used in the present invention include:
Compound No.
3-1
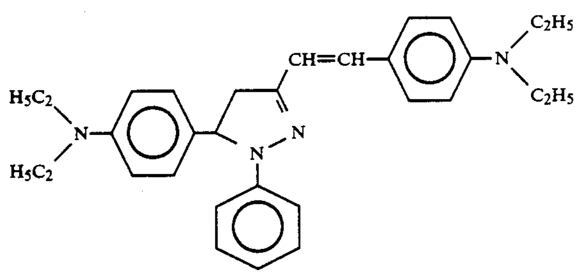
3-2
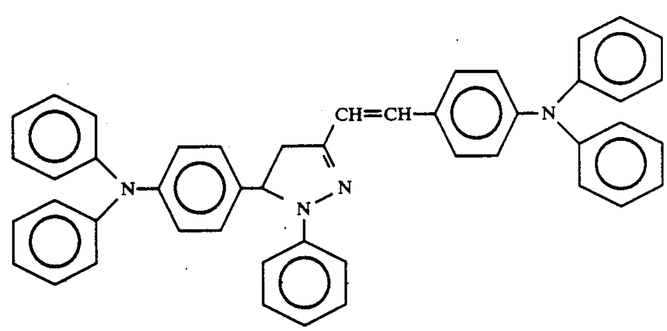
3-3
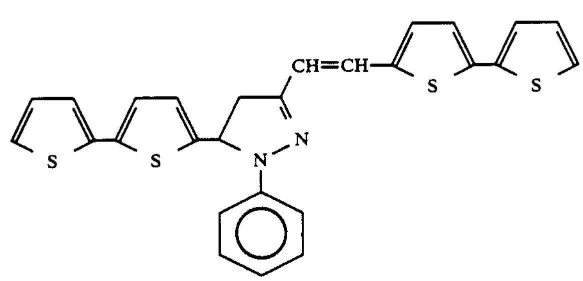

-continued

| Compound No. |
|---|
| 3-4 |

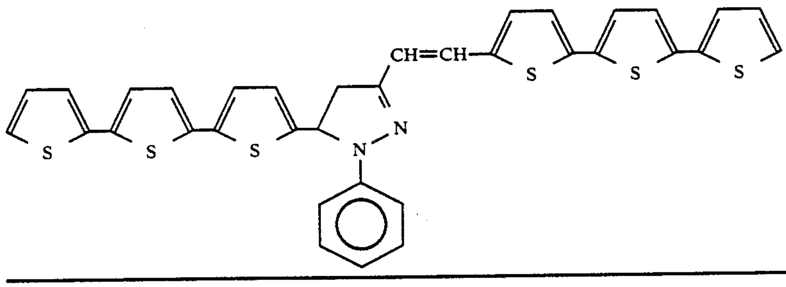

Examples will now be given, wherein various compounds represented by the general formula (III) or (IV) were respectively used to produce photoconductors in combination with the disazo compounds represented by the general formula (I) or (II).

EXAMPLE 7

The disazo compound No. 181 was pulverized with a ball mill including glass balls for 100 hours. 7 parts by weight of thus fine powdered compound No. 181 were added into 50 parts by weight of N,N-dimethylformamide (DMF) solvent and were dispersed by means of an ultrasonic dispersion treatment. The dispersed compound No. 181 was separated from the DMF solvent by filtering and dried to make a sample. 10 parts by weight of a polyester resin (Vylon 200) and 790 parts by weight of tetrahydrofuran (THF) were admixed with the sample. The mixture thus obtained was severely agitated in a stainless steel boat for 2 hours and further ultrasonic treated for 30 minutes to make a coating liquid for charge generating layer. While, a solution of 1 part by weight of the hydrazone compound No. 2-1 in 6 parts by weight of tetrahydrofuran (THF) was mixed with a solution of 1.5 parts by weight of polymethacrylic methyl polymer (PMMA) in 13.5 parts by weight of toluene to make a coating liquid for charge transporting layer. Onto an aluminum-deposited polyester terephthalate film, the coating liquid for charge generating layer was applied and dried to form a charge generating layer with day thickness of 2 μm. Further, on the charge generating layer the coating liquid for charge transporting layer was applied and dried to form a charge transporting layer with a dry thickness of 15 μm. Thus, a photoconductor as shown in FIG. 2 was produced.

EXAMPLES 8–10

Photoconductors of Examples 8–10 were produced in the same manner as in Example 7 except that each of respective hydrazone compounds Nos. from 2-2 to 2-4 was used as a charge transporting substance instead of the hydrazone compound No. 2-1.

EXAMPLE 11

A photoconductor was produced in the same manner as in Example 7 except that the disazo compound No. 182 was used instead of the disazo compound No. 181.

EXAMPLES 12–14

Photoconductors of Examples 12–14 were produced in the same manner as in Example 11 except that each of respective hydrazone compounds Nos. from 2-2 to 2-4 was used instead of the hydrazone compound No. 2-1.

EXAMPLE 15

A photoconductor was produced in the same manner as in Example 7 except that the disazo compound No. 183 was used instead of the disazo compound No. 181.

EXAMPLES 16–18

Photoconductors of Examples 16–18 were produced in the same manner as in Example 15 except that each of respective hydrazone compounds Nos. from 2-2 to 2-4 was used instead of the hydrazone compound No. 2-1.

EXAMPLE 19

A photoconductor was produced in the same manner as in Example 7 except that the disazo compound No. 184 was used instead of the disazo compound No. 181.

EXAMPLES 20–22

Photoconductors of Examples 20–22 were produced in the same manner as in Example 19 except that each of respective hydrazone compounds Nos. from 2-2 to 2-4 was used instead of the hydrazone compound No. 2-1.

EXAMPLE 23

A photoconductor was produced in the same manner as in Example 7 except that the disazo compound No. 185 was used instead of the disazo compound No. 181.

EXAMPLES 24–26

Photoconductors of Examples 24–26 were produced in the same manner as in Example 23 except that each of respective hydrazone compounds Nos. from 2-2 to 2-4 was used instead of the hydrazone compound No. 2-1.

EXAMPLE 27

A photoconductor was produced in the same manner as in Example 7 except that the pyrazoline compound No. 3-1 instead of the hydrazone compound No. 2-1.

EXAMPLE 28

A photoconductor was produced in the same manner as in Example 27 except that the pyrazoline compound No. 3-2 instead of the pyrazoline compound No. 3-1.

EXAMPLE 29

A photoconductor was produced in the same manner as in Example 27 except that the disazo compound No. 182 instead of the disazo compound No. 181.

EXAMPLE 30

A photoconductor was produced in the same manner as in Example 29 except that the pyrazoline compound No. 3-2 instead of the pyrazoline compound No. 3-1.

EXAMPLE 31

A photoconductor was produced in the same manner as in Example 27 except that the disazo compound No. 183 instead of the disazo compound No. 181.

EXAMPLE 32

A photoconductor was produced in the same manner as in Example 31 except that the pyrazoline compound No. 3-2 instead of the pyrazoline compound No. 3-1.

EXAMPLE 33

A photoconductor was produced in the same manner as in Example 27 except that the disazo compound No. 184 instead of the disazo compound No. 181.

EXAMPLE 34

A photoconductor was produced in the same manner as in Example 33 except that the pyrazoline compound No. 3-2 instead of the pyrazoline compound No. 3-1.

EXAMPLE 35

A photoconductor was produced in the same manner as in Example 27 except that the disazo compound No. 185 instead of the disazo compound No. 181.

EXAMPLE 36

A photoconductor was produced in the same manner as in Example 35 except that the pyrazoline compound No. 3-2 instead of the pyrazoline compound No. 3-1.

EXAMPLE 37

The disazo compound No. 181 was pulverized with a ball mill including glass balls for 100 hours. 7 parts by weight of thus fine powdered compound No. 181 were added into 50 parts by weight of N,N-dimethylformamide (DMF) solvent and were dispersed by means of an ultrasonic dispersion treatment. The dispersed compound No. 181 was separated from the DMF solvent by filtering and dried. 1 part of the hydrazone compound No. 2-1, 10 parts by weight of a polyester resin (Vylon 200) and 790 parts by weight of tetrahydrofuran were admixed with separated disazo compound. The mixture thus obtained was severely agitated in a stainless steel boat for 2 hours and further ultrasonic treated for 30 minutes to make a coating liquid for charge generating layer. While, a solution of 1 part by weight of the hydrazone compound No. 2-1 in 6 parts by weight of tetrahydrofuran (THF) was mixed with a solution of 1.5 parts by weight of polymethacrylic methyl polymer (PMMA) in 13.5 parts by weight of toluene to make a coating liquid for charge transporting layer. Onto an aluminum-deposited polyester terephthalate film, the coating liquid for charge generating layer was applied and dried to form a charge generating layer with dry thickness of 2 μm. Further, on the charge generating layer the coating liquid for charge transporting layer was applied and dried to form a charge transporting layer with a dry thickness of 15 μm. Thus, a photoconductor as shown in FIG. 4 was produced.

EXAMPLES 38–40

Photoconductors of Examples 38–40 were produced in the same manner as in Example 37 except that each of respective hydrazone compounds Nos. from 2-2 to 2-4 was used as a charge transporting substance in the charge generating layer and the charge transporting layer instead of the hydrazone compound No. 2-1.

EXAMPLE 41

A photoconductor was produced in the same manner as in Example 37 except that the disazo compound No. 182 was used instead of the disazo compound No. 181.

EXAMPLES 42–44

Photoconductors of Examples 42–44 were produced in the same manner as in Example 41 except that each of respective hydrazone compounds Nos. from 2-2 to 2-4 was used as a charge transporting substance in the charge generating layer and the charge transporting layer instead of the hydrazone compound No. 2-1.

EXAMPLE 45

A photoconductor was produced in the same manner as in Example 37 except that the disazo compound No. 183 was used instead of the disazo compound No. 181.

EXAMPLES 46–48

Photoconductors of Examples 46–48 were produced in the same manner as in Example 45 except that each of respective hydrazone compounds Nos. from 2-2 to 2-4 was used as a charge transporting substance in the charge generating layer and the charge transporting layer instead of the hydrazone compound No. 2-1.

EXAMPLE 49

A photoconductor was produced in the same manner as in Example 37 except that the disazo compound No. 184 was used instead of the disazo compound No. 181.

EXAMPLES 50–52

Photoconductors of Examples 50–52 were produced in the same manner as in Example 49 except that each of respective hydrazone compounds Nos. from 2-2 to 2-4 was used as a charge transporting substance in the charge generating layer and the charge transporting layer instead of the hydrazone compound No. 2-1.

EXAMPLE 53

A photoconductor was produced in the same manner as in Example 37 except that the disazo compound No. 185 was used instead of the disazo compound No. 181.

EXAMPLES 54–56

Photoconductors of Examples 54–56 were produced in the same manner as in Example 53 except that each of respective hydrazone compounds Nos. from 2-2 to 2-4 was used as a charge transporting substance in the charge generating layer and the charge transporting layer instead of the hydrazone compound No. 2-1.

EXAMPLE 57

A photoconductor was produced in the same manner as in Example 37 except that the pyrazoline compound No. 3-1 was used as a charge transporting substance in the charge generating layer and the charge transporting layer instead of the hydrazone compound No. 2-1.

EXAMPLE 58

A photoconductor was produced in the same manner as in Example 57 except that the pyrazoline compound No. 3-2 was used instead of the pyrazoline compound No. 3-1.

EXAMPLE 59

A photoconductor was produced in the same manner as in Example 57 except that the disazo compound No. 182 was used instead of the disazo compound No. 181.

EXAMPLE 60

A photoconductor was produced in the same manner as in Example 59 except that the pyrazoline compound No. 3-2 was used instead of the pyrazoline compound No. 3-1.

EXAMPLE 61

A photoconductor was produced in the same manner as in Example 57 except that the disazo compound No. 183 was used instead of the disazo compound No. 181.

EXAMPLE 62

A photoconductor was produced in the same manner as in Example 61 except that the pyrazoline compound No. 3-2 was used instead of the pyrazoline compound No. 3-1.

EXAMPLE 63

A photoconductor was produced in the same manner as in Example 57 except that the disazo compound No. 184 was used instead of the disazo compound No. 181.

EXAMPLE 64

A photoconductor was produced in the same manner as in Example 63 except that the pyrazoline compound No. 3-2 was used instead of the pyrazoline compound No. 3-1.

EXAMPLE 65

A photoconductor was produced in the same manner as in Example 57 except that the disazo compound No. 185 was used instead of the disazo compound No. 181.

EXAMPLE 66

A photoconductor was produced in the same manner as in Example 65 except that the pyrazoline compound No. 3-2 was used instead of the pyrazoline compound No. 3-1.

EXAMPLE 67

A photoconductor was produced in the same manner as in Example 7 except that the disazo compound No. 245 was used instead of the disazo compound No. 181.

EXAMPLES 68–70

Photoconductors of Examples 68–70 were produced in the same manner as in Example 67 except that each of respective hydrazone compounds Nos. from 2-2 to 2-4 was used as a charge transporting substance in the charge generating layer and the charge transporting layer instead of the hydrazone compound No. 2-1.

EXAMPLE 71

A photoconductor was produced in the same manner as in Example 7 except that the disazo compound No. 246 was used instead of the disazo compound No. 181.

EXAMPLES 72–74

Photoconductors of Examples 72–74 were produced in the same manner as in Example 71 except that each of respective hydrazone compounds Nos. from 2-2 to 2-4 was used as a charge transporting substance in the charge generating layer and the charge transporting layer instead of the hydrazone compound No. 2-1.

EXAMPLE 75

A photoconductor was produced in the same manner as in Example 7 except that the disazo compound No. 247 was used instead of the disazo compound No. 181.

EXAMPLES 76–78

Photoconductors of Examples 76–78 were produced in the same manner as in Example 75 except that each of respective hydrazone compounds Nos. from 2-2 to 2-4 was used as a charge transporting substance in the charge generating layer and the charge transporting layer instead of the hydrazone compound No. 2-1.

EXAMPLE 79

A photoconductor was produced in the same manner as in Example 7 except that the disazo compound No. 248 was used instead of the disazo compound No. 181.

EXAMPLES 80–82

Photoconductors of Examples 80–82 were produced in the same manner as in Example 79 except that each of respective hydrazone compounds Nos. from 2-2 to 2-4 was used as a charge transporting substance in the charge generating layer and the charge transporting layer instead of the hydrazone compound No. 2-1.

EXAMPLE 83

A photoconductor was produced in the same manner as in Example 7 except that the disazo compound No. 249 was used instead of the disazo compound No. 181.

EXAMPLES 84–86

Photoconductors of Examples 84–86 were produced in the same manner as in Example 83 except that each of respective hydrazone compounds Nos. from 2-2 to 2-4 was used of the hydrazone compound No. 2-1.

EXAMPLE 87

A photoconductor was produced in the same manner as in Example 67 except that the pyrazoline compound No. 3-1 was used as a charge transporting substance in the charge generating layer and the charge transporting layer, instead of the hydrazone compound No. 2-1.

EXAMPLE 88

A photoconductor was produced in the same manner as in Example 87 except that the pyrazoline compound No. 3-2 was used instead of the pyrazoline compound No. 3-1.

EXAMPLE 89

A photoconductor was produced in the same manner as in Example 87 except that the disazo compound No. 246 was used instead of the disazo compound No. 245.

EXAMPLE 90

A photoconductor was produced in the same manner as in Example 89 except that the pyrazoline compound No. 3-2 was used instead of the pyrazoline compound No. 3-1.

EXAMPLE 91

A photoconductor was produced in the same manner as in Example 87 except that the disazo compound No. 247 was used instead of the disazo compound No. 245.

EXAMPLE 92

A photoconductor was produced in the same manner as in Example 91 except that the pyrazoline compound No. 3-2 was used instead of the pyrazoline compound No. 3-1.

EXAMPLE 93

A photoconductor was produced in the same manner as in Example 87 except that the disazo compound No. 248 was used instead of the disazo compound No. 245.

EXAMPLE 94

A photoconductor was produced in the same manner as in Example 93 except that the pyrazoline compound No. 3-2 was used instead of the pyrazoline compound No. 3-1.

EXAMPLE 95

A photoconductor was produced in the same manner as in Example 87 except that the disazo compound No. 249 was used instead of the disazo compound No. 245.

EXAMPLE 96

A photoconductor was produced in the same manner as in Example 95 except that the pyrazoline compound No. 3-2 was used instead of the pyrazoline compound No. 3-1.

EXAMPLE 97

A photoconductor was produced in the same manner as in Example 37 except that the disazo compound No. 245 was used instead of the disazo compound No. 181.

EXAMPLES 98–100

Photoconductors of Examples 98–100 were produced in the same manner as in Example 97 except that each of respective hydrazone compounds Nos. from 2-2 to 2-4 was used as a charge transporting substance in the charge generating layer and the charge transporting layer instead of the hydrazone compound No. 2-1.

EXAMPLE 101

A photoconductor was produced in the same manner as in Example 37 except that the disazo compound No. 246 was used instead of the disazo compound No. 181.

EXAMPLES 102–104

Photoconductors of Examples 102–104 were produced in the same manner as in Example 101 except that each of respective hydrazone compounds Nos. from 2-2 to 2-4 was used as a charge transporting substance in the charge generating layer and the charge transporting layer instead of the hydrazone compound No. 2-1.

EXAMPLE 105

A photoconductor was produced in the same manner as in Example 37 except that the disazo compound No. 247 was used instead of the disazo compound No. 181.

EXAMPLES 106–108

Photoconductors of Examples 106–108 were produced in the same manner as in Example 105 except that each of respective hydrazone compounds Nos. from 2-2 to 2-4 was used as a charge transporting substance in the charge generating layer and the charge transporting layer instead of the hydrazone compound No. 2-1.

EXAMPLE 109

A photoconductor was produced in the same manner as in Example 37 except that the disazo compound No. 248 was used instead of the disazo compound No. 181.

EXAMPLES 110–112

Photoconductors of Examples 110–112 were produced in the same manner as in Example 109 except that each of respective hydrazone compounds Nos. from 2-2 to 2-4 was used as a charge transporting substance in the charge generating layer and the charge transporting layer instead of the hydrazone compound No. 2-1.

EXAMPLE 113

A photoconductor was produced in the same manner as in Example 37 except that the disazo compound No. 249 was used instead of the disazo compound No. 181.

EXAMPLES 114–116

Photoconductors of Examples 114–116 were produced in the same manner as in Example 113 except that each of respective hydrazone compounds Nos. from 2-2 to 2-4 was used as a charge transporting substance in the charge generating layer and the charge transporting layer instead of the hydrazone compound No. 2-1.

EXAMPLE 117

A photoconductor was produced in the same manner as in Example 97 except that the pyrazoline compound No. 3-1 was used in the charge generating layer and the charge transporting layer instead of the hydrazone compound No. 2-1.

EXAMPLE 118

A photoconductor was produced in the same manner as in Example 117 except that the pyrazoline compound No. 3-2 was used instead of the pyrazoline compound No. 3-1.

EXAMPLE 119

A photoconductor was produced in the same manner as in Example 117 except that the disazo compound No. 246 was used instead of the disazo compound No. 245.

EXAMPLE 120

A photoconductor was produced in the same manner as in Example 119 except that the pyrazoline compound No. 3-2 was used instead of the pyrazoline compound No. 3-1.

EXAMPLE 121

A photoconductor was produced in the same manner as in Example 117 except that the disazo compound No. 247 was used instead of the disazo compound No. 245.

EXAMPLE 122

A photoconductor was produced in the same manner as in Example 121 except that the pyrazoline compound No. 3-2 was used instead of the pyrazoline compound No. 3-1.

EXAMPLE 123

A photoconductor was produced in the same manner as in Example 117 except that the disazo compound No. 248 was used instead of the disazo compound No. 245.

EXAMPLE 124

A photoconductor was produced in the same manner as in Example 123 except that the pyrazoline compound No. 3-2 was used instead of the pyrazoline compound No. 3-1.

EXAMPLE 125

A photoconductor was produced in the same manner as in Example 117 except that the disazo compound No. 249 was used instead of the disazo compound No. 245.

EXAMPLE 126

A photoconductor was produced in the same manner as in Example 125 except that the pyrazoline compound No. 3-2 was used instead of the pyrazoline compound No. 3-1.

The half decay exposure amount E½ of photoconductors thus produced were measured with the electrostatic recording paper testing apparatus SP-428. The results obtained are shown in Table. 3.

TABLE 3

| Example No. | E½ (lux.sec) |
|---|---|
| 7 | 10.5 |
| 8 | 10.2 |
| 9 | 11.1 |
| 10 | 6.4 |
| 11 | 9.0 |
| 12 | 6.9 |
| 13 | 10.2 |
| 14 | 5.7 |
| 15 | 11.0 |
| 16 | 6.0 |
| 17 | 8.6 |
| 18 | 4.5 |
| 19 | 12.8 |
| 20 | 5.5 |
| 21 | 5.4 |
| 22 | 6.8 |
| 23 | 9.7 |
| 24 | 12.1 |
| 25 | 12.4 |
| 26 | 7.7 |
| 27 | 7.4 |
| 28 | 12.6 |
| 29 | 12.8 |
| 30 | 10.8 |
| 31 | 8.2 |
| 32 | 6.1 |
| 33 | 6.0 |
| 34 | 8.6 |
| 35 | 11.5 |
| 36 | 11.5 |
| 37 | 9.6 |
| 38 | 12.5 |
| 39 | 5.1 |
| 40 | 12.9 |
| 41 | 5.3 |
| 42 | 6.1 |
| 43 | 6.2 |
| 44 | 6.9 |
| 45 | 12.8 |
| 46 | 7.6 |
| 47 | 10.4 |
| 48 | 6.0 |
| 49 | 5.6 |
| 50 | 4.3 |
| 51 | 11.8 |
| 52 | 10.2 |
| 53 | 5.5 |
| 54 | 5.9 |
| 55 | 6.8 |
| 56 | 4.1 |
| 57 | 4.9 |
| 58 | 9.9 |
| 59 | 8.6 |

TABLE 3-continued

| Example No. | E½ (lux.sec) |
|---|---|
| 60 | 11.2 |
| 61 | 6.2 |
| 62 | 8.2 |
| 63 | 10.7 |
| 64 | 5.6 |
| 65 | 6.2 |
| 66 | 6.6 |
| 67 | 9.6 |
| 68 | 7.2 |
| 69 | 5.5 |
| 70 | 8.4 |
| 71 | 5.6 |
| 72 | 9.2 |
| 73 | 9.0 |
| 74 | 4.4 |
| 75 | 4.0 |
| 76 | 7.5 |
| 77 | 6.9 |
| 78 | 7.6 |
| 79 | 6.9 |
| 80 | 10.0 |
| 81 | 5.0 |
| 82 | 5.8 |
| 83 | 10.8 |
| 84 | 11.3 |
| 85 | 10.7 |
| 86 | 11.3 |
| 87 | 8.9 |
| 88 | 4.3 |
| 89 | 4.3 |
| 90 | 12.3 |
| 91 | 8.2 |
| 92 | 8.6 |
| 93 | 8.8 |
| 94 | 6.8 |
| 95 | 8.6 |
| 96 | 9.4 |
| 97 | 10.5 |
| 98 | 10.6 |
| 99 | 8.2 |
| 100 | 11.0 |
| 101 | 11.9 |
| 102 | 6.5 |
| 103 | 12.0 |
| 104 | 9.2 |
| 105 | 6.5 |
| 106 | 7.4 |
| 107 | 7.2 |
| 108 | 7.9 |
| 109 | 4.7 |
| 110 | 4.8 |
| 111 | 8.2 |
| 112 | 5.6 |
| 113 | 8.2 |
| 114 | 6.1 |
| 115 | 11.8 |
| 116 | 6.9 |
| 117 | 11.4 |
| 118 | 5.0 |
| 119 | 5.3 |
| 120 | 10.6 |
| 121 | 10.7 |
| 122 | 11.7 |
| 123 | 9.5 |
| 124 | 6.5 |
| 125 | 7.2 |
| 126 | 9.1 |

As can be seen in Table 3, each of the above-mentioned photoconductors has a good half decay exposure amount E½ and a high sensitivity sufficient to the practical use.

As described above, according to the present invention, since a disazo compound represented by the aforementioned chemical formulae (I) or (II) is used in a photosensitive layer formed on an electroconductive substrate, as a charge generating substance, a photoconductor shows a high sensitive and excellent characteristics in repeated use when adapted to either a positive charge mode or a negative charge mode. If necessary, a covering layer may be provided on the surface of a photoconductor to improve the durability thereof.

What is claimed is:

1. A photoconductor for electrophotography, comprising:

an electroconductive substrate; and a photoconductive layer formed on said electroconductive substrate and including a charge generating substance comprised of at least one disazo compound represented by general formula (I):

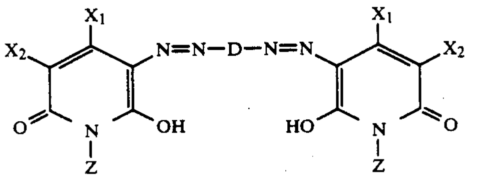

(I)

wherein X1 is selected from the group consisting of an alkyl group, an aryl group and an aromatic heterocyclic group, each of which groups may be substituted, X2 is selected from the group consisting of a hydrogen atom, a cyano group, a carbamoyl group, a carboxyl group, an ester group and an acyl group, and Z is selected from the group consisting of a hydrogen atom, an alkyl group, a cycloalkyl group, an alkenyl group, an aryl group and an aromatic heterocyclic group, each of which groups may be substituted, and —N═N—D—N═N— is a disazo residual group in which —D— is a structure represented by one of the following formulae:

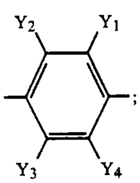

;

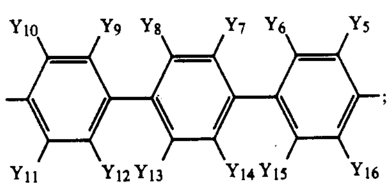

;

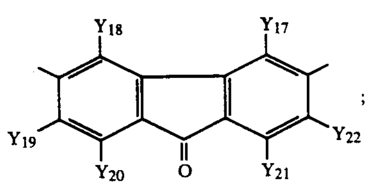

;

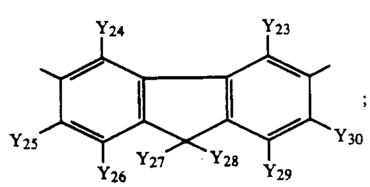

;

-continued

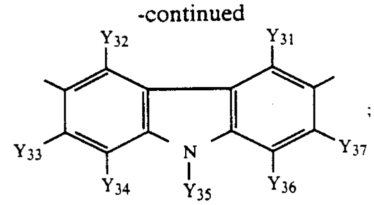

;

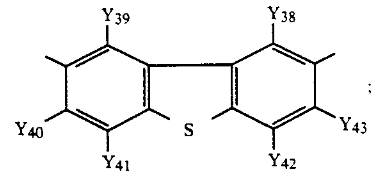

;

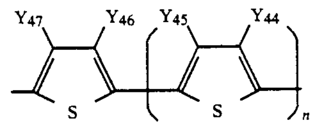

and

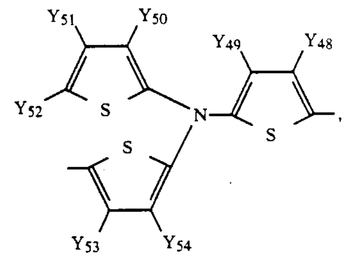

, wherein each of Y1 to Y54 is selected from the group consisting of a hydrogen atom, a halogen atom, an alkyl group, an alkoxy group, an acyl group, aryl group, an aromatic heterocyclic group, each of which groups may be substituted, and a nitro group, and n is an integer of from 0 to 6.

2. The photoconductor for electrophotography as claimed in claim 1, wherein said photoconductive layer further includes at least one of at least one hydrazone compound represented by general formula (III) or a pyrazoline compound represented by general formula (IV):

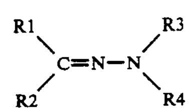

(III)

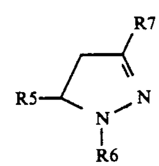

(IV)

wherein each of R1, R2, R3 and R4 is selected from the group consisting of an alkyl group, an alkenyl group, an aryl group and an aromatic heterocyclic group, each of which groups may be substituted, and each of R5, R6 and R7 is selected from the group consisting of an alkenyl group, an aryl group and an aromatic heterocyclic group, each of which groups may be substituted.

3. The photoconductor as claimed in claim 1, wherein said photoconductive layer comprises a layer including a charge generating substance selected from said at least one disazo compound, a charge transporting substance, and a binder resin, the charge generating substance and the charge transporting substance being dispersed within the binder resin.

4. The photoconductor as claimed in claim 1, wherein said photoconductive layer comprises a laminate of a charge transporting layer mainly composed of a charge transporting substance and a charge generating layer including a compound selected from said at least one disazo compound represented by general formula (I).

5. The photoconductor as claimed in claim 2, wherein said photoconductive layer comprises a layer including a charge generating substance selected from said at least one disazo compound represented by the general formula (I), a charge transporting substance selected from said at least one of at least one hydrazone compound represented by general formula (III) or a pyrazoline compound represented by general formula (IV), and a binder resin, the charge generating substance and the charge transporting substance being dispersed within the binder resin.

6. The photoconductor as claimed in claim 2, wherein said photoconductive layer comprises a laminate of a charge transporting layer mainly composed of a charge transporting substance and a charge generating layer including a compound selected from said at least one disazo compound represented by general formula (I) and a compound selected from said at least one of a least one hydrazone compound represented by general formula (III) or a pyrazoline compound represented by general formula (IV).

* * * * *